United States Patent
Demetriou et al.

(10) Patent No.: US 8,146,066 B2
(45) Date of Patent: *Mar. 27, 2012

(54) SYSTEMS AND METHODS FOR CACHING COMPUTE KERNELS FOR AN APPLICATION RUNNING ON A PARALLEL-PROCESSING COMPUTER SYSTEM

(75) Inventors: Christopher G. Demetriou, Redwood City, CA (US); Matthew N. Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1218 days.

This patent is subject to a terminal disclaimer.

(21) Appl. No.: 11/714,480

(22) Filed: Mar. 5, 2007

(65) Prior Publication Data

US 2007/0294682 A1    Dec. 20, 2007

Related U.S. Application Data

(60) Provisional application No. 60/815,532, filed on Jun. 20, 2006, provisional application No. 60/903,188, filed on Feb. 23, 2007.

(51) Int. Cl.
*G06F 9/45* (2006.01)
*G06F 9/46* (2006.01)

(52) U.S. Cl. ........ 717/149; 717/136; 717/146; 717/151; 717/153; 717/161; 718/100; 718/104; 718/106

(58) Field of Classification Search .................. 718/100, 718/104, 106
See application file for complete search history.

(56) References Cited

U.S. PATENT DOCUMENTS

| 5,088,034 | A | | 2/1992 | Ihara et al. | 395/700 |
|---|---|---|---|---|---|
| 5,179,702 | A | | 1/1993 | Spix et al. | |
| 5,857,106 | A | * | 1/1999 | Barbour et al. | 717/138 |
| 5,889,988 | A | * | 3/1999 | Held | 718/103 |
| 5,983,366 | A | | 11/1999 | King | 714/38 |
| 6,078,744 | A | * | 6/2000 | Wolczko et al. | 717/153 |
| 6,298,370 | B1 | | 10/2001 | Tang et al. | 709/102 |
| 6,378,125 | B1 | * | 4/2002 | Bates et al. | 717/129 |
| 6,427,234 | B1 | * | 7/2002 | Chambers et al. | 717/140 |
| 6,453,407 | B1 | | 9/2002 | Lavi et al. | 712/24 |
| 6,460,178 | B1 | | 10/2002 | Chan et al. | 717/147 |
| 6,704,816 | B1 | | 3/2004 | Burke | 710/100 |
| 6,721,941 | B1 | | 4/2004 | Morshed et al. | 717/127 |
| 6,738,967 | B1 | * | 5/2004 | Radigan | 717/146 |
| 6,854,108 | B1 | * | 2/2005 | Choi | 717/125 |
| 6,876,652 | B1 | | 4/2005 | Bell et al. | 370/386 |

(Continued)

OTHER PUBLICATIONS

Schmidt, D., et al., "The Design of the TAO Real-Time Object Request Broker," Dept. of Computer Science, Washington University, Jan. 18, 1999, pp. 1-46.

(Continued)

*Primary Examiner* — Emerson Puente
*Assistant Examiner* — Charles Swift
(74) *Attorney, Agent, or Firm* — Morgan, Lewis & Bockius LLP

(57) ABSTRACT

A runtime system implemented in accordance with the present invention provides an application platform for parallel-processing computer systems. Such a runtime system enables users to leverage the computational power of parallel-processing computer systems to accelerate/optimize numeric and array-intensive computations in their application programs. This enables greatly increased performance of high-performance computing (HPC) applications.

21 Claims, 32 Drawing Sheets

U.S. PATENT DOCUMENTS

| | | | |
|---|---|---|---|
| 6,968,359 B1 | 11/2005 | Miller et al. | 709/205 |
| 6,971,096 B1 * | 11/2005 | Ankireddipally et al. | 718/101 |
| 7,010,796 B1 | 3/2006 | Strom et al. | 719/328 |
| 7,178,723 B2 | 2/2007 | Maloney | 235/379 |
| 7,197,512 B2 | 3/2007 | Pharies et al. | 707/103 R |
| 7,203,934 B2 | 4/2007 | Souloglou et al. | 717/146 |
| 7,210,127 B1 | 4/2007 | Rangachari | 717/128 |
| 7,284,156 B2 * | 10/2007 | Creamer et al. | 714/38 |
| 7,490,320 B2 | 2/2009 | Kielstra et al. | 717/148 |
| 7,549,145 B2 | 6/2009 | Aguilar, Jr. et al. | 717/149 |
| 7,600,222 B2 | 10/2009 | Wilt et al. | 717/146 |
| 7,603,663 B2 | 10/2009 | Wu et al. | 717/151 |
| 7,620,530 B2 | 11/2009 | Bordes et al. | 703/2 |
| 7,661,106 B1 * | 2/2010 | Ankireddipally et al. | 718/101 |
| 7,810,090 B2 | 10/2010 | Gebhart | 717/176 |
| 7,840,951 B1 * | 11/2010 | Wright et al. | 717/152 |
| 2002/0089508 A1 | 7/2002 | Sowizral et al. | 345/522 |
| 2003/0014736 A1 * | 1/2003 | Nguyen et al. | 717/129 |
| 2003/0093583 A1 | 5/2003 | Doran et al. | 709/328 |
| 2003/0093771 A1 * | 5/2003 | Ogawa et al. | 717/125 |
| 2003/0140179 A1 | 7/2003 | Wilt et al. | 709/321 |
| 2003/0167423 A1 * | 9/2003 | Murakami et al. | 714/38 |
| 2003/0188299 A1 | 10/2003 | Broughton et al. | 717/141 |
| 2003/0204838 A1 * | 10/2003 | Caspole et al. | 717/130 |
| 2004/0111715 A1 * | 6/2004 | Stone | 717/148 |
| 2004/0133892 A1 | 7/2004 | Emma et al. | 718/104 |
| 2004/0268330 A1 | 12/2004 | Grover et al. | 717/146 |
| 2005/0125779 A1 * | 6/2005 | Kelley et al. | 717/138 |
| 2005/0187663 A1 | 8/2005 | Heidemann et al. | 700/266 |
| 2005/0204368 A1 | 9/2005 | Ambekar et al. | 719/328 |
| 2005/0240931 A1 * | 10/2005 | Padisetty et al. | 718/100 |
| 2005/0262506 A1 * | 11/2005 | Dawson et al. | 718/100 |
| 2005/0289286 A1 | 12/2005 | Ohwada | 711/1 |
| 2006/0031506 A1 | 2/2006 | Redgate | 709/226 |
| 2006/0098018 A1 | 5/2006 | Tarditi et al. | 345/505 |
| 2006/0101427 A1 * | 5/2006 | Yamada et al. | 717/136 |
| 2006/0129512 A1 | 6/2006 | Braun et al. | 707/1 |
| 2006/0149842 A1 * | 7/2006 | Dawson et al. | 709/226 |
| 2006/0190794 A1 | 8/2006 | Murata | 714/742 |
| 2006/0190935 A1 | 8/2006 | Kielstra et al. | 717/148 |
| 2006/0242627 A1 * | 10/2006 | Wygodny et al. | 717/130 |
| 2007/0011522 A1 | 1/2007 | Denniston | 714/724 |
| 2007/0079298 A1 | 4/2007 | Tian et al. | 717/140 |
| 2007/0130568 A1 * | 6/2007 | Jung et al. | 718/104 |
| 2007/0169005 A1 * | 7/2007 | Drepper | 717/131 |
| 2007/0169019 A1 | 7/2007 | Leino et al. | 717/136 |
| 2007/0169024 A1 * | 7/2007 | Drepper | 717/139 |
| 2007/0226714 A1 | 9/2007 | Doi | 717/48 |
| 2007/0294666 A1 * | 12/2007 | Papakipos et al. | 717/119 |
| 2007/0294671 A1 | 12/2007 | Demetriou | 717/124 |
| 2008/0178163 A1 | 7/2008 | Gschwind et al. | 717/140 |
| 2008/0276232 A1 * | 11/2008 | Aguilar et al. | 717/149 |
| 2009/0313526 A1 * | 12/2009 | Neuman | 714/758 |

OTHER PUBLICATIONS

Schmidt, D., "ASX: An Object-Oriented Framework for Developing Distributed Application," Department of Information and Computer Science, University of California, Irvine, pp. 1-17.
International Search Report and Written Opinion for PCT/US2007/071600 dated Aug. 25, 2008.
Office Action for U.S. Appl. No. 11/715,583 dated Aug. 13, 2008.
Aral et al., *Efficient debugging primitives for multiprocessors*, IEEE, 1989, pp. 87-95.
Browne et al, *Visual Programming and Debugging for Parallel Computing*, IEEE, 1995, pp. 75-83.
Huband et al, *Debugging parallel programs using incomplete information*, IEEE, 1999, pp. 1-9.
LeBlanc, *Parellel Program Debugging*, IEEE, 1989, pp. 65-66.
Stringhini et al., *Parallel Program Debugging: Interface design and implementation*, IEEE, 2004, pp. 43-50.
Woloschuk et al., *Performance Debugging in the Enterprise Parellel Programming System*, Department of Computing Science, University of Alberta, 1995, pp. 1-12.
Final Office Action, U.S. Appl. No. 11/714,583, May 6, 2009, 12 pages.
Office Action, U.S. Appl. No. 11/714,583, Jan. 22, 2010, 14 pages.
Notice of Allowance, U.S. Appl. No. 11/714,583, Jun. 1, 2010, 17 pages.
Charalambous, *Initial Experiences Porting a Bioinformatics Application to a Graphics Processor*, PCI 2005, LNCS 3740, Springer-Verlag, Berlin Heidelberg, pp. 415-425.
Notice of Allowance, U.S. Appl. No. 11/714,629, Feb. 24, 2011, 7 pgs.
Office Action, U.S. Appl. No. 11/714,582, Feb. 18, 2011, 28 pgs.
Office Action, U.S. Appl. No. 11/714,592, Feb. 22, 2011, 46 pgs.
Office Action, U.S. Appl. No. 11/714,619, Sep. 17, 2010, 27 pgs.
Office Action, U.S. Appl. No. 11/714,630, Oct. 14, 2010, 26 pgs.
Office Action, U.S. Appl. No. 11/714,654, Feb. 18, 2011, 22 pgs.
Office Action, U.S. Appl. No. 11/716,508, Sep. 17, 2010, 12 pgs.
Govindaraju et al., "Fast Computation of Database Operations Using Graphics Processors," ACM, Jun. 13-18, 2004, 12 pgs.
Larsen et al., "Fast Matrix Multiplies Using Graphics Hardware," ACM, Nov. 2001, 6 pgs.
McGuire, U.S. Appl. No. 11/714,619, Mar. 5, 2007, Office Action mailed Mar. 15, 2011, 17 pgs.
Tuck, U.S. Appl. No.11/716,508, Mar. 9, 2007, Office Action mailed Apr. 1, 2011, 11 pgs.
Papakipos, U.S. Appl. No. 11/714,630, Mar. 5, 2007, Office Action mailed Apr. 14, 2011, 16 pgs.
Papakipos, U.S. Appl. No. 11/714,582, Notice of Allowance mailed Aug. 8, 2011, 5 pgs.
Papakipos, U.S. Appl. No. 11/714,592, Notice of Allowance mailed Aug. 8, 2011, 5 pgs.
Crutchfield, U.S. Appl. No. 11/714,654, Notice of Allowance mailed Sep. 26, 2011, 11 pgs.

* cited by examiner

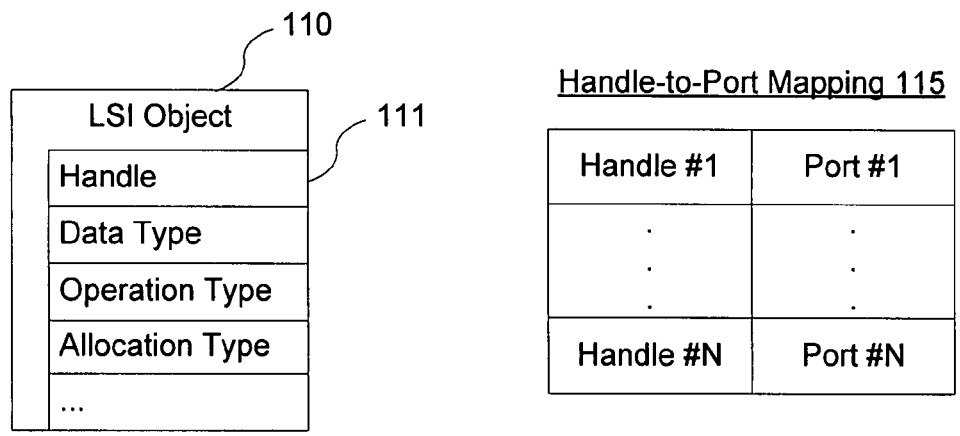
Figure 2A
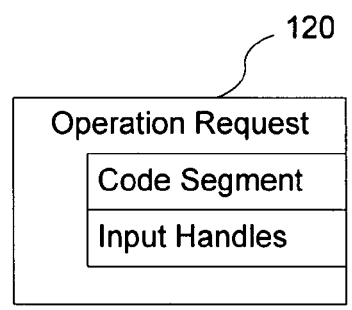
Figure 2B
| Shared Buffer Table 130 ||
|---|---|
| Buffer Name | Buffer Location |
| ... | ... |
| Buffer Name | Buffer Location |
| Application Buffer Table 132 ||
|---|---|
| Buffer Name | Buffer Location |
| ... | ... |
| Buffer Name | Buffer Location |
| Buffer Table 134 |||
|---|---|---|
| Buffer Name | Buffer Location | Buffer Ownership |
| ... | ... | ... |
| Buffer Name | Buffer Location | Buffer Ownership |
Figure 2C

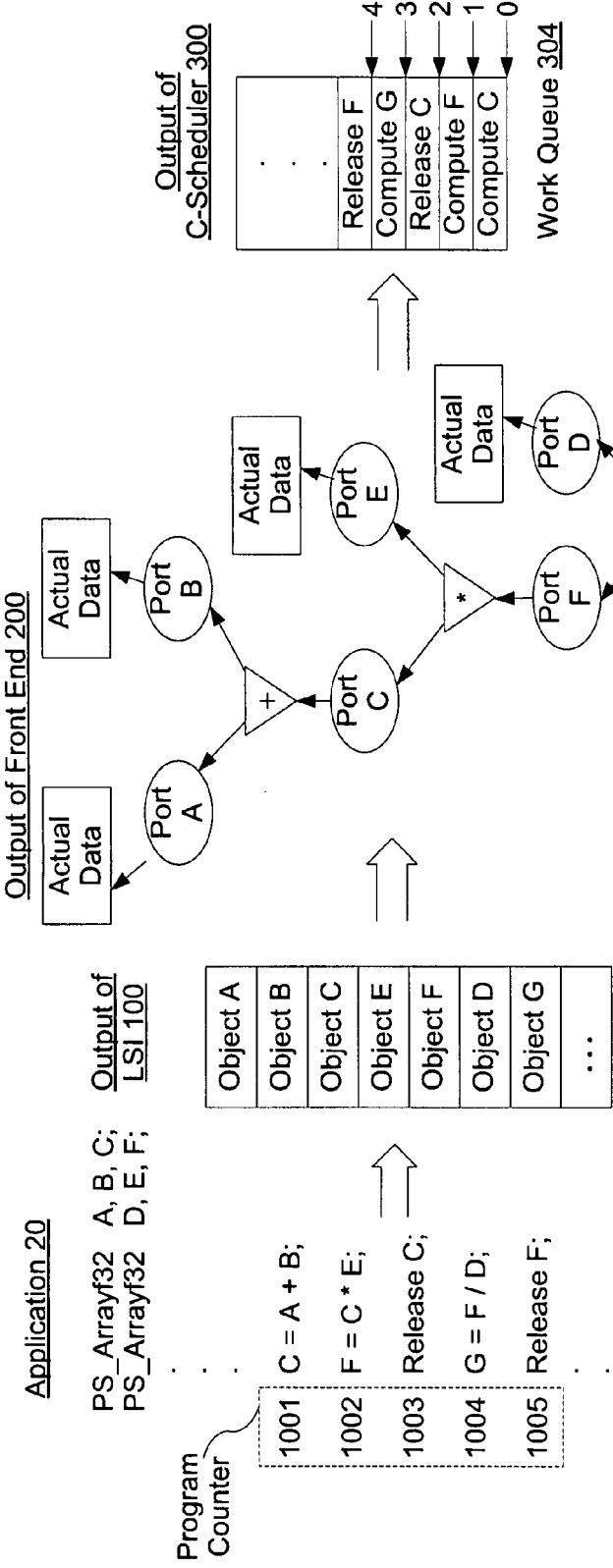

Trace Cache Key Data Structure

| Trace Cache Key 410 |
|---|
| Number of work queue entries represented by the key       410-1 |
| Accumulated key data       410-2 |
| Size of the accumulated key data       410-3 |
| Program sequence re-instantiation information 410-4 |
| Starting program counter (optional)       410-5 |

Figure 4B

Macro Cache Data Structure

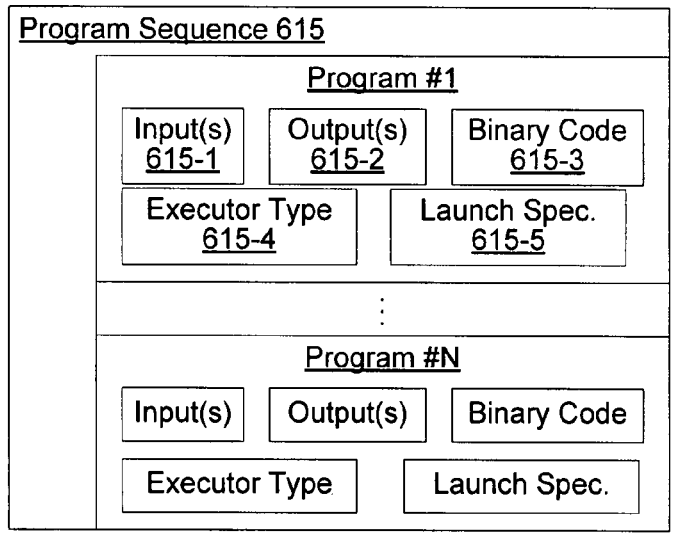

Figure 6B

```
sampler in0, in1, in2, in3;

PS_OUTPUT main(pos:VPOS) { float4 tmp0;
    tmp0 = tex2D(in0, pos); // tmp0 is an element of Array A;

float4 tmp1;
    tmp1 = tex2D(in1, pos); // tmp1 is an element of Array B;

float4 tmp2;
    tmp2 = tex2D(in2, pos); // tmp2 is an element of Array D;

float4 tmp3;
    tmp3 = tex2D(in3, pos); // tmp3 is an element of Array E;

float4 tmp4;
    tmp4 = tmp0 + tmp1; // C = A + B;

float4 tmp5;
    tmp5 = tmp4 * tmp3; // F = C * E;

float4 tmp6;
    tmp6 = tmp5 / tmp2; // G = F / D;

PS_OUTPUT po;
    po.color0 = tmp6;

return po;
}
```

Figure 6C

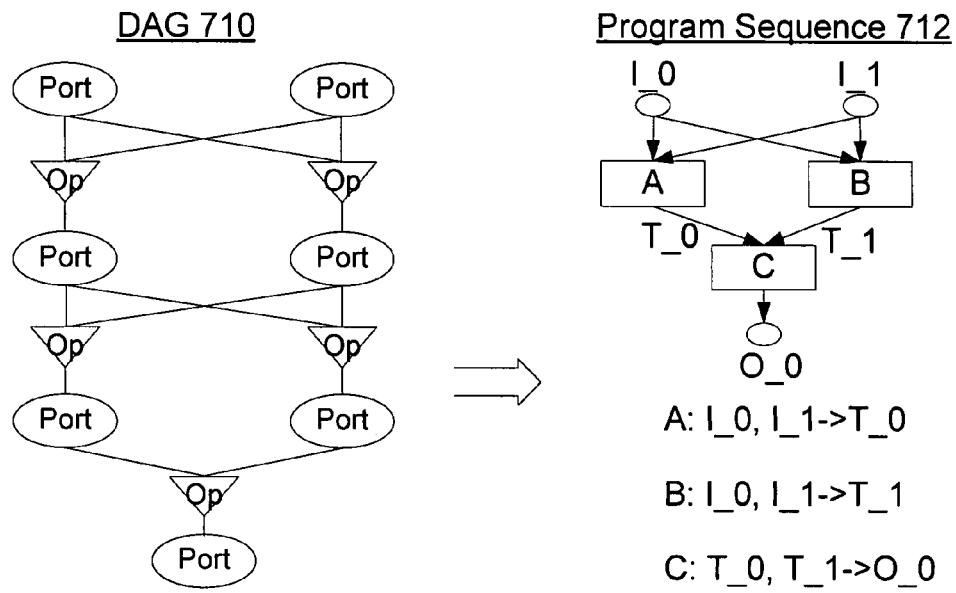

A: I_0, I_1->T_0

B: I_0, I_1->T_1

C: T_0, T_1->O_0

```
Pseudo code 714 for populating a pending operation table

For each program in the program sequence {
    for each output of the program {
        generate a new entry in the pending operation table (POT);
    }                                                                /—715
    if (any input of the program not ready) {
        associate the program with the POT entry of the input;
    } else {
        send the program to an executor;
    }
}
```

```
Pseudo code 716 for processing a pending operation table

For each output of the program {
    Remove the POT entry of the output of the program;

For each operation that had been pending on the just-completed output
{                                                                    /—717
        If (any input of the operation not ready) {
            associate the operation with the POT entry of the input;
        } else {
            send the operation to an executor;
        }
    }
}
```

Figure 7B

Result Comparison

C_opt: the optimized result generated by the runtime system

C_ref: the reference result generated by the runtime system

For each element in the C_opt and C_ref { allowed_error = |Scale * C_ref|;

if (allowed_error < MIN_ERR) {
        allowed_error = MIN_ERR;
    } if (|C_ref – C_opt| > allowed_error) {
        Generate a mismatch signal;
    }
}

Return the mismatch signal(s) to the end user;

SYSTEMS AND METHODS FOR CACHING COMPUTE KERNELS FOR AN APPLICATION RUNNING ON A PARALLEL-PROCESSING COMPUTER SYSTEM

RELATED APPLICATIONS

This application claims priority to U.S. provisional Patent Application 60/815,532, "Systems and Methods for High Performance Computing Using Stream Processors", filed on Jun. 20, 2006, which is hereby incorporated by reference in its entirety.

This application claims priority to U.S. provisional Patent Application 60/903,188, "Programming Tools for a High-Performance Computing System", filed on Feb. 23, 2007, which is hereby incorporated by reference in its entirety.

This application relates to U.S. patent application Ser. No. 11/714,592, "Systems and methods for determining compute kernels for an application in a parallel-processing computer system", filed on Mar. 5, 2007, which is hereby incorporated by reference in its entirety.

This application relates to U.S. patent application Ser. No. 11/714,591, "A runtime system for executing an application in a parallel-processing computer system", filed on Mar. 5, 2007, which is hereby incorporated by reference in its entirety.

This application relates to U.S. patent application Ser. No. 11/714,619, "An application program interface of a parallel-processing computer system that supports multiple programming languages", filed on Mar. 5, 2007, which is hereby incorporated by reference in its entirety.

This application relates to U.S. patent application Ser. No. 11/714,654, "Systems and methods for dynamically choosing a processing element for a compute kernel", filed on Mar. 5, 2007, which is hereby incorporated by reference in its entirety.

This application relates to U.S. patent application Ser. No. 11/714,630, "Systems and methods for generating reference results using a parallel-processing computer system", filed on Mar. 5, 2007, which is hereby incorporated by reference in its entirety.

This application relates to U.S. patent application Ser. No. 11/714,629, "Systems and methods for debugging an application running on a parallel-processing computer system", filed on Mar. 5, 2007, which is hereby incorporated by reference in its entirety.

This application relates to U.S. patent application Ser. No. 11/714,582, "Systems and methods for compiling an application for a parallel-processing computer system", filed on Mar. 5, 2007, which is hereby incorporated by reference in its entirety.

This application relates to U.S. patent application Ser. No. 11/714,583, "A multi-thread runtime system", filed on Mar. 5, 2007, which is hereby incorporated by reference in its entirety.

FIELD OF THE INVENTION

The present invention relates generally to the field of parallel computing, and in particular, to systems and methods for high-performance computing on a parallel-processing computer system including multiple processing elements that may or may not have the same processor architecture.

BACKGROUND OF THE INVENTION

Today, a parallel-processing computer system including one or more processors and/or coprocessors provides a tremendous amount of computing capacity. But there is lack of an efficient, stable, robust, and user-friendly software development and execution platform for such computer system. Therefore, there is a need for a software development and execution platform that provides an easy-to-use program interface and rich library resources, supports program debugging and profiling, and enables the execution of the same program on any types of parallel-processing computer system.

BRIEF DESCRIPTION OF THE DRAWINGS

For a better understanding of the nature and embodiments of the invention, reference should be made to the Description of Embodiments below, in conjunction with the following drawings in which like reference numerals refer to corresponding parts throughout the figures.

FIGS. 2A through 2I illustrate the operation of the Language-Specific Interface and the Front End of the runtime system according to some embodiments of the present invention.

FIGS. 4A through 4D illustrate the operation of the trace cache 400 of the runtime system according to some embodiments of the present invention.

FIGS. 6A through 6E illustrate the operation of the program generator of the runtime system according to some embodiments of the present invention.

FIGS. 7A through 7E illustrate the operation of the execution scheduler and the executors of the runtime system according to some embodiments of the present invention.

FIGS. 9A through 9C illustrate the operation of the program debugger of the runtime system according to some embodiments of the present invention.

Like reference numerals refer to corresponding parts throughout the several views of the drawings.

DESCRIPTION OF EMBODIMENTS

Figure 1:
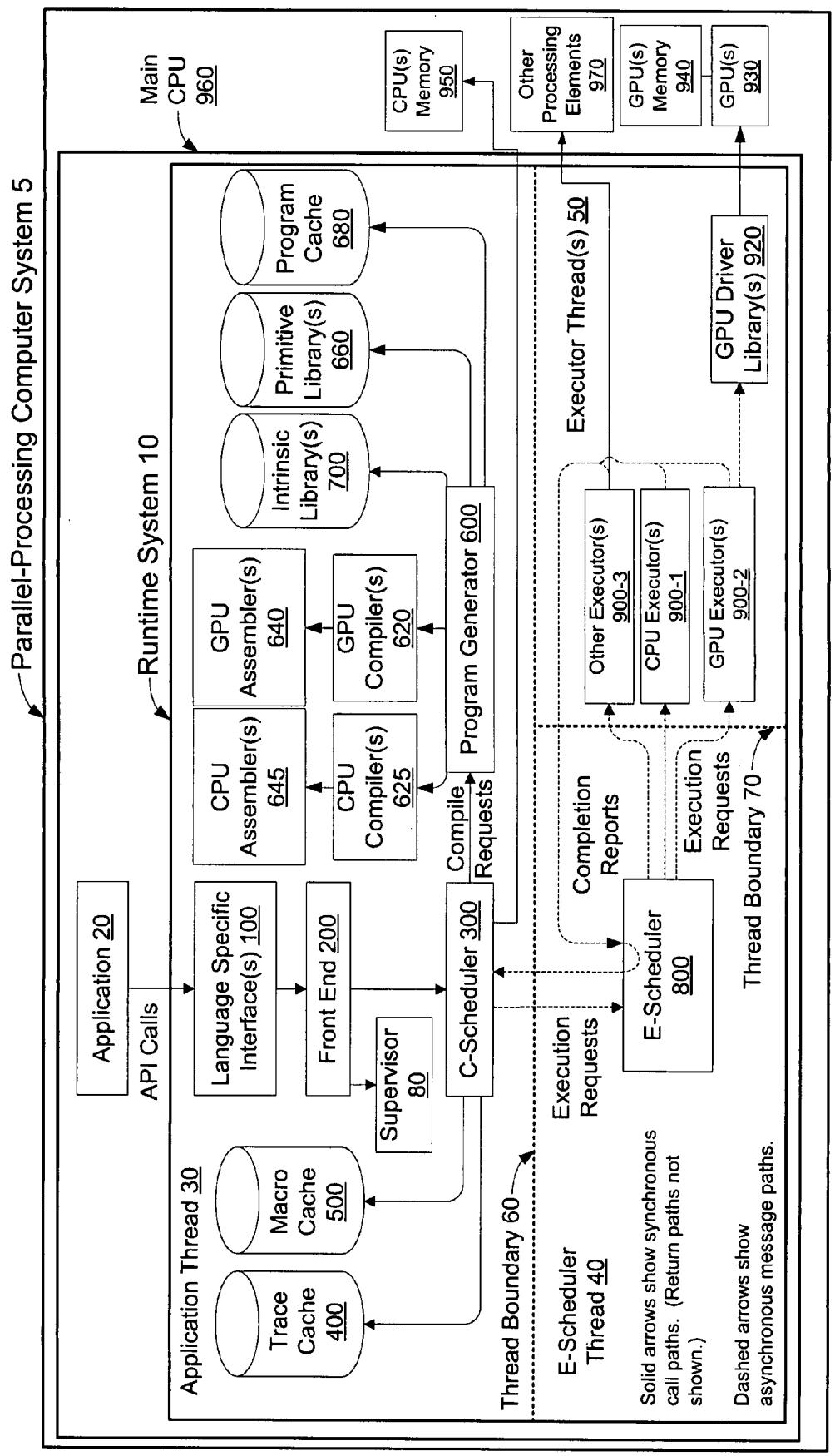
FIG. 1 is an overview block diagram of a runtime system running on a parallel-processing computer system according to some embodiments of the present invention.

In some embodiments, a method for caching compute kernels for an application running on a parallel-processing computing system includes: receiving one or more operation requests directed to a parallel-processing computer system, wherein the parallel-processing computer system includes multiple processing elements; dynamically choosing one or more of the processing elements for at least a subset of the one or more operation requests; and identifying one or more previously compiled compute kernels for the subset of operation requests, wherein the identified previously compiled compute kernels are configured to execute on the dynamically chosen one or more processing elements.

In some embodiments, a system for caching compute kernels for an application running on a parallel-processing computing system includes: a front end configured to receive one or more operation requests directed to a parallel-processing computer system, wherein the parallel-processing computer system includes multiple processing elements; and a compiler scheduler configured to dynamically choose one or more of the processing elements for at least a subset of the one or more operation requests and identify one or more previously compiled compute kernels for the subset of operation requests, wherein the identified previously compiled compute kernels are configured to execute on the dynamically chosen one or more processing elements.

System Overview

Reference will now be made in detail to embodiments, examples of which are illustrated in the accompanying drawings. In the following detailed description, numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments. For example, it will be apparent to one of ordinary skill in the art that the subject matter presented herein can be implemented on any type of parallel-processing computer system containing any types of processing elements including processors and/or coprocessors, although embodiments described below are related to particular types such as graphics processing units (GPUs) and multi-core CPUs.

The term "parallel-processing computer system" herein refers to a computing system that is capable of performing multiple operations simultaneously. A parallel-processing computer system may contain one or more processing elements including, but not limited to, processors and coprocessors, which may be deployed on a single computer or a plurality of computers linked (wired and/or wireless) by a network in a cluster or grid or other types of configuration. In some embodiments, a processing element includes one or more cores, which may share at least a portion of the same instruction set or use completely different instruction sets. The cores within a processing element may share at least a portion of a common memory space and/or have their own memory spaces. Mechanisms used to implement parallel execution of the operations include, but are not limited to, multiple-instruction-multiple-data (MIMD) execution of multiple instruction sequences, single-instruction-multiple-data (SIMD) execution of a single instruction sequence, vector processing, pipelining, hardware multi-threading, very-long-instruction-word (VLIW) or explicitly-parallel-instruction-computing (EPIC) instructions, superscalar execution, and a combination of at least two of the aforementioned mechanisms. The parallel-processing computer system as a whole may use a single system image, multiple system images, or have no underlying operating system.

In some embodiments, a processing element or a core within a processing element may or may not run an operating system or a virtual machine monitor (e.g., hypervisor) that manages one or more operating systems running on a computer system at the same time. Examples of such processors and coprocessors include graphics processing units (GPUs) by nVidia and ATI, single-core and multiple-core x86 and Itanium processors by Intel, single- and multiple-core x86 and x86-64 processors by AMD, single-core and multiple-core PowerPC processors by IBM, the Cell processor by STI, the Niagara processor by Sun Microsystems, and the Threadstorm processor or X1E multi-streaming processor by Cray, Inc.

In some embodiments, a processing element may be a thread running on a physical processor or virtual machine such as application-level threads, kernel threads, or hardware threads. In some other embodiments, a processing element may be a virtual machine running inside a hypervisor. In other embodiments, a processing element may be a functional unit within a physical processor or a virtual machine.

FIG. 1 is an overview block diagram of a runtime system 10 running on a parallel-processing computer system 5 according to some embodiments of the present invention. For illustrative purpose, the parallel-processing computer system 5 includes at least one primary processor (e.g., main CPU 960 with its associated CPU memory 950) and at least one secondary processor (e.g., GPU 930 with its associated GPU memory 940). But it will be apparent to one skilled in the art that the runtime system 10 can be implemented on any type of parallel-processing computer systems as described above. There are multiple components within the runtime system 10 and they all run on the main CPU 960. Note that the sign "(s)" associated with any component indicates that there are one or more instances of such component. For example, the symbol "CPU Compiler(s) 625" means that the runtime system 10 may include one or more CPU compilers, one for each type of CPU. But a symbol without the sign "(s)" by no means suggests that there can only be one instance of the corresponding component. In this case, the symbol is merely an abstractive characterization of the functions performed by the component. For example, the symbol "Program Generator 600" indicates that this component is responsible for program generation in the runtime system 10.

It will be apparent to one skilled in the art that the embodiments described in detail below in connection with FIG. 1 are only for illustrative purpose. For example, FIG. 1 depicts that the different components of the runtime system 10 run on the same main CPU 960. In other embodiments, the different components may run on multiple physical processing elements of the same parallel-processing computer system or multiple computers that are connected via a network or a combination thereof. Communication mechanisms known in the art can be employed to ensure that information be exchanged among the different processing elements and computers accurately and efficiently.

At run-time, an application 20 invokes the runtime system 10 by calling into one of its Language-Specific Interfaces (LSI) 100 to perform operations predefined in the application 20. In some embodiments, the LSI 100 includes multiple modules, each module providing an Application Program Interface (API) to the runtime system 10 for applications written in a specific programming language. The runtime system 10 is configured to spawn zero or more threads, initialize one or more processing elements including processors, coprocessors, processor/coprocessor cores, functional units, etc., as necessary, and execute compute kernels associated with the predefined operations on the processing elements accessible to the runtime system 10. In some embodiments, a compute kernel is an executable program or subroutine that runs on one or more processing elements that are part of a parallel processing computer system to perform all or parts of one or more operation requests. In some embodiments, the runtime system 10 includes dynamically linked libraries, static libraries, or a combination of both types of libraries. In some embodiments, the runtime system 10 includes one or more standalone programs that run independently of user applications, with which the other components of the runtime system 10 (e.g., its libraries) communicate.

From the runtime system's user's perspective, the aforementioned approach has multiple advantages. First, it allows easy porting of existing applications from one programming language to another language. Second, it allows easy integration of the runtime system's libraries with other standard libraries such as Math Kernel Library (MKL) and Message Passing Interface (MPI). For example, data are easily passed between the runtime system's libraries and other standard libraries called from the application 20 through the computer hardware's main system memory. This is important because many applications rely at least in part on these standard libraries. Third, this approach allows the source code of the application 20 to be compiled using existing compilers. Fourth, this approach is highly compatible with existing software development tools. Standard tools such as debuggers, profilers, code coverage tools, etc., can be easily integrated with the runtime system 10. Finally, an application 20 that runs on an older version of the runtime system 10 can be executed on a new version of the runtime system 10 without being re-compiled. This feature enables the application to benefit from any features developed in the new generations of parallel-processing computer systems.

The runtime system 10 supports programming development using multiple programming languages. In some embodiments, the application 20 can be written in different programming languages including C, C++, Fortran 90, MatLab, and the like. For each programming language, the corresponding LSI module in the LSI 100 binds the application 20 with the rest of the runtime system 10. Because of the LSI 100, the Front End 200 (FE) of the runtime system 10 can be invoked by applications written in different programming languages, without the need to have multiple front ends, one for each programming language.

In some embodiments, the LSI module for a programming language includes functions, procedures, operators (if the language supports operator overloading), macros, constants, objects, types, and definitions of other language constructs, which represent common mathematical and I/O operations, operations supported by the runtime system 10, values of special significance (e.g., PI), objects manipulated by the runtime system 10, and so on. The application 20 uses the functions, procedures, operators, etc. defined by the LSI 100 to request that the runtime system 10 perform the operations specified in the application. The LSI 100 captures and marshals each of these requests, including its kind, its arguments, and any other information used for error-handling, debugging, or profiling purposes (e.g., an API call's address or its return address), and passes the request to the Front End 200 (FE) of the runtime system 10.

In some embodiments, the LSI 100 uses a functional programming model in which the result (e.g., an array) is returned by each operation. In some other embodiments, the LSI 100 implements an imperative programming model in which each operation overwrites one of its operands, which is similar to many existing mathematical libraries. In other embodiments, the LSI 100 adopts a programming model that is a combination of the two models.

The LSI 100 may operate on its own data types, such as array objects, or on native data types, or a combination of the two. If the LSI 100 operates on its own data types, native data types in the application 20 may be explicitly converted to the LSI's own data types (e.g., using a function that takes an operand using a native data type and returns an object of the corresponding LSI data type). In some embodiments, the programming language associated with the application 20 may arrange for the conversion to be performed without it having been explicitly requested by the application.

In some embodiments, the use of the LSI's own data types has several advantages over native data types. First, it facilitates the use of data representations in the FE 200 that are different from the native representations of data in the programming language. Second, the use of opaque data types that require conversion back to native data types to be operated on outside the runtime system 10 facilitates progressive evaluation, in which the processing of requests to the FE 200 may be deferred and batched for more efficient processing. Finally, the use of opaque data types facilitates the use of memory by the runtime system 10 that is not directly accessible to the application 20, such as the memory on a GPU board.

In some embodiments, to simplify memory management, the LSI 100 has facilities to mark the scope in which an object can be accessed. For example, the C++ LSI module does this using object constructors and object destructors, which define the scopes of respective individual objects by notifying the FE 200 of each object's creation and destruction. The C LSI module uses explicit function calls such as begin_scope( ) and end_scope( ) to define the scopes of objects created between the two function calls. Some embodiments may support explicit object creation and destruction calls rather than, or in addition to, these scoping constructs.

In some embodiments, the FE 200 is responsible for invoking the supervisor 80. The supervisor 80 is configured to start up some other components of the runtime system 10 at the beginning of executing the application 20. In response, some components invoke their own modules to create their own threads. At the conclusion of the execution, the supervisor 80 is responsible for shutting down these components and killing threads associated with these components.

In some embodiments, the FE 200 processes some requests from the LSI 100 immediately but defers processing some other requests for progressive evaluation in batches. For each deferred request, the FE 200 is responsible for generating one or more intermediate representation (IR) nodes, each IR node representing an operation to be performed by the runtime system 10. Generally, the term "intermediate representation" refers to a data structure that is constructed from input data to a program, and from which part or all of the output data of the program is constructed in turn. In this application, an IR node has information identifying its type, arguments, and optionally information used for error-handling, debugging, or profiling purposes, such as the address of an API call in the application 20 corresponding to a request to the LSI 100, or its return address. These IR nodes are used by other components of the runtime system 10 (e.g., the program generator 600) to generate compute kernels to be executed on the parallel-processing computer system. In some embodiments, the IR nodes include information used for generating optimized compute kernels for the different types of processing elements of the parallel-processing computer system.

Below is a table including exemplary types of IR nodes generated by the FE 200.

| | |
|---|---|
| Map | A map operation takes one or more arrays as input and returns another array, e.g., adding two arrays element-by-element. |
| Reduce | A reduce operation takes one or more arrays and reduces values in one or more dimensions to a |

| | |
|---|---|
| | single value, e.g., finding the maximum value of each column of a 2-D array. |
| Generator | A generator operates on seed data and produces data arrays from the seed data, e.g., generating an array of pseudo-random numbers, or assigns predefined values at predefined locations of an array, e.g., generating an identity matrix. |
| View | A view operation changes the interpretation of an array, e.g., matrix transpose, or performs a copy. |
| Intrinsic operation | An intrinsic operation is a pre-compiled, high-performance operation on data types such as array, e.g., matrix multiplication, Fast Fourier Transform (FFT), etc. |

In some embodiments, the compilation scheduler 300 (C-Scheduler) takes the IR nodes generated by the FE 200, buffers them in a data structure called a "work queue" 304, and according to a predefined schedule, requests that the ProgGen 600 generate one or more compiled programs corresponding to the IR nodes. A compiled program is also referred to as a "compute kernel" that includes executable binary code for one of the processing elements of the parallel-processing computer system. Therefore, a compiled program sequence corresponds to a sequence of compute kernels, which may correspond to one or more processing elements. For convenience, the two terms, "compiled program" and "compute kernel", are used interchangeably in this application.

The ProgGen 600 returns to the C-Scheduler 300 a sequence of compiled programs corresponding to the IR nodes. In some embodiments, the ProgGen 600 generates multiple copies of compiled programs, one for each type of processing element of the parallel-processing computer system for executing the compiled programs. The C-Scheduler 300 then submits the sequences of compiled programs to the execution scheduler 800 (E-Scheduler) to arrange for execution of the compiled programs on the respective processing element(s).

To improve its performance, the runtime system 10 includes two caches, the trace cache 400 and the macro cache 500. In some embodiments, the operation of the trace cache 400 is transparent to the application 20. A developer does not have to make any special arrangement to invoke the trace cache 400. The C-Scheduler 300 automatically caches program sequences generated by the ProgGen 600 in the trace cache 400. Therefore, the trace cache 400 can reduce the runtime system's compilation overhead by comparing the incoming IR nodes from the FE 200 with the previously generated program sequences that are stored in the trace cache and reusing the program sequences whenever possible.

In some embodiments, upon receiving a set of IR nodes from the FE 200, the C-Scheduler 300 checks the trace cache 400 for the previously compiled program sequences that correspond to the same set of IR nodes or a subset thereof and re-uses the pre-compiled program sequences.

In some embodiments, the C-Scheduler 300 automatically starts searching the trace cache 400 for compiled program sequences that match a set of IR nodes that the C-Scheduler 300 has accumulated whenever a predefined condition is met (e.g., the set of IR nodes correspond to at least a predefined number of application function API calls). When such condition is met, the C-Scheduler does not or cannot verify whether processing the set of IR nodes can yield the best performance that the application 20 can achieve. For example, the C-Scheduler 300 may start searching the trace cache 400 even if the last IR node in the set corresponds to an API call in the middle of a for-loop structure in the application 20.

The macro cache 500 offers an alternative solution to this problem by allowing an application developer to explicitly define a code macro in the application 20. Note that the term "code macro" and "code reuse section" are used interchangeably throughout this application. One rationale for using the macro cache 500 is that processors usually perform better when handling a sequence of computationally intensive operations. Therefore, it is advantageous for the application developer to group multiple (e.g., dozens or even hundreds of) computationally intensive operations in the application 20 together using keywords provided or accepted by the runtime system 10. These keywords provide clear instructions to the runtime system 10 (in particular, the C-Scheduler 300) as to which set of IR nodes should be processed together to achieve better performance.

In some embodiments, the number of operations packaged within a macro is heuristic-based. For example, the number of operations that the ProgGen 600 is likely to combine into a single compiled program (also known as a "compute kernel") can be used to determine the size of the macro. The macro cache 500 enables the developer to specify a set of API calls to be compiled into one or more program sequences once by the ProgGen 600, which are stored in the macro cache 500 and repeatedly invoked subsequently as a macro group. This feature substantially reduces the API call overhead because only one API call is required per macro group invocation rather than one API call per operation.

In some embodiments, when a code reuse section of API calls is first invoked, the C-Scheduler 300 and the ProgGen 600 treat the code reuse section like other regular API calls. The only difference is that the compiled program sequences corresponding to the code reuse section are stored in the macro cache 500, not the trace cache 400. Upon receiving subsequent invocations of the same code reuse section by the application 20, the C-Scheduler 300 retrieves the compiled program sequences from the macro cache 500 and executes them accordingly.

In some embodiments, the IR nodes generated by the FE 200 are organized into a directed acyclic graph (DAG). The ProgGen 600 transforms the DAG into one or more sequences of compiled programs (i.e., compute kernels) to be executed on a parallel-processing computer system. In some embodiments, each compiled program sequence is itself a DAG.

In some embodiments, the operation requests from an application correspond to one of two types of operations: (i) intrinsic or (ii) primitive. An intrinsic operation includes one or more programs or functions. In some embodiments, these programs and functions are hand-coded for a specific type of processor such as GPU to unleash its parallel-processing capacity. Examples of intrinsic operations include matrix multiplication, matrix solvers, FFT, convolutions, and the like. As shown in FIG. 1, the intrinsic operations are stored in the intrinsic library 700. In some embodiments, these intrinsic operations are highly optimized and may or may not be fully pre-compiled. At run time, for an IR node associated with an intrinsic operation, the ProgGen 600 invokes a processor-specific, hand-crafted routine from the intrinsic library 700 and constructs one or more program sequences to implement the operation specified by the IR node.

In some embodiments, primitive operations correspond to element-wise data array operations, such as arithmetic operations and trigonometric functions. For IR nodes associated with primitive operations, the ProgGen 600 dynamically generates processor-specific program sequences that perform the operations prescribed by the IR nodes. For example, to generate a program sequence for a GPU, the ProgGen 600 performs a lookup in the primitive library 660 for a primitive operation's source code, combines the source code with source code associated with other primitive operations, and invokes the GPU compiler 620 and the GPU assembler 640 to generate executable binary code for the GPU. Similarly, to generate a program sequence for a multi-core CPU, the ProgGen 600 retrieves from the primitive library 660 source code corresponding to one or more primitive operations and invokes the CPU compiler 625 and the CPU assembler 645 to generate executable binary code on the multi-core CPU. In some embodiments, the source code for either GPU or CPU is preprocessed before compilation. In some embodiments, dynamic linking and/or loading of the binary code for either GPU or CPU into memory follows the assembly operation. One skilled in the art would understand that this compilation process may be implemented by fewer individual steps than discussed here, such as by directly generating lower-level program representations, by combining steps, or by restricting functionality.

In some embodiments, library routines corresponding to the primitive operations are also hand-coded and highly optimized. In some embodiments, they are highly accurate. In some embodiments, the primitive operations are stored in the primitive library 660 as source code rather than as assembly code or binary code, to facilitate dynamic insertion into programs by the ProgGen 600.

The ProgGen 600 generates compiled program sequences for processing elements of the parallel-processing computer system in response to API calls in the application 20. The program sequences are then executed on processing elements of the parallel-processing computer system (e.g., a GPU or multi-core CPUs). In some embodiments, the performance of the runtime system 10 depends on the computational intensity of a compute kernel, which is measured by the number of operations executed between two consecutive memory accesses (also known as the program sequence's "operation/memory-access ratio").

Generally, different types of IR nodes have different operation/memory-access ratios. For example, a map operation could perform as little as one operation per element, which cannot saturate a typical processor's capacity if executed naively, in isolation. Reduce operations share the same problem because they also have low operation/memory-access ratios. In some embodiments, a compute kernel prepared by the ProgGen 600 for a specific type of processing elements (e.g., GPUs or multi-core CPUs) corresponds to one or more IR nodes. A compute kernel with a high operation/memory-access ratio is therefore more efficient when being executed on a particular processing element and vice versa.

Conventionally, it is an application developer's responsibility for putting the API calls in an application into different groups that may correspond to different compute kernels being executed by the runtime system. To achieve best performance, the developer has to understand how the runtime system prepares compute kernels for different types of processing elements and group the API calls differently for different processing elements. This approach is also referred to as "kernel-style programming". One of the significant disadvantages with this approach is that the compute kernels prepared by the developer are less optimal for a specific type of processing elements and therefore result in poor performance of the runtime system.

The ProgGen 600 solves this problem through a process called "automatic compute kernel analysis". In some embodiments, the ProgGen 600 automatically determines which set of IR nodes should correspond to a compute kernel targeting a specific type of processing elements based on the IR nodes' associated operation/memory-access ratios. For example, the ProgGen 600 first estimates the ratios of the IR nodes currently in the work queue and attempts to merge operations into the compute kernel until the operation/memory-access ratio of the compute kernel exceeds a predefined threshold. One of the exemplary methods is the loop fusion with scalar replacement, which is the process of merging back-to-back array operations into a reduced number of separate array operations so as to decrease memory accesses and thereby increase the operation/memory-access ratio. As a result, the application developer is responsible for specifying what operations should be performed by the runtime system in the application. The application prepared in such manner is portable across different types of processing element architectures with good performance.

In some embodiments where the ProgGen 600 invokes a GPU assembler, the output programs of the ProgGen 600 are in the GPU binary instruction set architecture (ISA) format, which requires no further compilation, assembly, or linking before being loaded and executed on a GPU processor. Consequently, the GPU programs can be deployed on the GPU(s) significantly faster. This approach also allows the intrinsic operations and the ProgGen-generated programs to implement GPU-specific optimizations at the machine language level for significant performance gains. Note that different types of GPUs (e.g. ATI and nVidia GPUs) have different ISAs, which can be supported by a simple embodiment.

The execution scheduler 800 (E-Scheduler) has two main functions. First, it dispatches compiled programs to respective executors 900 at run time. In some embodiments, the E-Scheduler 800 is responsible for synchronizing the computational tasks at different executors 900. It ensures that data buffers are in the correct place (i.e., available) before an operation that uses them is allowed to proceed. Second, the E-Scheduler 800 schedules (and in some cases performs) data-array movement. In some embodiments, the E-Scheduler 800 is responsible for transferring data arrays between the application 20 and the runtime system 10. For example, it performs scatter-type and gather-type I/O operations to meet the application's data layout requirements.

The executors 900 are responsible for executing the compiled programs they receive from the E-Scheduler 800. Depending on a processing element's architecture, the runtime system 10 may include multiple types of executors, one for each type of processor of the parallel-processing computer system. A GPU executor 900-2 manages the execution of compiled compute kernels on a particular GPU that the GPU executor 900-2 is associated with. It keeps the GPU's input buffer as full as possible by submitting many operations and overlapping the execution of certain compute and I/O operations. A multi-GPU computer hardware platform may include more than one GPU executor 900-2. Each GPU executor 900-2 manages I/O operations between the CPU and the GPU, performs GPU memory allocation/de-allocation, and swaps memory in the low-memory situations.

A CPU executor 900-1 plays a role analogous to that of a GPU executor 900-2. In some embodiments, the CPU executor 900-1 is configured to manage operations that can be performed more efficiently on single-core or multi-core CPUs. For example, a CPU may be a preferred choice for handling double-precision calculations. In some embodiments, if the GPUs become at least temporarily or permanently less available for some reasons, the runtime system 10 automatically invokes the CPU executor 900-1 to handle the workload normally handled by the GPUs. In some other embodiments, the runtime system 10 may transfer some workload from the CPU side to the GPU side for similar reasons. In some embodiments, CPU executors 900-1 may be responsible for transferring data arrays between the application 20 and the runtime system 10. In some embodiments, there can be multiple CPU executors 900-1 in a multi-CPU or a multi-core computer. The multiple CPU executors 900-1 perform independent tasks to exploit the computer's parallel data processing capacity. In some embodiments, a CPU executor 900-1 may have one or more slave threads to which it distributes work.

In some embodiments, the runtime system 10 cannot access a processing element directly. Instead, it has to access the processing element through a software interface (e.g., a software library or a driver interface) provided by the vendor of the processing element. For example, FIG. 1 shows that the GPU executors call the GPU driver library 920 to access a GPU's resources or execute compute kernels on the GPU. In some embodiments, the GPU driver library 920 enables the runtime system 10 to control the GPU's memory and thereby facilitates alignment of data arrays according to their designated usage for improved performance and enables memory-aware scheduling algorithms. Through the GPU driver library 920, the runtime system 10 can execute binary codes that directly target a specific GPU's instruction set architecture (ISA). This configuration makes it possible for the intrinsic library 700 to include intrinsic operations that are optimized based on a particular GPU's ISA to maximize the runtime system's performance on the GPU. In some embodiments, a software library like the GPU driver library 920 can also reduce the runtime system's overhead and the interface latency between the executors 900 and the respective processing elements, particularly coprocessors managed as devices, such as GPUs.

In some embodiments, the GPU driver library 920 possesses the following performance enhancing features or a subset thereof:

Support for explicit control of the GPU memory management. This enables the runtime system 10 to make decisions about buffer placement in the GPU memory based on its own knowledge of the application 20.

Support for synchronous or asynchronous submission/completion of arbitrary amounts of work. Asynchronous submission/completion support allows the runtime system 10 to examine a large amount of available work and optimize its execution.

Support for creation of compute kernels at the machine assembly or binary level.

A low-overhead interface for writing and reading back GPU memory buffers by the runtime system 10.

Support for writing multiple output buffers from a single GPU compute kernel, as well as data-scattering and data-gathering facilities.

Reduce GPU memory waste.

In some other embodiments, the runtime system 10 accesses a GPU through a standard software interface, such as OpenGL or Direct3D. These software packages support the portability of the runtime system 10 across different architectures of processing elements.

In some embodiments, API calls in the application 20 specify the semantics of operations performed by the runtime system 10. The compute kernels to be executed on the processing element(s) of the parallel-processing computer system may have a different sequence from the sequence of operations specified by the API calls, so long as the execution order preserves the specified semantics. In some embodiments, for certain operations, one API call is split into multiple compute kernels. In some other embodiments, for certain sequences of operations, multiple API calls are merged into one compute kernel. In yet some other embodiments, for certain sequences of operations, multiple API calls are converted into multiple compute kernels. The E-Scheduler 800 is responsible for coordinating the execution of compute kernels on different processors to ensure that the result of the application 20 is reliable and accurate, i.e., independent from the specific computer hardware platforms.

In some embodiments, there is no developer-specified application-level error handler in the application. In this case, an execution error may result in the immediate termination of the application. In some embodiments, an error message is returned to the application developer, indicating the location (e.g., file name and line number) of an operation that triggers the error. In some embodiments, an explanation of what might have caused the error is also provided for the developer's reference.

In some other embodiments, a developer can insert error handlers into the application to specify how execution errors should be handled. An application-level error handler has the flexibility to ignore certain errors, resolving certain errors by aborting the computations that caused the errors, or invoking a previously defined error handler when certain error occurs. Through its arguments, an application-level error handler function is provided with application-level arguments such as error type, file name, line number, and program counter.

In some embodiments, different components of the runtime system 10 run in multiple threads to improve the system's performance. As shown in FIG. 1, the C-Scheduler 300 runs in the application thread 30 and the E-Scheduler 800 is associated with the E-Scheduler thread 40. The two threads are separated from each other by the thread boundary 60. This thread boundary 60 enables the E-Scheduler 800 to operate continuously, including dispatching work to the multiple executors 900 and coordinating their operations, even if the application 20 does not make more API calls to the runtime system 10 for an extended period of time. Different thread assignments of components of the runtime system 10 are also possible. For example, the Program Generator 600 can also run in its own thread.

In some embodiments, different components of the runtime system 10 run in different processes. The lifetimes of these processes may be independent of the lifetime of the application 20 using the runtime system 10. In some embodiments, one or more of these processes may service one or more independent applications at one moment.

Similarly, there are one or more GPU and/or CPU executor threads 50 associated with the respective GPU executors 900-2 and CPU executors 900-1. In some embodiments, each executor runs in one or more threads of its own. In some other embodiments, multiple executors share the same thread. In some embodiments, as a highly asynchronous device, coprocessor may temporarily block its associated executor module from access when its input buffer backs up. With a thread boundary 70 separating the executor's thread 50 from the E-Scheduler thread 40, the communication between the executor and the E-Scheduler 800 is not affected by the input buffer backup at the coprocessor. This multi-thread configuration can effectively increase the runtime system's total throughput.

Note that the location and existence of the thread boundaries shown in FIG. 1 are illustrative. In some embodiments, the runtime system 10 operates without any thread boundaries. Likewise, in some other embodiments, an application may run in multiple threads, each calling into the runtime system 10 independently.

In some embodiments, the runtime system 10 includes optional thread boundaries between the LSI 100/FE 200 and the C-Scheduler 300, between the C-Scheduler 300 and the ProgGen 600, between the C-Scheduler 300 and the E-Scheduler 800, and between the E-Scheduler 800 and each executor 900. As described elsewhere in the application, in other embodiments, the different components of the runtime system 10 run on separate processing elements or separate computers connected via a network. At least a subset of the components run asynchronously. In this case, communication mechanisms known in the art are employed to ensure that information exchanged between the components is processed in an appropriate manner.

Communication across these thread boundaries is accomplished via invoking function calls that are defined in a function call interface. When the thread boundaries are present, the interface arguments to one of these function calls is packed into a message and the message is put into a message queue that exists for each thread. When the thread boundaries are present, a thread (except the application's thread) waits on its message queue for messages. Upon receipt of a new message, the thread determines the message type, unpacks the interface arguments, and performs operations defined in the message.

In some embodiments, a message queue is a data structure that includes a list of reference-counted messages, a mutual-exclusive lock (also known as "mutex") and/or a condition variable that prevent simultaneous access to the message queue structure. The mutex and a condition variable are configured to allow a thread associated with the message queue to be activated when a message arrives. Messages can be placed in the message queue by any thread in the runtime system 10 and then are removed by the receiving thread in a predefined order (e.g., sequentially). In some embodiments, a message queue may be optimized to batch up messages and thereby reduce the contention for the mutex and the condition variable. In some embodiments, the message queue may accept messages having different priorities and deliver messages of higher priorities first. In some embodiments, a message-sending thread defers submission of any new message until a previously-submitted message has been processed. This configuration is useful to implement a synchronous function call interface if a component of the runtime system 10 blocks waiting on results of some operations.

Throughout this application, it will be appreciated by one skilled in the art that function calls and message queues are interchangeable where communication is implied between components that have an optional thread boundary.

Within a multi-thread runtime system, there is a possibility that a first thread may produce work or allocate resources at a rate faster than a second thread that consumes the work or de-allocate the resources. When this situation occurs, a flow control mechanism is often employed to cause the first thread to temporarily stop or slow down until the second thread catches up the pace of the first thread. In some embodiments, this mechanism is not only useful for improving the overall performance of the runtime system but also helpful to prevent an application from mal-functioning.

In some embodiments, a flow control mechanism is implemented at the thread boundary 60 between the C-Scheduler 300 and the E-Scheduler 800. The C-Scheduler 300 is responsible for allocating buffers in the main CPU memory 950 for use by the E-Scheduler 800 and the executors 900. Sometimes, the C-Scheduler 300 may fail to allocate one or more buffers because of temporary depletion of the main CPU memory. If so, the C-Scheduler 300 may send messages to the E-Scheduler 800 repeatedly, requesting that the E-Scheduler 800 report back to the C-Scheduler 300 after it finishes a task that may cause release of some the main CPU memory 950. In some embodiments, the C-Scheduler 300 may return an error to the application 20 if the E-Scheduler 800 fails to process a sufficient amount of task after a predefined time period.

There are other reasons for controlling the work flow between the C-Scheduler 300 and the E-Scheduler 800 even if there is sufficient main CPU memory 950 for allocating buffers related to a compiled program sequence. For example, another flow control mechanism is to have the C-Scheduler 300 and the E-Scheduler 800 share a set of atomic counters so as to prevent the outstanding work at the E-Scheduler 800 from exceeding a predefined threshold and therefore improve the E-Scheduler's efficiency. Advantageously, the flow control mechanism also provides the C-Scheduler 300 more opportunities to optimize the work to be submitted to the E-Scheduler 800. In some embodiments, these atomic counters are functions of the number of outstanding program sequences, the number of outstanding operations, the time required to perform these operations, and other parameters that indicate system resources used or to be used by the outstanding program sequences.

In some embodiments, before submitting a new program sequence to the E-Scheduler 800, the C-Scheduler 300 checks whether the addition of the new program sequence to the outstanding ones would exceed a predefined threshold for one or more of the atomic counters. If so, the C-Scheduler 300 suspends the submission until the E-Scheduler 800 reports back that a sufficient amount of work has been processed such that the atomic counters are below the predefined threshold. The C-Scheduler 300 then atomically increments the atomic counters by the numbers determined by the new work it submits to the E-Scheduler 800. The E-Scheduler 800 decrements the atomic counters in response to a notification from the executors 900 with regard to the amount of work that has been completed and/or when the E-Scheduler 800 releases resources it has used.

In some embodiments, a flow control mechanism is implemented at the thread boundary 70 between the E-Scheduler 800 and each executor 900 in the runtime system 10. For example, the E-Scheduler 800 and the executor 900 may share a set of counters that indicates resource consumption and the workload at the executor 900. In some embodiments, the E-Scheduler 800 uses these counters in its decision as to which executor to send work to.

In some embodiments, the runtime system 10 does not allocate memory space for a data array generated by operations in the application 20 until the C-Scheduler 300 is ready to send compiled program sequences associated with these operations to the E-Scheduler 800 for execution.

In some embodiments, as shown in FIG. 1, the C-Scheduler 300 allocates space in the main system memory 950 associated with the main CPU 960 to host the data array before submitting any program sequences to the E-Scheduler 800. If the CPU is chosen to execute the program sequences, the main system memory is used directly to store the result from executing the program sequences. But if a GPU is chosen to execute the program sequences, the corresponding GPU memory is typically used to store the result from executing the program sequences.

In some embodiments, the main system memory can be used as a temporary backup storage by transferring data from the GPU memory to the main system memory in the event that the GPU memory does not have sufficient space. In some embodiments, the GPU executor 900 uses the main system memory to store data generated by the GPU so that the data can be accessed by the rest of the application 20.

In some embodiments, if the memory consumed by operations currently being performed by the runtime system 10 exceeds a predefined threshold level, the runtime system 10 may refrain from any further memory allocation. In this case, the C-Scheduler 300 waits for the runtime system 10 to complete at least some currently-running operations by sending a "wait" request to the E-Scheduler 800. The C-Scheduler 300 keeps waiting until the "wait" request is acknowledged by the E-Scheduler 800, e.g., when the E-Scheduler 800 completes at least some of the currently-running operations or is ready to handle more work.

In some embodiments, the C-Scheduler 300 may not be able to allocate the main system memory to store the result from executing a program sequence even after the E-Scheduler 800 has completed all the other outstanding operations. For example, this situation may occur if the program sequence requires more memory space than is available. If so, the C-Scheduler 300 may choose to re-invoke the ProgGen 600 to reduce the size of the program sequence or the amount of memory requested by the program sequence. Alternatively, the C-Scheduler 300 can mark the result from executing the program sequence as "invalid". If the invalid result is ever passed to the application through the FE 200 or the LSI 100, they may generate an error message to the application.

In some embodiments, the runtime system 10 and the application 20 exchange data by sharing a portion of the memory space. The application 20 may add a flag to a "write" operation to request that the runtime system 20 takes over a data buffer owned by the application 20. As a result, the runtime system 10 can read and write the data buffer directly without having to copy data from the data buffer into its own memory space. Alternatively, the application 20 may include another flag in the "write" operation that allows the runtime system 10 to share the data buffer with the application 20 for a predefined time period or indefinitely. In this case, the application 20 and the runtime system 10 have read-only access to the data buffer until either party releases its read-only access right. After that, the other party may have write access to the data buffer. In some embodiments, different "write" API calls are used rather than specifying the different behaviors with a flag parameter.

In some embodiments, the application 20 can make "read" API calls to the runtime system 10 to retrieve result data from the runtime system 10. A special instance of the "read" API call allows the application 20 to access the result data stored in an internal buffer in the runtime system's memory space without copying the data back to the application's data buffer. In this case, neither the application 20 nor the runtime system 10 can modify the internal buffer as long as both parties have references to the internal buffer. But the runtime system 10 can regain its full control over the internal buffer after the application 20 releases its references to the internal buffer. In some embodiments, the application 20 may get read-only access to the internal buffer by including a special flag in the "read" call.

In the preceding description, the LSI 100, FE 200, C-Scheduler 300, ProgGen 600, E-Scheduler 800, executors 900, and their subcomponents are all members of the runtime system 10. In particular, the LSI 100, FE 200, C-Scheduler 300, and ProgGen 600 work in concert to perform functions such as progressive evaluation and dynamic program generation and compilation.

The following is a detailed description of some of the key components of the runtime system 10 using exemplary data structures, algorithms, and code segments.

Language-Specific Interface

The LSI 100 is responsible for interpreting API calls in the application 20 to perform a variety of operations including, but not limited to, the following:

Initialize and shut down the runtime system 10;
Create, duplicate, and destroy data held by the runtime system 10;
Invoke the other components of the runtime system 10 to perform application-specified operations;
Allocate and de-allocate main system memory managed by the runtime system 10 but used by the application 20; and
Control the error handling behavior of the runtime system 10.

In some embodiments, for each API call, the LSI 100 generates one or more objects, each object including a handle pointing to a port returned by the FE 200. A port is an object generated by the FE 200 that represents data or operations to be performed by the runtime system 10. The ports and their subsidiary objects and fields comprise the "IR nodes" described above. As shown in FIG. 2A, besides a handle 111, an LSI object 110 may include several other fields, such as data type and operation type of the corresponding port as well as allocation type indicating how the LSI object is allocated. In some embodiments, some of the fields in the LSI object 110 can be used by a debugging tool to detect a misuse of the LSI object 110 and determine the LSI object's scope.

A handle in an LSI object is used for separating the data processed by the runtime system 10 from the data directly visible to the application 20. In some embodiments, multiple LSI objects may contain the same handle and therefore correspond to the same data or operation object in the runtime system 10. A handle may have a counter field tracking the number of LSI objects that contain this handle.

There are several advantages from having the handle 111 inside the LSI object 110. First, the handle 111 provides compatibility between different programming languages. In some embodiments, the objects (e.g., ports) within the runtime system 10 are implemented as C++ objects. The handle 111 provides an easy and secure access to the objects for applications written in other programming languages. Because the handle 111 insulates any object pointers used internally by the runtime system 10 from being exposed to the application 20, it is less likely for the runtime system 10 to be adversely affected by an accidental or intentional error or mal-function in the application 20.

Second, the use of the handle 111 in the LSI object 110 makes it easier for the runtime system 10 to support binary compatibility between releases. To maintain binary compatibility, the new release of the runtime system 10 is designed such that there is no change to the signatures of any API function calls that are supported by old releases of the runtime system 10. The existence of the handle 111 in the LSI object 110 ensures that the objects used internally by any release of the runtime system 10 are opaque to the application 20. The application 20 cannot directly manipulate the contents of the internal objects. In some embodiments, the runtime system 10 also reserves additional storage for the internal objects that can accommodate potential future needs.

In some embodiments, the LSI 100 translates the application's operation requests, including object creation and object destruction requests as well as other API function calls, into data structures understood by the FE 200 and other components of the runtime system. In some embodiments, this translation is accomplished by mapping a large number of API calls in the application 20 into a small number of internal function calls that include as function arguments a specification of the operations to perform. In some embodiments, the LSI 100 also associates with an operation request other information, such as the program counter of the application code that initiates the request. This program counter can be used to provide error handling information. In some embodiments, the runtime system 10 uses the program counter to implement its caches or profiling functionality, etc.

In some embodiments, the LSI 100 includes multiple LSI modules corresponding to different programming languages such as C, C++, Fortran 90, and MatLab. Each LSI module provides an interface between the application 20 and the runtime system 10. In some embodiments, a single LSI module works with multiple programming languages such as C and C++. In some embodiments, multiple LSI modules work in concert to support an application written in several programming languages.

An LSI module enables an application to access the data and operations of the runtime system 10 using types and functions appropriate for the programming language(s) that the LSI module supports. In some embodiments, the C++ LSI module provides access to the runtime system's operations such as mathematical functions via C++ functions via argument type overloading and operator overloading. In some embodiments, the C LSI module provides access to the runtime system's data via pointers to objects allocated by the C++ LSI module and the runtime system's operations via functions that operate on the pointers. In some embodiments, compatibility between the C and C++ LSI modules may be obtained by providing a mechanism that converts between the C pointers and the C++ objects.

In some embodiments, the LSI 100 is responsible for providing error-related information to the application 20 when there is a misuse of the runtime system 10 by the application 20 or the runtime system 10 suffers some other type of errors. In some embodiments, a default error handler may be used to shut down the application 20 in case of errors. In some other embodiments, the application 20 may include one or more error handlers that provide customized error handling behavior. In some embodiments, the LSI 100 maintains these error handlers on a stack. The most recently added error handler is invoked first to resolve an error. If this error handler fails to resolve the error, the LSI 100 either proceeds to the older error handlers or terminates the application 20.

In some embodiments, the error-related information includes a program counter, a line number, and a filename of the application code that causes the error. For example, the LSI 100 captures the program counter of every API call in the application 20. The runtime system 10 then converts the program counter to a file name and a line number of the application code using operating system-specific tools and the application's debugging information. The error-related information makes it easy to debug the application code.

In some embodiments, the runtime system 10 primarily operates on data arrays, which are represented by the LSI 100 as array objects. A particular LSI module may represent multiple data types (e.g., 32-bit floating point values, 64-bit floating point values, or 32-bit integers) as either different types of array objects (or different types of pointers to array objects) or a single type of array objects whose type is checked at runtime to determine compatibility of operations. In some embodiments, a hybrid approach is used where different data types are represented by the LSI as different objects and/or pointer types and a check for compatibility is also performed at run-time. For example, the distinction between single- and double-precision floating-point values may be distinguished by the objects' static types. But whether the values are real or complex may be checked at run-time.

In addition to operating on data arrays, the LSI 100 may provide access to other functionalities supported by the runtime system 10. For example, the LSI 100 can provide the application 20 access to one or more random number generators (RNGs) supported by the runtime system 10, including creating/destroying RNG objects, setting and reading seed data associated the RNG objects, and generating random numbers using the RNG objects.

In some embodiments, the LSI 100 enables the application 20 to share the main CPU memory 950 with the runtime system 10 at a low cost. In some embodiments, the LSI 100 provides functions for performing typical memory allocation operations, such as allocating/de-allocating memory and resizing memory blocks. In some embodiments, the runtime system 10 provides interfaces that allow the application 20 to write data into a memory space allocated by the memory allocation system without copying the memory space into or out of the runtime system 10. The runtime system 10 can access the data in this memory space directly when it is told to do so by the application 20.

In some embodiments, the runtime system 10 does not allocate memory space for data arrays immediately when the LSI 100 allocates new array objects. Rather, the memory space for data arrays is allocated when it is needed to store an operation result. Likewise, an LSI call to perform an operation may not cause the runtime system 10 to perform that operation immediately. Rather, the runtime system 10 accumulates the operation request using a work queue mechanism described below. Using the work queue 304, the runtime system 10 can form dense compute kernels to exploit the capacity of the high-performance processors managed by the runtime system 10. By queuing operation requests, the runtime system 10 can use techniques such as progressive evaluation to optimize and execute operation requests more efficiently than processing each operation request individually and/or synchronously when the application 20 submits the request.

In some embodiments, an LSI module uses language-specific facilities such as constructors and destructors to allocate and de-allocate LSI objects that represent data and operations processed by the runtime system 10, which simplifies the runtime system's memory management. For example, the C++ LSI module creates an LSI object by calling the object's constructor, destroys an LSI object by calling its destructor, and duplicates an LSI object by making other function calls. With these function calls into the runtime system 10, the runtime system 10 only performs operations and generates results that are actually required by the application 20.

In some embodiments, the LSI 100 provides automatic or semi-automatic object management such as allocation, de-allocation, and duplication using a stack of "scopes". A scope acts like a container for a set of allocated LSI objects. When a new scope is inserted into the scope stack, the new LSI objects associated with the scope are allocated in a predefined order. When a scope is removed from the scope stack, the objects associated with that scope are de-allocated in the same order or the reverse order thereof.

To facilitate normal program semantics, in which data is typically returned from inner-level functions to outer-level functions of a program, LSI objects can be moved from the current scope to the next-older scope on the scope stack. When the current scope is de-allocated, the LSI objects are preserved. This scope stack mechanism can substantially reduce the number of function calls to object management routines (e.g., object de-allocation).

In some embodiments, the runtime system 10 can predict the application's future behavior from one or more hint instructions the application 20 passes through the LSI 100. For example, the application 20 can use the hint instruction "hint_read( )" to notify the runtime system 10 that the application 20 intends to read a certain data array out of the runtime system 10 in the near future or that the runtime system 10 should start executing operation requests buffered in the work queue immediately. A more detailed description of the hint instructions is provided below in connection with the work queue 304 in FIG. 2H.

In some embodiments, the LSI 100 enables the application 20 or a debugging utility to access the debugging functionality of the runtime system 10. The LSI modules may provide interfaces to enable or disable features like reference result generation and to retrieve a reference result array object corresponding to a particular array object. A more detailed description of the reference result generation is provided below in connection with FIG. 9A. Likewise, the LSI modules may provide interfaces to enable the debugging utility to examine intermediate operation results generated by the runtime system 10.

In some embodiments, an LSI module is packaged as a dynamically loaded library (also known as a shared library) or a portion thereof. Therefore, a new version of the LSI module can replace an existing version without recompiling the application that invokes the LSI module. In some embodiments, the LSI module may be statically linked to the application 20. One or more LSI modules may be combined together in a single dynamically loaded library or static library. Thus an advantage of the LSI is that it allows applications written in different languages to issue operation requests to the same runtime system 10, which executes those requests on underlying processing elements transparently to the application.

Front End

The FE 200 of the runtime system 10 transforms operation requests made by the application 20 through the LSI 100 into internal data structures used by other components of the runtime system 10. In some embodiments, the FE 200 is responsible for mapping "handles" used by the LSI 100 into ports used by the runtime system 10 to represent data and associated operations. The FE 200 uses a function to map a handle to a pointer to a port used internally by the runtime system. The same or a different function is used to map the port pointer back to the handle. In some embodiments, the mapping between the handle and the port pointer is achieved mathematically, e.g., by XOR-ing a port pointer maintained by the runtime system 10 with a constant value to produce a corresponding handle and vice versa. In some other embodiments, as shown in FIG. 2A, the FE 200 keeps a table 115 of active handles and their associated ports. A mapping between a handle and its associated port or ports is achieved through a table lookup. In either configuration, the FE 200 can perform additional tasks, e.g., checking a handle's validity.

A port may correspond to (i) an operation requested by the application 20 that has not been performed, (ii) data that results from an operation requested by the application 20, (iii) data written into the runtime system 10 by the application 20, or (iv) a data buffer used internally by the runtime system 10.

In some embodiments, as shown in FIG. 2B, an operation request 120 from the LSI 100 to the FE 200 includes a code segment and one or more input handles associated with the operation. Upon receipt of the request, the FE 200 generates one or more ports and associated data structures to represent the output of the operation. The FE 200 then passes the ports to the C-Scheduler 300.

In some embodiments, the FE 200 attempts to optimize operations and their associated inputs before passing them on to the C-Scheduler 300. For example, the FE 200 may eliminate an operation through constant folding if all operands of the operation are constants. Some operations with at least one constant operand can be simplified through strength reduction. For example, pow(x, 2) can be converted to x*x. The benefit of performing these optimizations at the FE 200 is to ensure that the constant values used to perform the optimizations are represented in the trace cache key 407. In some embodiments, the constant values are part of the trace cache key 407 to ensure that the compute kernel(s) generated for the optimized operations are not only valid for those particular values but also more efficient. In some other embodiments, values in the trace cache key 407 that change frequently may cause significant program generation and compilation overhead. Therefore, scalar values passed to the LSI 100 by the application 20 are not included in the trace cache key 407, because the runtime system 10 does not know whether they are literal constants, runtime constants, or variables in the application 20.

In some embodiments, the FE 200 manages input and output operations between the application 20 and the runtime system 10. For a "write" operation request from the application 20, the FE 200 creates a new port to represent the data to be transferred from the application's memory space to the runtime system's memory space. The FE 200 then notifies the C-Scheduler 300, which in turn notifies the E-Scheduler 800, causing the data to be written into the runtime system from a data buffer held by the application 20.

For a "read" operation request from the application 20, the FE 200 notifies the C-Scheduler 300 to prepare the data to be transferred back from the runtime system's memory space to the application's memory space by performing one or more operations including: (i) looking up the trace cache 400 for pre-compiled program sequences associated with the "read" operation request, (ii) optionally invoking the ProgGen 600 to generate the necessary program sequences, and (iii) issuing the program sequences to be executed by the E-Scheduler 800. The C-Scheduler 300 then waits on behalf of the FE 200 until the E-Scheduler 800 returns the data back to a data buffer owned by the application 20.

In some embodiments, as shown in FIG. 2C, the FE 200 maintains a shared buffer table 130 for managing buffers shared by the runtime system 10 and the application 20 to track the usage of the shared buffers by the "read" and "write" operations described above. When a buffer is shared with the application 20, the FE 200 inserts a new entry into the shared buffer table. As long as the entry remains in the table, the runtime system 10 will not modify the data in the corresponding shared buffer. In some embodiments, the application 20 is also prevented from modifying the same buffer using, e.g., the operating system's virtual-memory protection mechanisms.

If the runtime system 10 finishes using a shared buffer before the application 20, the FE 200 moves a corresponding entry from the shared buffer table to an application buffer table 132 for tracking memory regions used only by the application 20. When the application 20 finishes using the buffer, the FE 200 releases the corresponding table entry from the application buffer table 132 accordingly. If the application 20 finishes using a shared buffer before the runtime system 10, the FE 200 removes the buffer's corresponding table entry from the shared buffer table 130. But the buffer remains accessible by the runtime system until the runtime system 10 finishes using the buffer.

In some embodiments, the FE 200 maintains a single buffer table 134 to track memory usage by the application 20 and the runtime system 10. Each entry in the buffer table 134 includes a buffer name that uniquely identifies a memory buffer, a buffer location in the memory space, and a buffer ownership field indicating that the buffer is owned by the application 20 or the runtime system 10 or both.

In some embodiments, the FE 200 provides an interface between the LSI 100 and the rest of the runtime system 10. A debugger request from the application 20 passes through this interface to access the rest of the runtime system 10. The FE 200 is configured to channel such request to the C-Scheduler 300 to support features like reference result generation and program debugging.

Figure 2D:
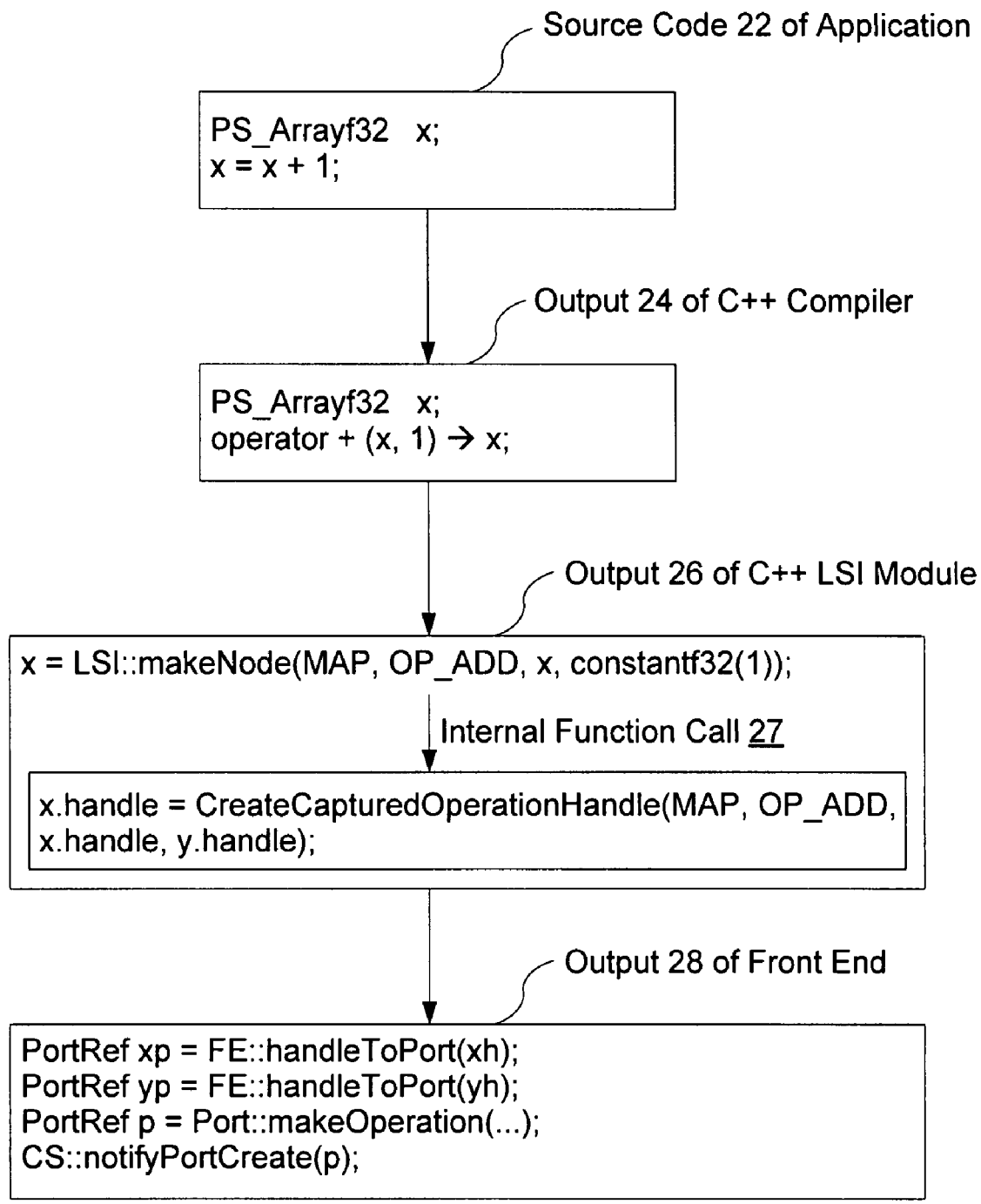

FIG. 2D is a block diagram illustrating how the LSI 100 and the FE 200 process an API call in the application 20. The source code 22 of the application 20 is written in C++ and includes two statements, the first statement declaring an array object "x" and the second statement increasing the array elements by one. The C++ compiler converts the source code into the code segment 24. Because C++ supports operator overloading, the "+" sign in the second statement is turned into an add operation "operator+" with two input arguments "x" and "1". Note that the data type "PS_Arrayf32" in the source code 22 is reserved for the runtime system 10. At run-time, operations associated with such data type are converted into API calls to the runtime system 10.

Next, the code segment 24 is executed on a parallel-processing computer system that has deployed the runtime system 10. At run time, the code segment 24 is dynamically linked to a library of the runtime system 10 that includes the C++ LSI module, which makes a function call 27 to invoke the FE 200. As shown in FIG. 2D, the function call 27 includes arguments identifying the array operation type "MAP", the array element operation type "OP_ADD", and the two input arrays. In some embodiments, the runtime system 10 provides a function "constantf32( )" that automatically converts a constant value "1" into a PS_Arrayf32 constant data array. The constant data array has the same dimensions as the data array "x" and its elements all share the same value "1". The FE 200, in response, generates new ports (xp, yp, and p) and their associated data structures corresponding to the API call in the source code 22, notifies the C-Scheduler 300 of the creation of the new ports, and returns handles to the new ports back to the C++ LSI module. In some embodiments, the new ports are stored in a data structure called the "work queue" 304.

When the second statement in the code segment 24 is executed on the computer system, the runtime system 10 may or may not have the result data, i.e., the updated array object "x", available immediately for the application 20 to access. In some embodiments, the runtime system 10 (more specifically, the C-Scheduler 300 and the ProgGen 600) waits until a predefined number of ports have been accumulated in the work queue 304 or another predefined condition is met (e.g., the application 20 makes a "read" API call for the array object "x"). Once one of the predefined conditions is met, the runtime system 10 then performs the application-specified operations and returns the result data to the application 20.

FIG. 2E illustrates another source code segment of the application 20. Assuming that all the variables A through F are defined as PS_Arrayf32 data arrays of the same dimensions, their associated operations trigger API calls to the runtime system 10. For convenience, exemplary program counters (PC) are listed next to the corresponding API calls in the source code segment. For example, the program counter for the instruction "C=A+B" is 1001. As will be explained below, the C-Scheduler 300 uses these program counters for querying and updating the trace cache 400.

For simplicity, the example code segment includes only "primitive" operations such as add "+", multiply "*", and divide "/". For example, the "+" operation is an overloaded operator that performs an element-wise addition between two array objects A and B. The result array object C has the same dimensionality as A and B. A release operation like "Release C" indicates that the application no longer holds a reference of the array object C. In some embodiments, the release operation in the source code is optional because the runtime system 10 may dynamically determine the scope of a data array object and cause its release if the data array object is no longer referenced by the application 20. Because the data type "PS_Arrayf32" is exclusively handled by the runtime system 10, executing the code segment causes a series of API calls to one specific module of the LSI 100, which generates and manages a set of LSI objects (FIG. 2F). As shown in FIG. 2A, an LSI object 110 includes a handle pointing to a port created by the FE 200. In some embodiments, the LSI 100 also records the position in a sequence of operations at which the application 20 releases its last handle to a particular array object. This information provides an indication to the runtime system 10 about when to start processing ports accumulated in the work queue.

In some embodiments, the ports generated by the FE 200 are organized into a DAG. As shown in FIG. 2G, a DAG may include at least three types of entities:

"Port" node (illustrated as an ellipse) that corresponds to an IR node to be processed by the runtime system 10 and that represents the result of an operation requested by the application 20 or data passed from the application 20 to the runtime system 10;

"Parse" node (illustrated as a triangle) that specifies the operation to be performed on one or more ports; and "Data" node (illustrated as a rectangle) that identifies an input argument to a particular parse node.

The DAG is passed from the FE 200 to the C-Scheduler 300. The C-Scheduler 300 identifies the ports in the DAG and generates an entry in the work queue for each identified port. As shown in FIG. 2H, the C-Scheduler 300 enters five new entries into the work queue 304, each entry corresponding to an instruction in the application 20. When a predefined condition is met, the C-Scheduler 300 invokes the ProgGen 600 to query the work queue 304 and generate compiled program sequences for selected entries in the work queue.

As shown in FIG. 2H, the work queue 304 is a repository for operation requests from the FE 200 that have yet to be compiled. It maintains information about the operation requests for generating program sequences. In some embodiments, the work queue 304 stores the following attributes associated with a stream of operation requests:

Creations of new port objects that trigger the generation of program sequences.

Generally, the FE 200 submits notifications relating to the creation of two types of port objects to the C-Scheduler 300: (i) result ports with associated parse nodes, which have not been compiled (e.g., ports "C", "F", and "G" in FIG. 2G) and (ii) ports associated with constant values or buffers of data (e.g., ports "A", "B", "E", and "D" in FIG. 2G). The work queue 304 tracks the result ports, because they are used to notify the ProgGen 600 the result data that need to be generated. But the work queue does not have to track those ports associated with constant values or buffers of data. But both types of ports (as well as previously compiled ports) are used by cache lookup for matching pre-compiled program sequences.

Releases of the last application reference to a port object.

The port release notification may be associated with result ports or ports with constant values or buffers of data. Like the port creation notifications, the port release notifications associated with constant ports created from scalar values passed to the LSI 100 by the application 20 do not require the generation of any new program sequence and are therefore not inserted into the work queue. In some embodiments, the same may be true of ports representing data arrays written by the application 20 into the runtime system 10. In some embodiments, this may also be true of previously compiled result ports. In some embodiments, the data buffers associated with these ports may be freed when the runtime system 10 drops its last references to these ports and their corresponding buffers. In other embodiments, however, releases of data ports and previously compiled result ports for which data-buffer memory has been or will be allocated convey information about data buffers that are no longer needed, which may enable the runtime system 10 to determine that the buffers may be reused to hold the results of new operations after earlier operations using the same buffers complete. Using the releases, this determination may be made before the runtime system 10 drops the last references to the buffers, thereby reducing the total amount of memory needed by a sequence of operations. If a release for a result port that has not been compiled by the ProgGen 600 is inserted into the work queue (e.g., see the two release entries in FIG. 2F), the result port is deemed to represent a temporary, intermediate result that does not have to be returned to the application 20. This configuration facilitates scalar replacement by the ProgGen 600, whereby the array holding such a result may be contracted to a scalar temporary variable, eliminating large amounts of memory traffic and increasing computational intensity. Therefore, scalar replacement is useful to the generation of efficient compute kernels.

Hints from the application 20.

The application 20 can include hint instructions provided by a developer for performance reason. These hint instructions may affect the ProgGen 600's selection of operation requests for program-sequence generation. For example, the hint instruction "hint_read(D)" notifies the runtime system 10 that the application 20 intends to access the data associated with the array D. The hint instructions pair "begin_block( )" and "end_block( )" in the source code of the application 20 are used for marking the boundary of a code block (e.g., a loop) so that the ProgGen 600 automatically defers processing the code block until the entire code block is in the work queue. The hint instruction "hint_execute( )" triggers the ProgGen 600 to start processing the work queue as quickly as possible. Although the hint instructions may not have counterparts in the DAG, the C-Scheduler 300 may still create entries in the work queue corresponding to the hint instructions.

In sum, the FE 200 maps user-friendly inputs to a parse-tree/data-flow output. In some embodiments, the FE 200 and the other components of the runtime system 10 are kept in separate dynamically linked libraries (DLLs). A DLL can be updated or replaced without recompiling applications that use it. This allows bug-patches and backwards-compatible upgrades to be distributed without interrupting an application developer's workflow.

C-Scheduler

Figure 3A:
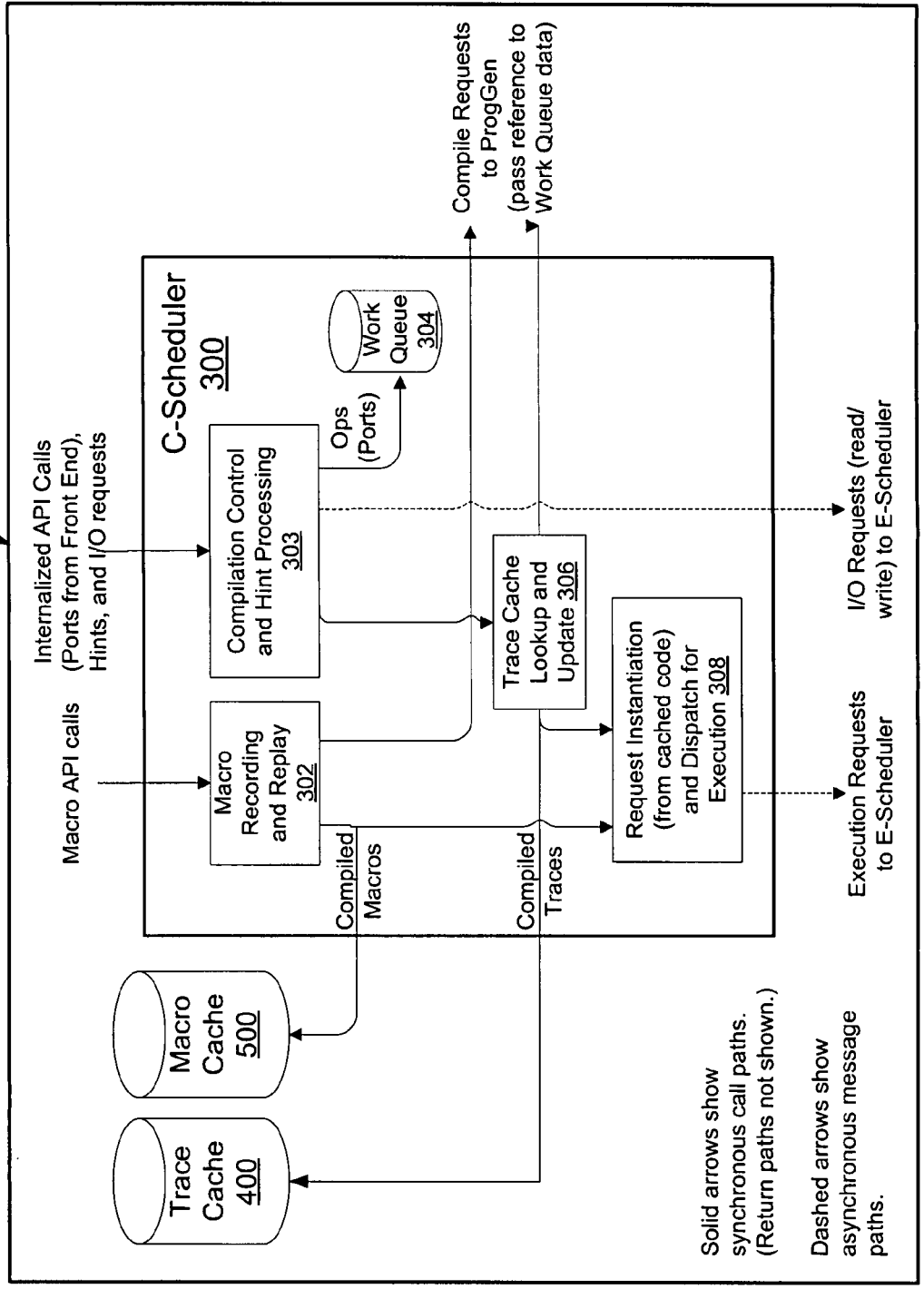
FIGS. 3A through 3C illustrate the operation of the compilation scheduler of the runtime system according to some embodiments of the present invention.

FIG. 3A is a block diagram illustrating the internal structure of the C-Scheduler 300 and its interactions with other components of the runtime system 10. The macro recording and replay module 302 is configured to handle API calls relating to code macros. This process involves lookup and update operations of the macro cache 500. A more detailed description of this module is provided below in connection with FIGS. 5A-5C. The compilation-control and hint-processing module 303 is configured to process ports generated by the FE 200. The compilation-control and hint-processing module 303 adds new entries to the work queue 304 for the new ports.

After accumulating a sufficient number of entries in the work queue 304, the trace cache lookup and update module 306 is invoked to check the trace cache 400 for previously compiled program sequences that match the current entries in the work queue 304. If no match is found, the module 306 then submits compile requests to the ProgGen 600 and asks the ProgGen 600 to generate new compiled program sequences for the work queue entries. If there is a match in the trace cache 400, the request instantiation and dispatch for the execution module 308 submits the compiled program sequences as part of its execution requests to the E-Scheduler 800 for execution.

In some embodiments, the request instantiation and dispatch for execution module 308 allocates space in the main system memory, which is also referred to as "backing store", for a new buffer required by a program sequence to be dispatched. The backing store can be used for different purposes. In some embodiments, programs that run on single-core or multi-core CPUs can write result data into the backing store. In some embodiments, data requested by the application 20 via a read API call can be copied into the backing store from the GPU buffer that contains the original data. In some embodiments, the backing store can be used as an extension to the GPU buffer if the GPU Executor 900 needs space than what is available in the GPU memory.

If an attempt to allocate the backing store fails, the request instantiation and dispatch for execution module 308 waits for the GPU Executor 900 to complete some operations and tries again. In some embodiments, after a predefined number of failed attempts, the C-Scheduler 300 requests and receives from the ProgGen 600 a program sequence that requires less memory and repeats the aforementioned procedure with the new program sequence. If, ultimately, no progress is made, the C-Scheduler 300 then marks the output ports of the program sequence as "invalid". When there is a subsequent operation that attempts to access data associated with the invalid ports, the FE 200 causes an error to be delivered to the application 20 via the LSI 100.

In some embodiments, the C-Scheduler 300 prevents memory exhaustion and other resource overloads caused by the runtime system 10 by controlling the workflow submitted to the E-Scheduler 800. For example, before submitting a compiled program sequence to the E-Scheduler 800, the C-Scheduler 300 checks whether the E-Scheduler 800 currently has the capacity to accept the program sequence. If there is not enough capacity, the C-Scheduler 300 withholds sending the program sequence and waits until the E-Scheduler 800 has the required capacity. After allocating resources for the program sequence, the E-Scheduler 800 reduces its current capacity, which is a parameter shared between the C-Scheduler 300 and the E-Scheduler 800. In some embodiments, the E-Scheduler's capacity is a function of its buffer size, the number of program sequences to be processed, the number of operations to be performed, and the time expected for executing the operations.

Figure 3B:
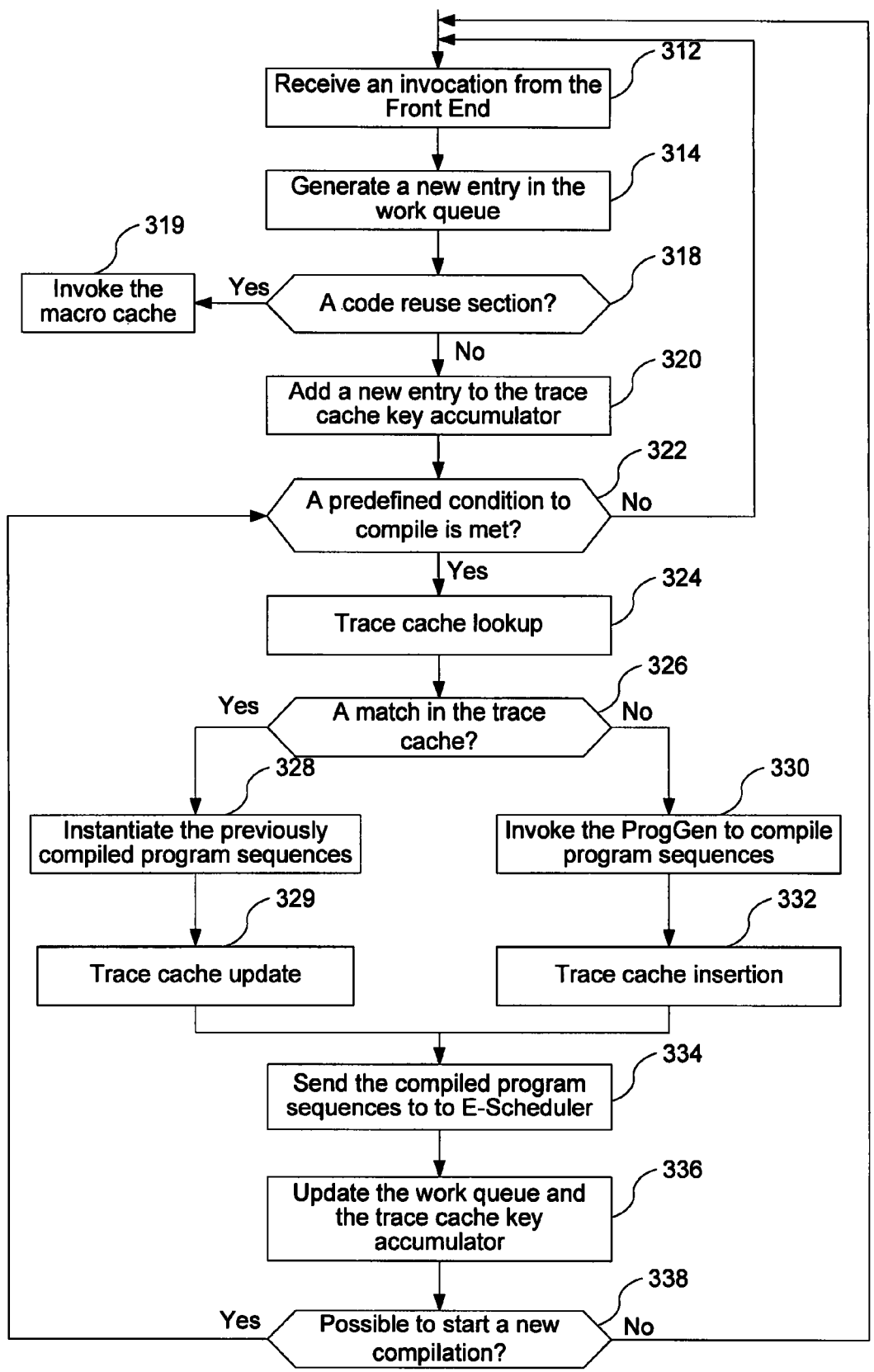

FIG. 3B is a flowchart further illustrating the operations of the C-Scheduler 300. Upon receipt of an invocation from the FE 200 (312), the C-Scheduler 300 inserts a new entry into the work queue (314). In some other embodiments, the FE 200 inserts the new entry into the work queue 304 and then invokes the C-Scheduler 300. The C-Scheduler 300 checks whether the work queue entry is part of a code macro (318). If so (318, yes), the C-Scheduler 300 then invokes the macro cache 500 to process the code macro (319). As will be described below in connection with FIGS. 5A through 5C, the macro cache 500 is a data structure used for storing pre-compiled sequences of compute kernels (also known as "program sequences") corresponding to the code reuse sections in the application 20. Otherwise (318, no), the C-Scheduler 300 invokes the trace cache 400 to handle the new work queue entry. As will be described below connection with FIGS. 4A through 4D, the trace cache 400 is a data structure used for storing pre-compiled program sequences corresponding to the rest of the application 20 (other than the code reuse sections) that invokes API calls to the runtime system 10. The use of the trace cache 400 and the macro cache 500 may improve the runtime system's performance significantly because compute kernel generation (also known as "program generation") is often an expensive process.

In some embodiments, the C-Scheduler 300 prepares a trace cache key for the current content of the work queue by adding a new entry into a "trace cache key accumulator" data structure (320). This trace cache key is used for searching the trace cache 400 for a previously compiled program sequence that match the current content of the work queue. As shown in FIG. 2I, the trace cache key accumulator 450 contains multiple variable-sized key entries. The multiple key entries are concatenated together with the first key entry representing the currently oldest entry in the work queue. The key accumulation is an operation of O(N), where N is the number of work queue entries being put into the accumulator. For each key entry, a small constant amount of work is performed. In some embodiments, a key entry in the trace cache key accumulator includes:

Program counter (PC) of a work queue entry, which may be used by the C-Scheduler 300 for searching for a matching entry in the trace cache 400;

Size of the key entry;

Input/output ports and their associated locations in the work queue; and

Data for representing the operations associated with the input/output ports in the work queue, including scalar values to be used to produce specialized code for any of the operations, as determined by the FE 200.

Next, the C-Scheduler 300 checks whether a predefined condition to compile program sequences for the current work queue entries is met (322). There are one or more heuristic-based conditions that may trigger the C-Scheduler 300 to start processing the work sequence entries. In some embodiments, the C-Scheduler 300 may start the process when the application 20 drops its last reference to a port or when receiving a write/read access request associated with a port. In some embodiments, the C-Scheduler 300 may start the process after there are at least a predetermined number of entries in the trace cache key accumulator. In some embodiments, entries for particular operations or particular sequences of operations may trigger the C-Scheduler 300 to process the entries in the work queue 304. By deferring the process, the runtime system 10 can effectively prioritize its resources for more compute-intensive compute kernels to be generated and thereby increase the system's throughput.

After deciding to process the current work queue entries (322, yes), the C-Scheduler 300 performs a trace cache lookup using the information in the trace cache key accumulator to identify and replay the previously compiled program sequences corresponding to the work queue entries (324). If there is a matching entry in the trace cache 400 (326, yes), the C-Scheduler 300 then re-instantiates the identified program sequences in the trace cache 400 (328), updates the trace cache 400 (329), and sends the instantiated program sequences to the E-Scheduler 800 for execution (334). A more detailed description of the trace cache lookup is provided below in connection with FIG. 4B.

If there is no matching entry in the trace cache 400 (326, no), the C-Scheduler 300 invokes the ProgGen 600 to generate one or more compiled program sequences for the work queue entries (330). In some embodiments, the C-Scheduler 300 and the ProgGen 600 share an access to the work queue. In some embodiments, the C-Scheduler 300 and the ProgGen 600 may pass the work queue (or references to it) back and forth. In some embodiments, the C-Scheduler 300 may construct more than one work queue 304 and pass the relevant one(s) (or references to them) to the ProgGen 600. The ProgGen 600 determines the exact number of work queue entries to be processed and generates compiled program sequences accordingly. A more detailed description of the program generation is provided below in connection with FIGS. 6A-6C. The C-Scheduler 300 then inserts the newly compiled program sequences into the trace cache 400 using the information in the trace cache key accumulator (332) and submits the instantiated program sequences to the E-Scheduler 800 for execution (334). A more detailed description of the trace cache insertion is provided below in connection with FIG. 4D.

In either case (320, yes or no), the C-Scheduler 300 performs an update to the work queue and the trace cache key accumulator (336). In some embodiments, the C-Scheduler 300 may not be able to process all the entries currently in the work queue through a single trace cache lookup or invocation of the ProgGen 600 because of, e.g., the limited capacity of the E-Scheduler 800 and/or the executors 900. If so, the C-Scheduler 300 only eliminates from the work queue and the trace cache key accumulator the entries that have been processed and moves its pointer to a new beginning entry in the work queue. In some embodiments, the ProgGen 600 may distinguish between the number of entries of the work queue for which it generated a compiled program sequence and the number of entries in the trace cache key accumulator that are used for the key of the program sequence. This configuration enables the ProgGen 600 to use information from release entries in the work queue 304 that follow entries for operations it does not wish to compile as part of the program sequence.

Next, the C-Scheduler 300 determines whether the work queue has a sufficient number of entries that may require a new round of processing (338). In some embodiments, the C-Scheduler checks whether the remaining work queue entries can trigger a compilation using the same criteria mentioned above (322). For example, if the initial compilation was triggered by a data access request but the work queue entry corresponding to the data access request has not been processed yet, the C-Scheduler 300 then repeats the aforementioned process until the data access request is met. But if the remaining work queue entries do not satisfy any of the criteria, the C-Scheduler 300 may return to wait for the new incoming operation requests from the Front End 200.

Note that the order of operations shown in FIG. 3B is only for illustrative purposes. One skilled in the art may find other possible orders that can achieve the same or similar result. For example, the C-Scheduler 300 may choose to submit the compiled program sequences (334) and then perform an update/insertion to the trace cache (329, 332).

In sum, the C-Scheduler 300 is responsible for aggregating operation requests to be processed by the ProgGen 600 and caching the compiled program sequences generated by the ProgGen 600 in the trace cache 400. In some embodiments, the C-Scheduler 300 also supports the use of a macro cache, which bypasses some of the aforementioned procedures such as request aggregation and trace cache lookup. In some embodiments, the C-Scheduler 300 is, at least in part, responsible for implementing some features relating to internal result comparison. A more detailed description of the internal result comparison is provided below in connection with FIGS. 9B and 9C.

In some embodiments, the invocations from the FE 200 to the C-Scheduler 300 are synchronous. In these embodiments, there is no asynchronous callback into the C-Scheduler 300. The C-Scheduler 300 is further responsible for synchronizing the application 20 with the E-Scheduler 800 and, through it, with the executors 900. For instance, the C-Scheduler 300 may block the application 20 to await completion of data requested by a read API call. Alternatively, the C-Scheduler 300 may throttle the application 20 to reduce the rate of incoming new operation requests in order to avoid significant backup at the executors 900 or exhaustion of main system memory.

Figure 3C:
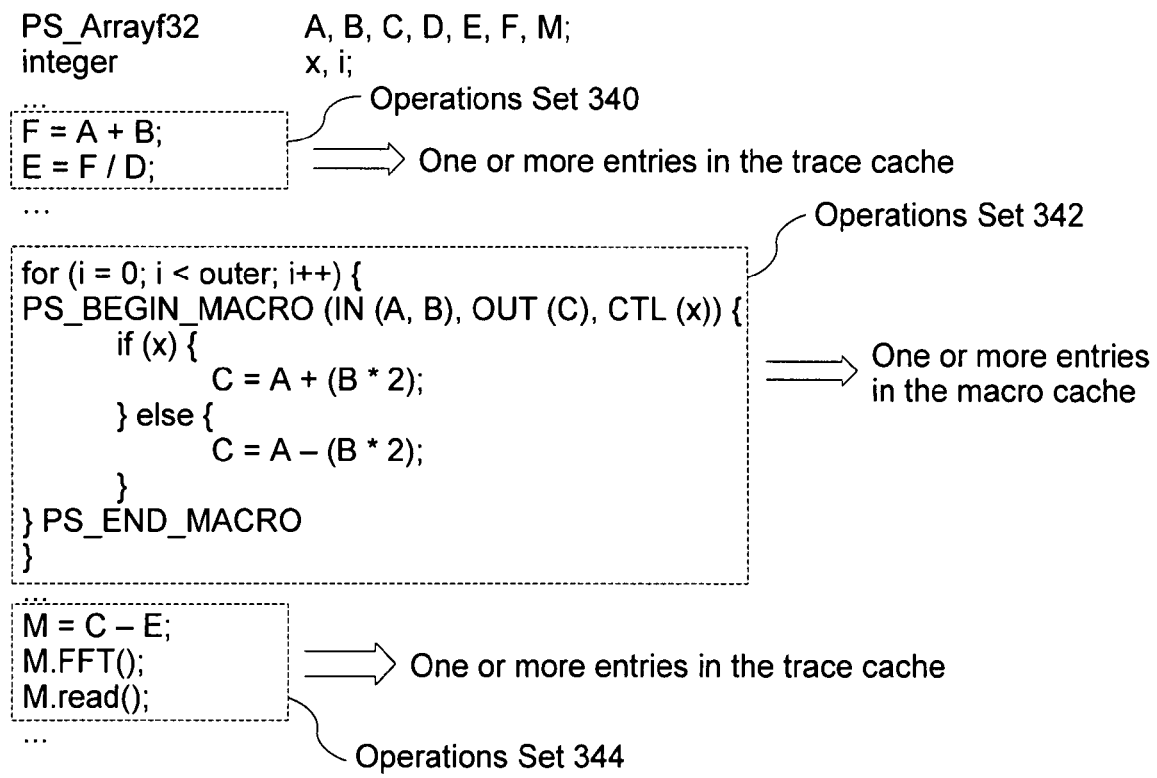

FIG. 3C is an exemplary code segment from an application that includes primitive operations, intrinsic operations and a code reuse section (or code macro). The first set of operations 340 includes element-wise primitive operations such as "+" and "/". At run time, the C-Scheduler 300 inserts a set of entries into the work queue corresponding to the first set of operations 340. The C-Scheduler 300 keeps accumulating more work queue entries until a condition that triggers the compilation and execution of the work queue entries is met.

As will be explained below, the code reuse section between the pair of keywords "PS_BEGIN_MACRO" and "PS_END_ MACRO" in the second set of operations 342 may trigger the C-Scheduler 300 to start processing the existing entries in the work queue. Therefore, the C-Scheduler 300 notifies the ProgGen 600 to start processing the existing work queue entries. This process corresponds to the operations 322-338 of FIG. 3B.

After processing all existing entries in the work queue, the C-Scheduler 300 starts processing the second set of operations 342. If this is the first time that the code reuse section is being processed, the C-Scheduler 300 cannot find a matching entry in the macro cache 500. Therefore, the C-Scheduler 300 processes the code reuse section just like its processing of another regular code segment.

In some embodiments, the C-Scheduler 300 does not use the trace cache key accumulator to generate a key for the macro. Rather, the FE 200 or the LSI 100 or both generates a unique macro cache key for the code reuse section. This macro cache key includes an identifier of the code reuse section as well as input/output (I/O) and control parameters associated with the code reuse section. By including the I/O and control parameters in the macro cache key, different executions of the code reuse section can involve only a specific code segment that is consistent with the I/O and control parameters. For example, the code reuse section in FIG. 3C includes an IF-ELSE condition block. Depending on the specific value of the control parameter "x", one execution of the code reuse section may involve only the IF part of the block and another execution may involve the ELSE part of the block. In some embodiments, these two executions are associated with two different entries in the macro cache 500.

At the end of the first execution of the code reuse section, the C-Scheduler inserts the macro cache key and compiled program sequences into the macro cache 500. The macro cache key is used for searching the macro cache 500 for a matching entry when the C-Scheduler 300 intercepts a subsequent entry to the code reuse section. As shown in FIG. 3C, the code reuse section is within a for-loop, the C-Scheduler 300 can easily identify and re-instantiate the macro cache entry corresponding to the same code reuse section after the first iteration of the for-loop.

After processing the second set of operations 342, the C-Scheduler 300 starts accumulating new entries in the work queue and the trace cache key accumulator for the third set of operations 344. The intrinsic operation "FFT" may correspond to one or multiple compiled program sequences in the trace cache 400. Finally, a data access operation "M.read( )" triggers the C-Scheduler 300 to stop accumulating more work queue entries and start checking the trace cache 400 or invoking the ProgGen 600 if no match is in the trace cache 400.

In sum, the runtime system 10 is driven by a dynamic stream of operation requests from the application 20, which are then compiled into program sequences executable on processing elements of a parallel-processing computer system, such as multi-core CPUs or GPUs. In some embodiments, the runtime system 10 processes the request stream dynamically (or just-in-time). The runtime system 10 does not need to know any information about the application 20 in advance. Because program sequence generation by the ProgGen 600 is a relatively expensive operation, the C-Scheduler 300 tries to re-use the previously compiled program sequence in the trace cache 400 and/or the macro cache 500 as much as possible to achieve good performance.

Trace Cache

As noted above, the trace cache 400 is used for caching and re-playing a previously compiled program sequence for a set of operation requests issued by the application 20. In some embodiments, the trace cache 400 implements some or all of the following features to achieve a reliable and efficient result:

Prevent false matches from occurring

A false match occurs when the trace cache 400 returns a non-matching entry to the C-Scheduler 300. Since the trace cache 400 has no prior knowledge of the next operation request from the application 20, it cannot speculatively assume a partial match (e.g., 95% match) as a complete match. In some embodiments, the information stored in each key entry in the trace cache key accumulator (FIG. 2I) is used to avoid false matches.

The apparently matching trace cache entry should contain at least the program sequences having the same operations and the same relationship between inputs and outputs of the operations. In some embodiments, the ProgGen 600 generates program sequences that depend on the sizes of their input arrays. Accordingly, the program sequences in the trace cache 400 should also encode the sizes of the input arrays. Similarly, the ProgGen 600 uses the fact that an application has dropped references to ports (through release notifications) to avoid producing those ports as outputs. Thus, the program sequences in the trace cache 400 must encode the same port release notifications.

In some embodiments, the trace cache key entries in the accumulator provide a unique and complete characterization of the operation requests in the work queue. Therefore, if the trace cache key matches the content in the accumulator, the re-instantiated program sequence associated with the trace cache key should be identical to the one generated by the ProgGen 600 for the operation requests in the work queue.

Perform trace cache lookup and update efficiently
In some embodiments, all operation requests from the application 20 to the runtime system 10 are either compiled by the ProgGen 600 or re-instantiated from the cached program sequences in the trace cache 400 (or macro cache 500). But the trace cache key accumulation, the trace cache lookup (for both hits and misses), and the program re-instantiation are substantially faster than the operation of the ProgGen 600.

Trace cache key accumulation is an incremental process. Each new trace cache key entry is appended to the end of the existing trace cache key entries in the accumulator, and does not change any existing trace cache key entries. Each port in the trace cache key accumulator is given a unique value, which is referenced by subsequent uses of the port. Checking for repeat occurrences of a port within the key is performed through a hash table and it takes a constant cost to add a new entry into the trace cache 400.

To re-instantiate a previously compiled program sequences quickly (using new input ports and producing new output ports as specified by the work queue), the exact positions of the entries in the work queue are in the same order. Therefore, even work queue entries that are not compiled (e.g. block begin/end markers) should be represented in the trace cache in association with a previously compiled program sequence.

Include profiling data in a cached program sequence
Profiling counters that attribute operation costs to different application API calls are represented in the trace cache 400 in association with a previously compiled program sequence so that the costs associated with different sets of operation requests can be attributed correctly back the source code of the application 20.

Avoid negative impacts caused by trace cache miss
Ideally, an application that does not benefit from the trace cache 400 should perform substantially the same as if the trace cache 400 were disabled. In other words, the cost spent on verifying a cache miss should be minimal. In some embodiments, this feature is accomplished by limiting the cost of comparing a trace cache entry and the total number of trace cache entries to compare.

A trace cache entry is declared immediately as a mismatch if there is a high-level mismatch in the corresponding trace cache key, including a mismatch in the number of work queue entries, the size of key data, or the starting PC. A low-level (or byte-by-byte) comparison of the trace cache key data is necessary only if there is no high-level mismatch.

As will be explained below in connection with FIG. 4A, the trace cache includes multiple buckets, each bucket containing multiple trace cache entries sharing the same starting program counter. In other words, a trace cache entry having a shorter compiled program sequence is a subset of another trace cache entry in the same bucket that has a longer compiled program sequence. If there is no trace cache entry that matches all the entries in the trace cache key accumulator 450, the trace cache 400 may return a trace cache key that matches a subset of the entries to the C-Scheduler 300. In some embodiments, the trace cache lookup is limited to one bucket and the number of entries in a bucket is limited to a small number (e.g., 16 or 32 entries) to keep the trace cache search cost small in the case of a series of cache misses.

Limit the growth of the trace cache 400
The total number of entries in the trace cache 400 is kept with a limit in the case of an application for which trace caching turns to be ineffective (e.g., the probability of having a trace cache matching is very low). Once the total number of entries in the trace cache 400 has reached its limit, one or more existing entries (e.g., the least recently used entry) have to be discarded to leave room for new entries.

Trace cache does not have to persist from run to run
In some embodiments, no persistent caching of generated program sequences is required. Therefore, the trace cache 400 does not have to handle issues such as program addresses changing from run to run. Likewise, the trace cache 400 does not have to resolve issues such as the intrinsic operations may be numbered differently from run to run.

In some embodiments, the trace cache 400 may persist from run to run. In this case, the implementation of a trace cache needs to address the issues mentioned above.

Same-sized inputs produce same-sized outputs
For a given operation performed at separate times during the execution of the application 20, the same-sized inputs should produce the same-sized outputs. Otherwise, it is very difficult for the trace cache 400 to determine whether a given program sequence can be reused or not.

Figure 4A:
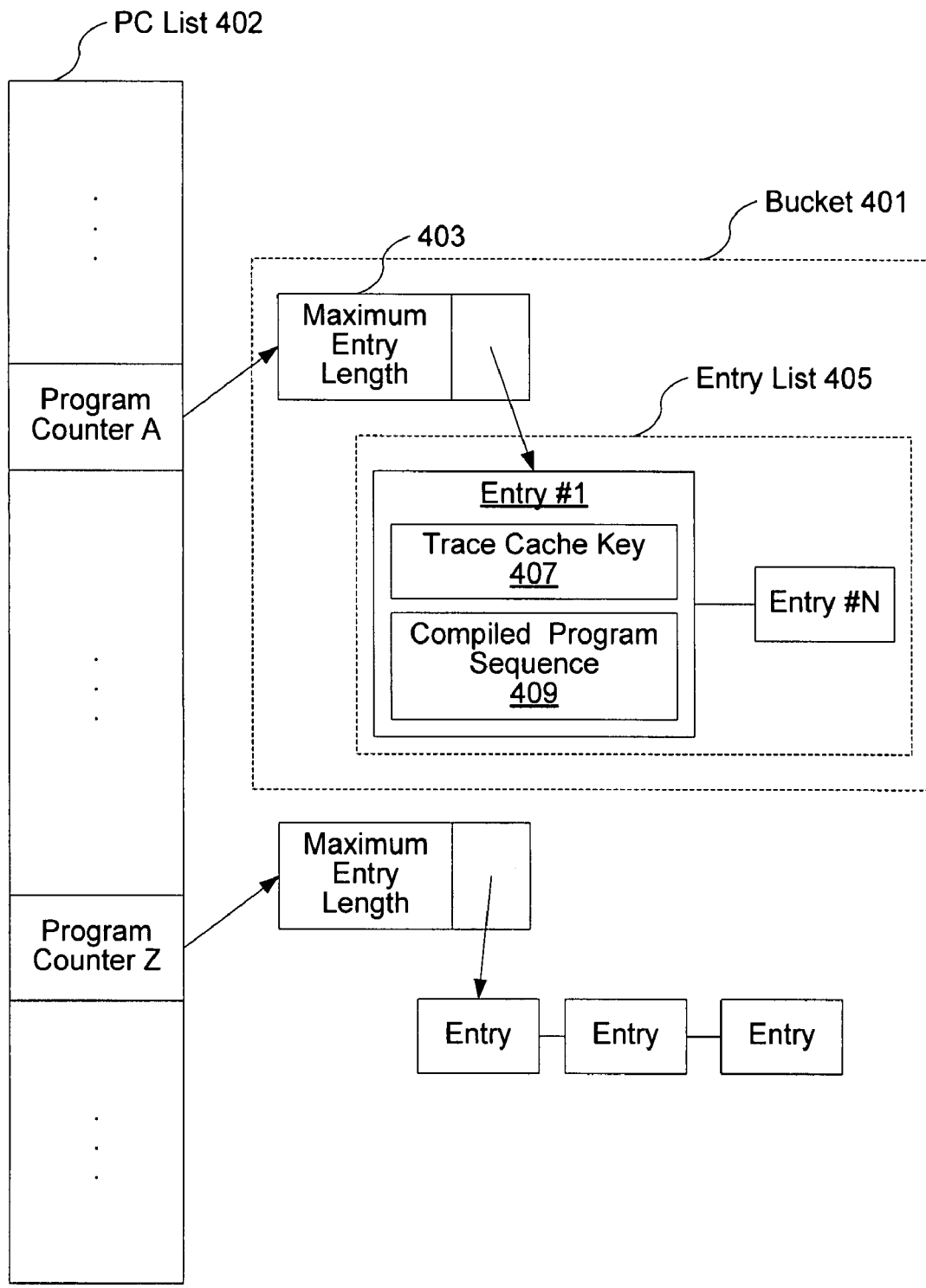

FIG. 4A is a block diagram illustrating the data structure of the trace cache 400 used for storing compiled program sequences generated by the ProgGen 600 according to some embodiments of the present invention. The data structure includes a list of program counters (PC) 402. Each PC in the list 402 has a reference to a bucket 401. As shown in FIG. 2I, the trace cache key accumulator includes one or more key entries each having a PC. The PC of the first key entry in the trace cache key accumulator is used to match a PC in the PC list 402. The bucket 401 has two components, a list of trace cache entries 405 and a maximum entry length 403. Each trace cache entry includes a trace cache key 407 and a previously compiled program sequence 409 associated with the trace cache key 407.

FIG. 4B is a block diagram illustrating the data structure of a trace cache key. In some embodiments, the trace cache key 410 includes the number of work queue entries represented by the key, the key data accumulated in the trace cache key accumulator, the size of the accumulated key data, the program sequence re-instantiation information, and the starting program counter.

Different trace cache keys associated with different trace cache entries within the same bucket may have different numbers of trace cache key entries. The maximum entry length 403 of the bucket 401 indicates the maximum number of key entries of an individual trace cache key within the bucket 401. In some embodiments, this parameter is used by the C-Scheduler 300 to first compare the trace cache key in the accumulator against the longest trace cache entry in the bucket 401 if possible. For example, if the trace cache key accumulator has four key entries, the bucket has first and second trace cache entries whose trace cache keys have four and five key entries, respectively, and the bucket's maximum entry length is therefore five, the C-Scheduler 300 does not perform trace cache lookup until a new key entry is appended to the trace cache key accumulator. When there are five key entries in the accumulator, the C-Scheduler 300 first checks if the five key entries match the trace cache key associated with the second trace cache entry. It does not check the trace cache key associated with the first trace cache entry only if the second trace cache entry is a mismatch.

In some embodiments, the trace cache entries within the bucket 401 are arranged such that the most recently inserted trace cache entry is located at the head of the entry list 405 and the least recently inserted trace cache entry is located at the tail of the entry list 405. After selecting the bucket 401, the C-Scheduler 300 starts with the most recent entry and iterates through each one in the entry list 405 until identifying a match or reaching the tail of the entry list 405. The matching trace cache entry is returned to the C-Scheduler 300 as the result of trace cache lookup.

As noted above, the trace cache 400 may have a limit on the total number of entries, which is a user-configurable variable to avoid waste of memory space. In some embodiments, the trace cache 400 maintains a list of global least-recently-used (LRU) trace cache entries corresponding to different buckets. In some other embodiments, each bucket has its own list of LRU entries. These per-bucket LRU lists are used to limit the number of entries per bucket to avoid excessive trace cache lookup cost. In some embodiments, empty buckets are immediately reclaimed by the runtime system 10 for other purposes. In some other embodiments, the trace cache 400 keeps information to track the empty buckets that are not immediately reclaimed by the runtime system 10.

Figure 4C:
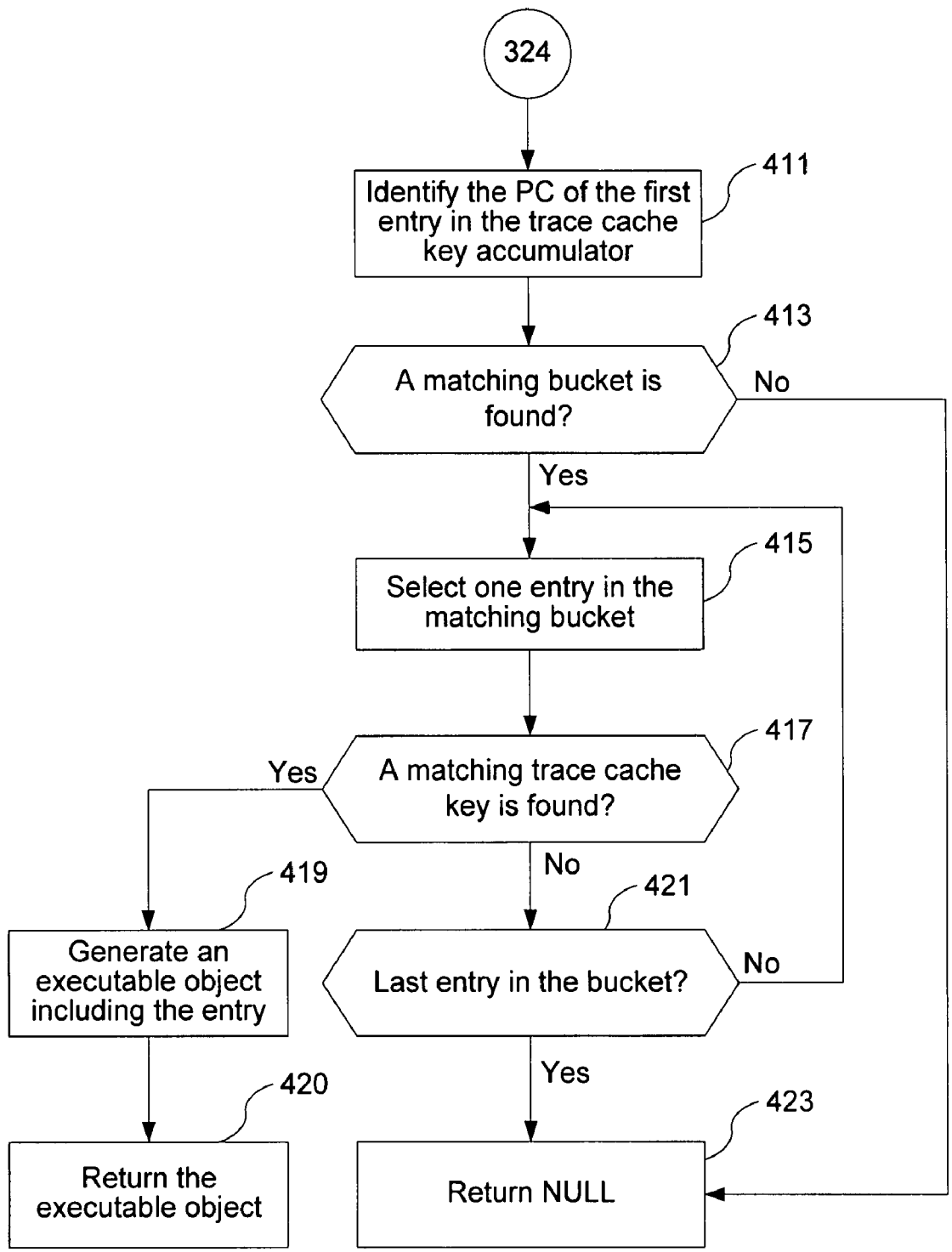

FIG. 4C is a flowchart illustrating the trace cache lookup. If a predefined condition to compile is met (322, yes), the C-Scheduler 300 identifies the PC of the first key entry in the trace cache key accumulator (411). In some embodiments, a matching bucket is found if the identified PC is in the PC list 402. Otherwise (413, no), the trace cache returns a null value to the C-Scheduler 300 (423).

If a matching bucket is found (413, yes), the C-Scheduler 300 selects one entry in the bucket and compares its trace cache key against the key entries in the trace cache key accumulator (415). In some embodiments, the C-Scheduler 300 starts the key data comparison with the largest trace cache entry in the bucket, and if it fails, moves to the next largest entry in the list until either a matching trace cache key entry is found (417, yes) or the last entry in the bucket has been examined (421, yes).

If a matching trace cache entry is found (417, yes), the C-Scheduler 300 generates a new executable object for the matching trace cache entry (419). The executable object is then sent to the E-Scheduler 800 for execution. In some embodiments, to generate the executable object, the C-Scheduler 300 identifies a list of inputs and outputs of a program sequence that is part of the trace cache entry. Each of the inputs and outputs corresponds to a port in the work queue that is used to create the program sequence.

Trace cache lookup is an O(N) operation where N is the number of work queue entries that are being checked for a match. Each trace cache lookup performs a hash lookup to find a bucket that may contain a matching trace cache key and then at most a predefined number of key comparisons. Trace cache lookup also includes a predefined number of constant-time operations such as LRU and statistics updates, etc.

Figure 4D:
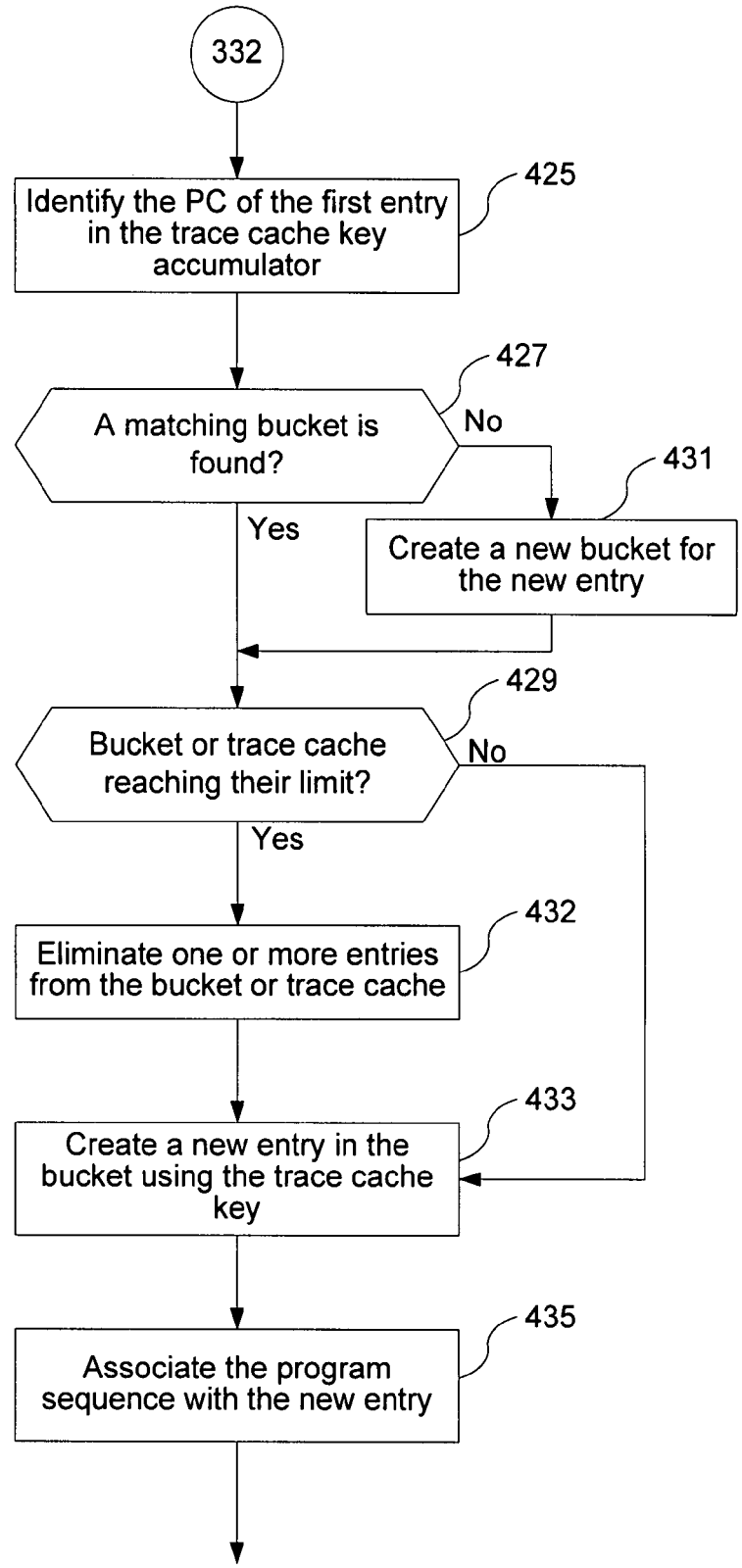

FIG. 4D is a flowchart illustrating the trace cache insertion. In some embodiments, to insert a new entry into the trace cache 400, the C-Scheduler 300 identifies the PC of the first entry in the trace cache key accumulator (425). If the PC of the first entry is in the PC list, a matching bucket is found (427, yes). Otherwise (427, no), the C-Scheduler 300 creates a new bucket for hosting the new trace cache entry (431). Next, the C-Scheduler 300 checks if the global trace cache entry limit or the per-bucket trace cache entry limit has been reached (429). If so (429, yes), one or more existing trace cache entries, e.g., some LRU entries, are eliminated from the trace cache 400 (432). Next, the C-Scheduler 300 creates a new entry in the identified or newly created bucket (433) and associates a compiled program sequence with the new entry (435). Finally, the new trace cache entry is marked as the most recently used entry in the per-bucket and the global LRU lists.

Insertion of an entry into the trace cache 400 is O(1). Several constant-time operations are performed (e.g., reclaiming an expired key and bucket, creating a new one). But none of them depends on the size of either the trace cache 400 or the key being inserted.

The operation of the trace cache 400 assumes that (i) two sets of work queue entries are deemed identical if they satisfy a set of predefined conditions and (ii) therefore, program sequences generated for one set of work queue entries can be reused for the other set. In some embodiments, the set of predefined conditions includes one or more of the following:

The two sets of work queue entries have the same PCs.
The two sets of work queue entries have the same constants and the same constant values to be used to generate specialized code.
The two sets of work queue entries correspond to the same set of operations.
The inputs to the two sets of work queue entries are in the same order, of the same type (constant port or result port) and have the same sizes.

Macro Cache

As noted above, the runtime system 10 employs the macro cache 500 to further improve performance, especially when handling short arrays. Like the trace cache 400, the macro cache 500 reduces the cost of translating operation requests into program sequences to be executed on a processing element. But unlike the trace cache 400, the macro cache 500 is visible to an application developer. The developer can specify a particular code segment, which is also known as a "code reuse section", in the application 20 to be handled by the macro cache 500. Therefore, the developer has to understand what type of operations in the application 20 can be better handled by the macro cache 500 and choose to use this feature carefully.

When a set of operation requests corresponding to a code reuse section reach the C-Scheduler 300 for the first time, the C-Scheduler 300 invokes the ProgGen 600 to compile the operation requests into program sequences and the program sequences are recorded into the macro cache 500. Subsequently, upon receipt of the same set of operation requests, the C-Scheduler 300 retrieves the previously compiled program sequences from the macro cache 500 and replays them with a single call to the E-Scheduler 800.

Figure 5A:
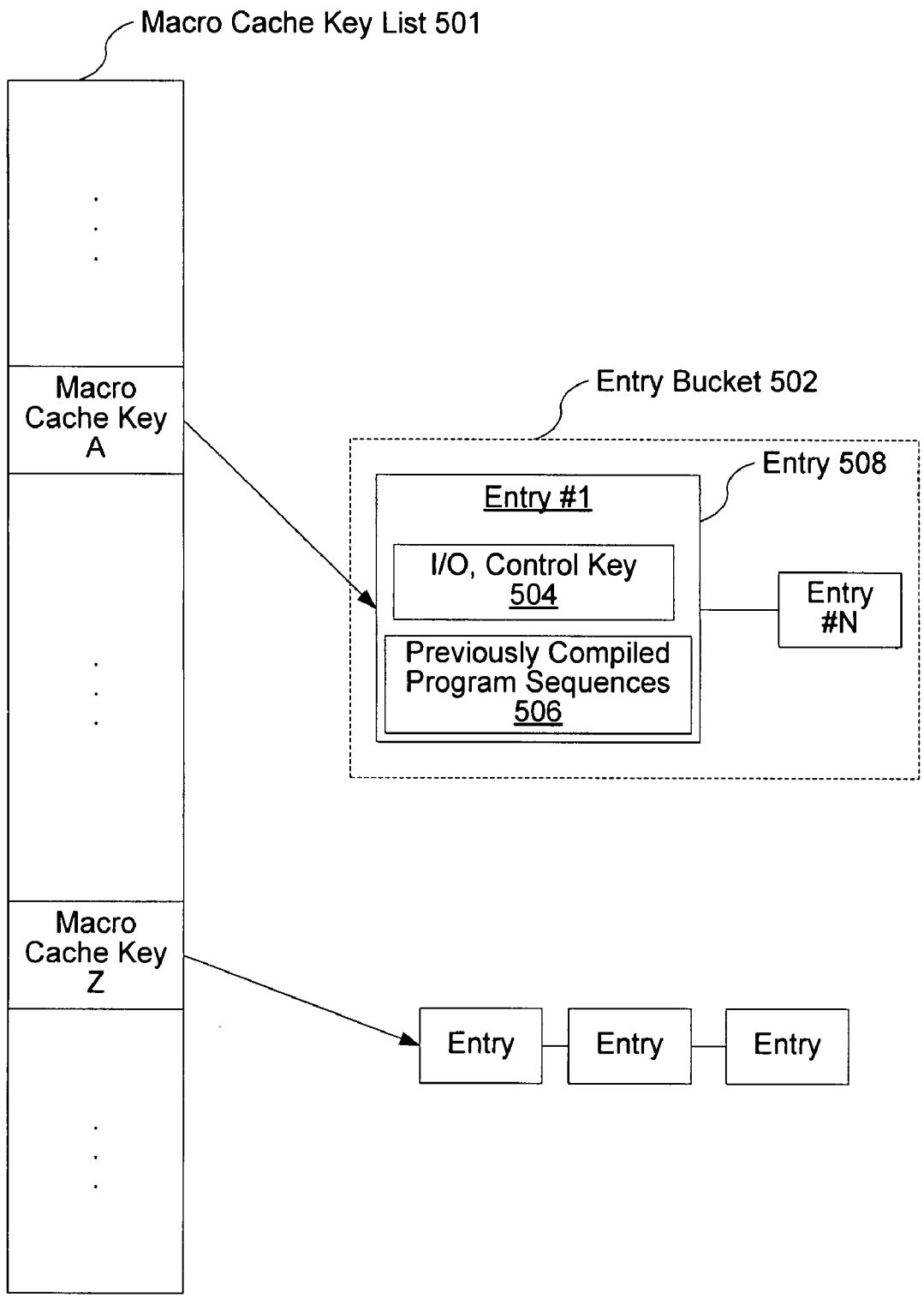
FIGS. 5A through 5C illustrate the operation of the macro cache of the runtime system according to some embodiments of the present invention.

FIG. 5A is a block diagram illustrating the data structure of the macro cache 500. The data structure includes a list of macro cache keys 501. Each macro cache key in the list points to a bucket 502. Each bucket tracks the macro cache entries for a particular macro cache key. In some embodiments, a macro cache entry includes the specific inputs, outputs and control data 504 and the previously compiled program sequence 506 associated with the entry.

The total number of entries in the macro cache 500 is limited by a user-configurable parameter to avoid waste of the runtime system's memory space. In some embodiments, the macro cache 500 maintains a global list that tracks the least recently used entries within the macro cache 500. Each bucket has a per-bucket LRU list. When the macro cache 500 reaches within a predefined range of its limit on the total number of entries, it starts eliminating some entries in the different LRU lists to leave more room for newly generated macro cache entries.

Figure 5B:
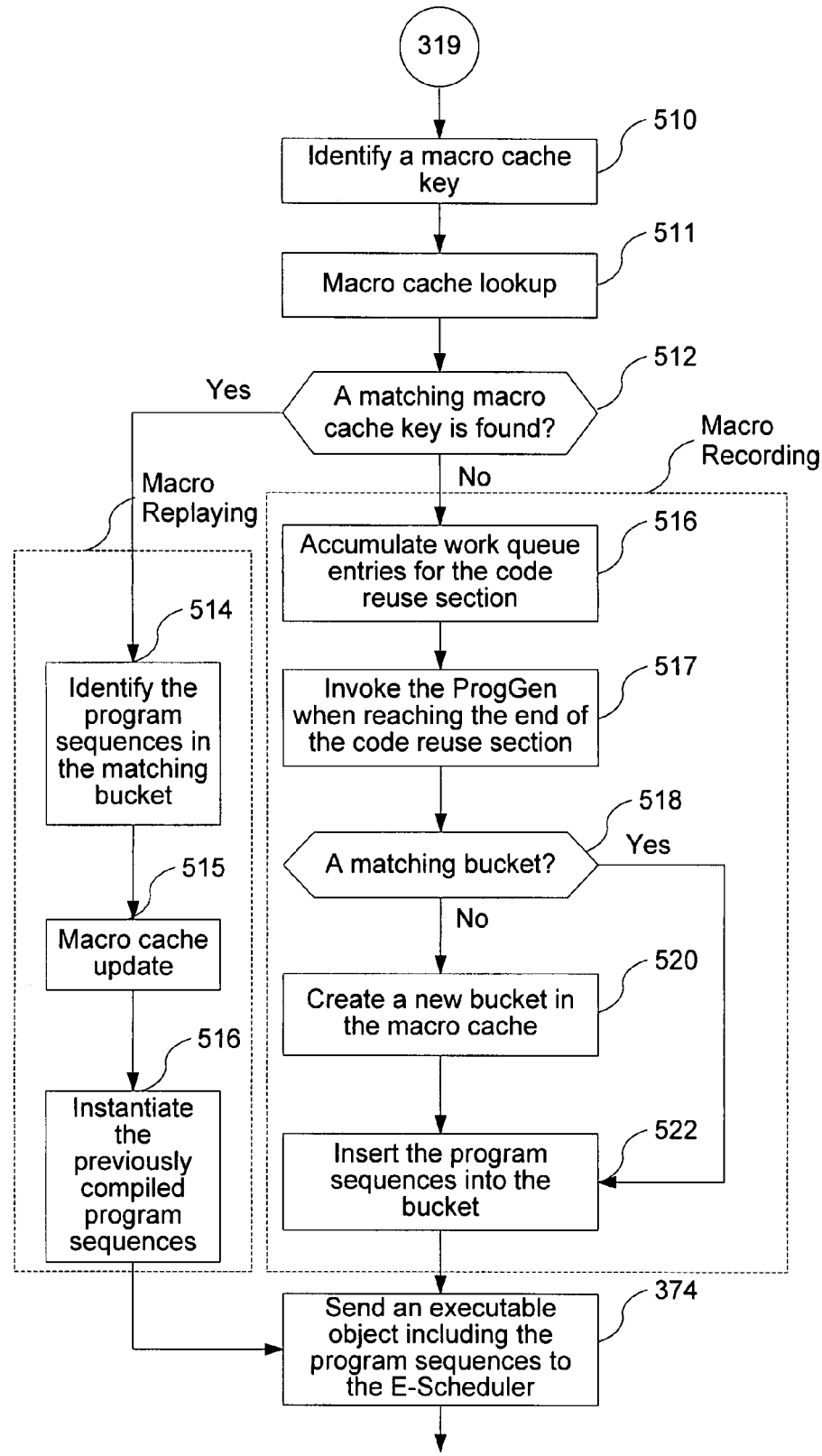

FIG. 5B is a flowchart illustrating the operations associated with the macro cache 500. As noted above in connection with FIG. 3C, an application developer uses specific keywords such as "PS_BEGIN_MACRO" and "PS_END_MACRO" in the source code of the application 20 to invoke the macro cache 500.

Upon receipt of a set of operation requests corresponding to a code reuse section, the C-Scheduler 300 first identifies a macro cache key associated with the code reuse section (510) and then performs a macro cache lookup (511) using the macro cache key to identify a bucket corresponding to the macro cache key.

If this is the first time that the C-Scheduler 300 processes the code reuse section, no matching bucket can be found in the macro cache (512, no). The C-Scheduler 300 then starts a macro recording process including accumulating the work queue entries corresponding to the code reuse section (516) and invoking the ProgGen 600 to compile the accumulated work queue entries when reaching the end of the code reuse section (517). The ProgGen 600 returns one or more compiled program sequences corresponding to the code reuse section. The C-Scheduler 300 is responsible for inserting the compiled program sequences into the macro cache 500.

To insert a macro cache entry into the macro cache 500, the C-Scheduler 300 first checks if the macro cache 500 has reached its capacity limit. If so, the C-Scheduler 300 eliminates one or more entries from the global list of least recently used entries from the macro cache 500. Next, the C-Scheduler 300 checks if the macro cache 500 includes a bucket matching the macro cache key associated with the code reuse section (518). If no matching bucket is found (518, no), the macro cache 500 generates a new bucket and inserts into the new bucket a new macro cache entry 508. As shown in FIG. 5A, the new macro cache entry 508 includes the I/O and control key parameters 504 associated with the code reuse section and the newly compiled program sequences 506 (520, 522).

If an existing bucket is identified as the matching bucket (518, yes), the C-Scheduler 300 then generates a new entry 508 in the bucket to store the newly compiled program sequences. In some embodiments, the C-Scheduler 300 eliminates one or more entries from the bucket's per-bucket list of LRU entries to leave room for the newly created macro cache entry.

If this is not the first time that the C-Scheduler 300 processes the code reuse section, the C-Scheduler 300 should find a bucket matching the macro cache key (512, yes). The C-Scheduler 300 then starts a macro replaying process including identifying a macro cache entry in the bucket that has matching inputs (identical in terms of size, base type, kind, and, if constants, constant value) and control data (514), updating the global list of LRU entries and per-bucket list of LRU entries to identify the matching entry as the most recently used one (515), and instantiating the previously compiled program sequences associated with the matching macro cache entry (516).

At the end of the macro cache lookup and update, the C-Scheduler 300 sends an execution request including the newly compiled program sequences from the ProgGen 600 or the previously compiled program sequences from the macro cache 500 to the E-Scheduler 800.

Figure 5C:
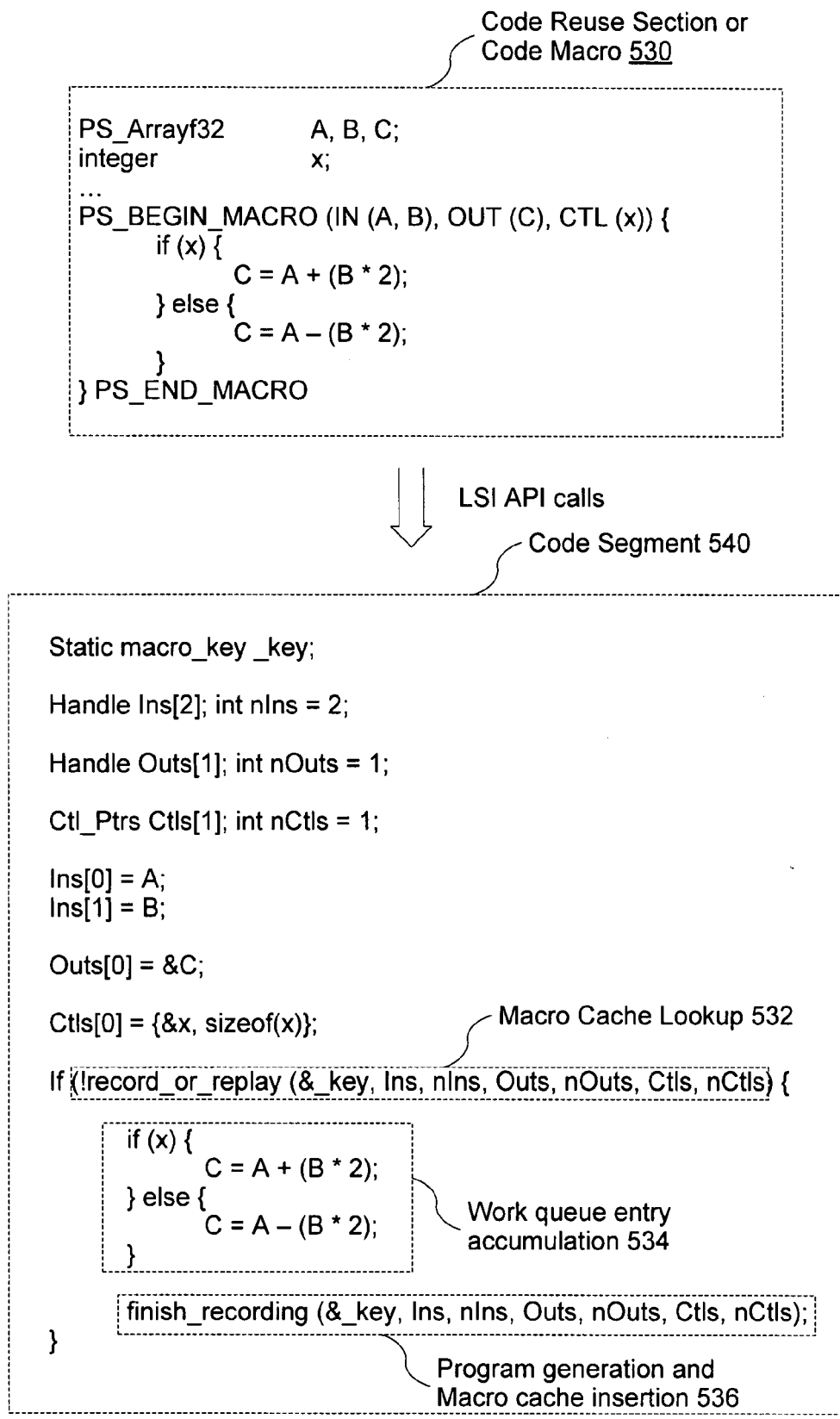

FIG. 5C is an exemplary application segment including a code reuse section 530 (or code macro). Like the example shown in FIG. 3C, the code reuse section 530 is defined by a pair of keywords, "PS_BEGIN_MACRO" and "PS_END_MACRO". One skilled in the art will appreciate that there are other mechanisms of defining a code reuse section. For illustrative purpose, the macro cache key or signature of the code reuse section 530 includes two input variables (A, B), one output variable (C) and a control parameter (x). As noted above in connection with FIGS. 5A and 5B, the code reuse section's signature has to match an entry in the macro cache 500 before the C-Scheduler 300 can replay the previously compiled program sequences associated with the entry. The code reuse section 530 includes an IF-ELSE block. If the control variable x is non-zero, the IF branch of the block is executed and the output C is the result of A+(B*2). But if the control variable x is zero, the ELSE branch is executed and the output C is the result of A−(B*2).

In some embodiments, the runtime system 10 does not allow an input variable or control parameter to be modified within the code reuse section to ensure that each occurrence of a code reuse section uses the same matching entry in the macro cache 500. For example, if there is a statement "A=A−3" before the IF-ELSE block in the code reuse section 530, the C-Scheduler 300 no longer processes the program segment as a valid code reuse section. Instead, the C-Scheduler 300 raises a warning signal to the application 20 and processes the program segment like any other regular code segments in the application 20.

The LSI 100 translates the code reuse section 530 into a code segment 540. The code segment 540 has its own set of parameters corresponding to the inputs, outputs and controls of the code reuse section 530. For example, the element Ins[0] corresponds to the input variable "A" and the element Ins[1] corresponds to the input variable "B". A function call "record_or_replay" in the code segment 540 initiates the macro cache lookup (532), which has been described above in connection with FIG. 5B. The signature of the function call includes the macro cache key "_key" as well as the I/O and control variables. The C-Scheduler 300 uses this information to determine whether there is a matching entry in the macro cache 500. If no matching entry is found (e.g., this is the first occurrence of the code reuse section), the C-Scheduler 300 processes the code reuse section by accumulating entries in the work queue (534). The trace cache key accumulator is not invoked during this process because the compiled program sequences are stored in the macro cache 500, not in the trace cache 400.

Depending on the specific value of the control parameter x, the C-Scheduler 300 processes either the IF branch or the ELSE branch. A function call "finish_recording" (536) follows the work queue entries accumulation. In some embodiments, this function call triggers the ProgGen 600 to generate compiled program sequences for the IF or ELSE branch of the code reuse section. The C-Scheduler 300 then inserts the compiled program sequences into the macro cache 500. Subsequently, when the same code reuse section is re-executed, the runtime system 10 repeats the aforementioned procedures, i.e., checking if there is a matching entry in the macro cache 500 for a given value of the control parameter "x", re-instantiating the previously compiled program sequences if there is a matching entry, or generating a new entry in the macro cache 500 for another control parameter.

In some embodiments, the macro cache 500 implements at least some of the features below to achieve a satisfactory result:

Associate a unique set of parameters including a macro cache key, input and control parameters with a macro cache entry in the macro cache 500

In some embodiments, the parameters associated with a macro cache entry must be matched byte-by-byte before its associated previously compiled program sequences are replayed.

In some embodiments, the input size and type (constant or result) must be matched because it determines the nature of the program sequence to be executed on a GPU. For constant inputs, the actual constant values do not matter because the FE 200 does not perform constant folding, strength reduction, and other types of specialization using the values of the inputs to a code reuse section.

In some embodiments, one or more random number generators (RNG) may be inputs to a code reuse section. In this case, the number of the RNG inputs, their positions in the list of inputs to a code reuse section, and their types must match the parameters associated with a macro cache entry.

Include profiling data in the cached program sequences

Profiling counters that attribute operation costs to different application API calls are represented in the macro cache 500 in association with a previously compiled program sequence so that the costs associated with different sets of operation requests can be attributed correctly back the source code of the application 20.

Avoid negative impacts caused by macro cache miss

Ideally, an application that does not benefit from the macro cache 500 should perform substantially the same as if the macro cache 500 were disabled. In other words, the cost spent on verifying a cache miss should be minimal. In some embodiments, the macro cache 500 uses a mechanism similar to the trace cache 400 for limiting the workload associated with a macro cache miss. For example, the macro cache 500 groups multiple entries into different buckets based on their macro cache key and limits the number of entries with a bucket to keep the macro cache search cost small in the case of a series of cache misses. During a macro cache lookup, at most one bucket is searched.

Limit the growth of the macro cache 500

The total number of entries in the macro cache 500 is kept with a limit in the case of an application for which macro caching turns to be ineffective. When the total number of entries in the macro cache 500 reaches its limit, one or more existing entries (e.g., the least recently used entry) have to be eliminated to leave room for new entries.

Macro cache does not have to persist from run to run

In some embodiments, no persistent caching of generated program sequences is required. Therefore, the macro cache 500 does not have to handle issues such as program addresses changing from run to run. Likewise, the macro cache 500 does not have to resolve issues such as the intrinsic operations may be numbered differently from run to run.

In some embodiments, the macro cache 500 may persist from run to run. In this case, the implementation of the macro cache needs to address the issues mentioned above.

Same-sized inputs produce same-sized outputs

For a given operation performed at separate times during the execution of the application 20, the same-sized inputs should produce the same-sized outputs. Otherwise, it is very difficult for the macro cache 500 to determine whether a given program sequence can be reused or not.

Support nesting and recursion of code reuse sections

In some embodiments, an application developer is allowed to nest code reuse sections so as to record even more operation requests to be performed by a single API call. Likewise, recursion is supported if it is possible for the recursion to terminate. Errors corresponding to incorrect nesting or recursion is detected and reported.

In some embodiments, the nesting and recursion of code reuse sections are supported by keeping a stack that tracks all "PS_BEGIN_MACRO" declarations for code reuse sections that the application 20 is currently recording. Upon detecting a new "PS_BEGIN_MACRO" declaration, the C-Scheduler 300 checks the stack for any matching declarations. If a matching declaration is found, the recursion condition is deemed illegal and an error is reported to the application 20. Likewise, upon detecting an "PS_END_MACRO" declaration, the C-Scheduler 300 compares the declaration with the most recent "PS_BEGIN_MACRO" declaration on the stack. If they do not correspond to the same code reuse section, an incorrect macro nesting has occurred and an error is reported to the application 20.

In some embodiments, the C-Scheduler 300 starts macro caching with a function call "MacroBegin". If a code reuse section is currently being recorded, the C-Scheduler 300 checks the function call is part of a recursion while allowing the existing code reuse section to be recorded. If no code reuse section is currently being recorded, the C-Scheduler 300 submits the current work queue entries to the ProgGen 600 for compiled program sequences generation and then starts macro recording of the code reuse section.

In some embodiments, the trace cache 400 is disabled while a code reuse section is being recorded. For example, there is no accumulation of trace cache key entries in the trace cache key accumulator during macro recording and the generated program sequences are not deposited in the trace cache 400. In some other embodiments, the trace cache 400 is enabled during macro recording of a code reuse section such that repeated sequences of operation requests can be recognized and replayed using the trace cache 400.

In some embodiments, read/write operations are deemed illegal during the macro recording of a code reuse section. Recursion that starts a code reuse section with the same key, inputs, and controls is also illegal during the macro recording. The occurrence of any illegal operations during the macro recording causes an error to be reported back the application 20 as described previously.

In some embodiments, the C-Scheduler 300 performs error checking to verify that only ports that are declared as inputs to a code reuse section and ports that computed from the input ports are used by the operations within a code reuse section. In some embodiments, the inputs to a code reuse section cannot be overwritten during the execution of the code reuse section, and any outputs from the code reuse section that are not properly declared in the macro specification may cause an error at run time.

In some embodiments, constant folding and other specialization utilizing the values of constant inputs to a code reuse section are not allowed while the code reuse section is being recorded.

At the end of macro recording, the C-Scheduler makes another function call "MacroEnd". This function call causes all operations registered in the work queue to be compiled, and a macro cache entry to be generated in the macro cache 500 that can be used to replay the code reuse section.

As noted above, when a macro cache entry is used to replay a previously recorded code reuse section, one or more executable objects are created to perform the previously compiled program sequences associated with the code reuse section. The C-Scheduler 300 associates the ports in the executable objects with the new inputs and outputs of the code reuse section being replayed. The C-Scheduler 300 also creates temporary ports for temporary values used by the program sequences and attaches the temporary ports to the executable objects. The new executable objects are then submitted to the E-Scheduler 800 for execution.

As noted above, random number generators can be used inside a code reuse section for generating random numbers. In some embodiments, the macro cache 500 supports updating a random number generator's seed data by recording all uses of the random number generator inside the code reuse section so that each successive invocation of the random number generator produces different values.

In some embodiments, if a code reuse section uses a random number generator that produces seed data to be used as an input to the code reuse section, the macro cache 500 records references to the random number generator's seed data ports used by the random number generator. Likewise, function calls to the random number generator inside the code reuse section are recorded. Before a macro cache entry corresponding to the code reuse section is replayed, the random number generator is invoked to produce new seed data and update its internal seed state. The new seed data is used as inputs to the executable objects that are executed as part of replaying the macro cache entry.

In some embodiments, if a code reuse section uses a random number generator that produces new seed data as a by-product of program sequences that are executed when replaying a macro cache entry corresponding to the code reuse section, the macro cache 500 records references to the random number generator's seed data ports produced by these program sequences during the initial macro recording. Likewise, function calls to the random number generator inside the code reuse section are recorded. After the macro cache entry's associated executable objects are created, the random number generator is invoked to update its internal seed state.

Compared with the trace cache 400, the macro cache 500 may dramatically improve the runtime system's performance of executing operations on small arrays. In some embodiments, there are fixed and variable costs associated with performing operations using the runtime system 10. Under normal, transparent use of the API, the fixed cost includes, but is not limited to, the cost of calling functions in the LSI 100 for each operation, constructing the corresponding IR nodes and verifying correct API usage in the FE 200, entering the IR nodes into the work queue 304 in the C-Scheduler 300, trace cache key accumulation 320, and trace cache lookup 324. The fixed cost is independent from the size of the data arrays being processed but is proportional to the number of calls to the LSI 100. By contrast, the variable cost is a function of the size of the data arrays being processed and the cost for processing a long data array is usually higher than the cost for processing a short data array. In some embodiments, the variable cost is dominated by the cost of executing the compute kernels in the program sequence and movement of data. Therefore, the fixed cost often dominates the cost for processing a short data array using the trace cache 400. Because the macro cache 500 circumvents the calls to the LSI 100 contained within a code reuse section in the case of a macro cache hit, it can significantly reduce the fixed cost during the replay of a macro cache entry and therefore achieve a better performance when processing short arrays.

In some embodiments, an LSI module provides language-specific syntactic markers used to identify code reuse sections within an application. At run-time, the functions provided by the LSI module performs error checking and argument validation before invoking the FE 200 to require that the code reuse section be replayed or recorded by the runtime system 10.

In some embodiments, a static preprocessor or compiler may automatically insert macros around code reuse sections if the tool deems it is desired to do so.

In some embodiments, the LSI 100, the FE 200, and the C-Scheduler 300 may detect and report an error when the application 20 performs one or more operations prohibited from being within a code reuse section.

In some embodiments, the LSI modules for different languages may be interoperable. For example, the macro cache implementation for a particular LSI module may support passing objects of all interoperating LSI modules into a particular code reuse section. The C++ LSI supports this feature by using overloaded functions to coerce C object pointers and C++ objects into a common representation used for building the code reuse section's input and output description arrays.

Program Generator

As noted above, the C-Scheduler 300 invokes the ProgGen 600 to generate compiled program sequences, when necessary, such as on a cache miss in the trace cache 400 or macro cache 500.

ProgGen Overview

In some embodiments, the ProgGen 600 is responsible for determining whether there are a sufficient number of operations in the work queue to generate an efficient program sequence and if so, which operations from the work queue should be performed by the program sequence. In some embodiments, the ProgGen 600 is also responsible for generating the executable program sequence, and sets of input and output ports for operations in the work queue that correspond to the inputs and outputs operated on by the program sequence. In some embodiments, the ProgGen 600 is also responsible for determining which work-queue entries the C-Scheduler 300 should remove from the work queue after the ProgGen 600 returns the program sequence and which work-queue entries the C-Scheduler 300 should include in the trace cache key, if the program sequence is to be inserted into the trace cache 400.

During the construction of a program sequence, the ProgGen 600 is configured to determine which operations to include in the program sequence, to choose the most efficient kinds of execution targets for these operations, and to select and/or generate optimized compute kernels for the operations. As previously mentioned, in some embodiments, the ProgGen 600 may generate compute kernels or whole program sequences for multiple kinds of processing elements for the same set of operations so that the kinds of processing elements may be selected dynamically by the C-Scheduler 300 and/or E-Scheduler 800.

In some embodiments, the compute kernel, or a program within the program sequence, is the smallest executable unit of computation managed by the E-Scheduler 800 and Executors 900. In some embodiments, for some kinds of processing elements, the compute kernel is executed in parallel, SPMD-style (single program, multiple data), on the selected processing element(s) of the parallel-processing system. In some embodiments, for some kinds of processing elements, the compute kernel may perform vector operations, which compute multiple result elements in parallel. In some embodiments, for some kinds of processing elements, both forms of parallel execution may be employed by the same compute kernel. In some embodiments, for certain kinds of processing elements, other forms of parallel execution may be used to compute multiple result elements in parallel. In some embodiments, for some kinds of processing elements, the compute kernel may contain loops to iterate over many data elements or groups of data elements.

Note that, conceptually, and on some processing elements even in practice, each result element computed by a compute kernel is computed simultaneously, in parallel. In some embodiments, for some processing elements, synchronization of all processing elements executing the compute kernel may not be feasible or even possible within the kernel, but only between kernel executions. Without synchronization, the correct ordering of stores of result elements by one processing element and loads of the elements by another processing element cannot be guaranteed in a parallel-processing system.

In order to generate efficient compute kernels from a sequence of operations, the ProgGen 600 must determine which operations may be executed together as part of the same compute kernels. The transformations used to form compute kernels are similar to loop fusion and scalar replacement. To fuse operations into the same compute kernel, the ProgGen 600 generates code into the body of the compute kernel that implements the fused operations element-wise, one element or one vector of elements at a time, such that the result(s) of a fused operation may be passed directly to a consuming operation fused into the same kernel using the most efficient means possible on the target architecture (e.g., using registers), without first storing the results to an array and then subsequently loading them back again. In fact, the stores of results may be omitted entirely in the case that all consumers of a result are fused into the same kernel as the operation that generates the result. It is also possible to eliminate redundant calculations within a compute kernel, by common sub-expression elimination. On the other hand, in some embodiments, some operations may be computed by more than one compute kernel where the ProgGen 600 decides that recomputing the results of the operations would be more efficient than storing them and reloading them.

In some embodiments, attention is given to formation of large compute kernels containing many operations. Executing fewer, larger kernels usually incurs less overhead than executing more, smaller kernels, since on many target architectures there is synchronization and other overhead associated with launching compute kernels. Another important factor is the reduction in memory accesses by scalar replacement. On modern processors, the ratio of the amount of memory bandwidth to computational throughput is typically very low. Thus, the more computation that can be done per memory access, the more efficiently the compute kernel is likely to be. Automatic kernel synthesis by the runtime system 10 both saves the application developer a great deal of effort and allows the system to optimize performance for new processing elements without changes to the application.

In some embodiments, some primitive operations in the primitive libraries 660 for the chosen type of processing element can be fusible into a compute kernel. In some embodiments, there may be multiple primitive libraries, one for each type of processing element. In some embodiments, primitive operations are represented as source code of a high-level language, such as C or High-Level Shading Language (HLSL). In some embodiments, primitive operations are represented as assembly code. In some embodiments, primitive operations are represented using a lower-level intermediate representation, which is capable of representing implementation details of the primitive operations. In some embodiments, implementations of primitive operations are not stored directly in the primitive libraries 660, but are generated on demand. The type of representation of the primitive operations determines what type of processing is required in order to produce the final executable binary for the compute kernel. Depending on the representation, it might require compilation, code generation, register allocation and scheduling, assembly, and/or linking.

In addition to being implemented as primitive operations for the chosen type of processing element, in order for two operations to be fused into the same compute kernel, the ProgGen 600 needs to select the same type of processing element for both operations. Moreover, where one operation produces the input of another, the second operation may only consume the results of the first computed at the same array positions, meaning that the operations may be composed element-wise. In order to achieve this, the ProgGen 600 in some embodiments determines at kernel-generation time which result elements of the producer operation are consumed by which elements of the consumer operation, such as in the case of simple element-wise operations like ADD and MULTIPLY. Where this determination cannot be made, such as with a gather of elements from run-time-computed locations, the operations cannot be fused.

In some embodiments, the ProgGen 600 may not be capable of performing the index transformations necessary for fusion of certain operations. For example, to fuse a transpose operation with the operations producing the array to be transposed, either the producing operations (i.e., the entire sub-graph of operations feeding the transpose, up to loads from memory) or the consuming operations (i.e., the entire sub-graph of operations consuming the result of the transpose, down to stores to memory) must be transposed. In some embodiments, the results of operations fused into the same compute kernel may be required to be the same size, shape, and type. In some embodiments, the sizes, shapes, and types of the results only need to match where they need to be written to memory. In some embodiments, computations of certain elements may be duplicated and/or guarded by conditionals (including predicates) as needed in order to facilitate fusion with operations computing different numbers of elements. For example, operations computing a scalar result could be fused with an operation that multiplies that scalar by a vector, thereby producing a vector. For some types of processing elements, the computations generating the scalar result could be duplicated for each processing element.

In some embodiments, for some types of processing elements, portions of operations computing recurrences, such as reductions and parallel-prefix scans may be fused with producers and/or consumers, since such operations have statically determinable correspondences between input elements and output elements.

In some embodiments, independent computations with the same algorithmic structure may be fused. For example, different independent reductions of the same-sized arrays may be fused so that they are computed simultaneously. This is most advantageous when both operations share some or all of the same input arrays and same data access patterns, since the number of accesses to memory may then be reduced, but may also yield benefits on some target architectures, where the overhead of launching kernels is high, by reducing the number of kernels.

In some embodiments, the ProgGen 600 may choose to place independent operations into separate compute kernels so that those kernels may be executed in a task-parallel manner.

In some embodiments, some target architecture(s) may have resource limitations that cannot be efficiently mitigated by software, thus imposing restrictions on the compute kernels that can be generated. For example, there may be limits on the numbers of instructions that can comprise a compute kernel, the number of hardware registers of different kinds that can be used by the instructions, the number of input and/or output arrays that can be accessed by the kernel, the number of arguments to the kernel, and/or the amount of memory that can be accessed by the kernel. In such embodiments, the ProgGen 600 estimates the amount of resources the kernel will use as it constructs the kernel and ensures the limits required for correct operation are not exceeded by the completed executable compute kernel.

In some embodiments, the ProgGen 600 may put operations into separate compute kernels for other processor-specific reasons, such as to impose a global barrier across all hardware threads or to change the number of active threads.

In some embodiments, not all operations may be fusible for every type of processing element. There is no requirement that the same operations be fusible for every type of processing element supported by the runtime system 10. In some embodiments, such non-fusible operations may be implemented differently from the primitive operations. These operations, called intrinsic operations, need not be constrained by all of the same restrictions as primitive operations. Intrinsic operations may be implemented using any number of hand-coded compute kernels, which are stored in the intrinsic library 700. In some embodiments, for some kinds of processing elements, multiple kernels may be required in order to implement certain operations. This is why the ProgGen 600 can return program sequences rather than just individual compute kernels.

In some embodiments, there may be multiple intrinsic libraries, one for each type of processing element. Each intrinsic may have an associated, custom hand-coded routine to be invoked by the ProgGen 600 that selects the compute kernels to use for a particular intrinsic operation, specifies how to pass data between the kernels, decides what temporary memory is needed to hold intermediate results, determines the launch specifications for the kernels, and so on. In some embodiments, these hand-coded kernels may be written in device-specific high-level languages, such as HLSL. In some embodiments, they may be written in assembly language. In some embodiments, both kinds of compute kernels may be supported for intrinsic operations. In some embodiments, compute kernels for intrinsic operations are stored in executable binary form, in which case they just need to be loaded on demand by the runtime system 10.

In some embodiments, for some target architectures, the implementations of certain operations may be comprised of multiple parts, where some parts are fusible and some parts are non-fusible and/or different fusible parts have different fusion criteria. For example, the first step of a multi-step reduction algorithm may, in some cases, be fused with the producers of the input to the operation, the last step may be fusible with consumers of the result of the reduction, and intermediate steps (as well as the first and last) of the algorithm could be fused with other similar operations.

Figure 6A:
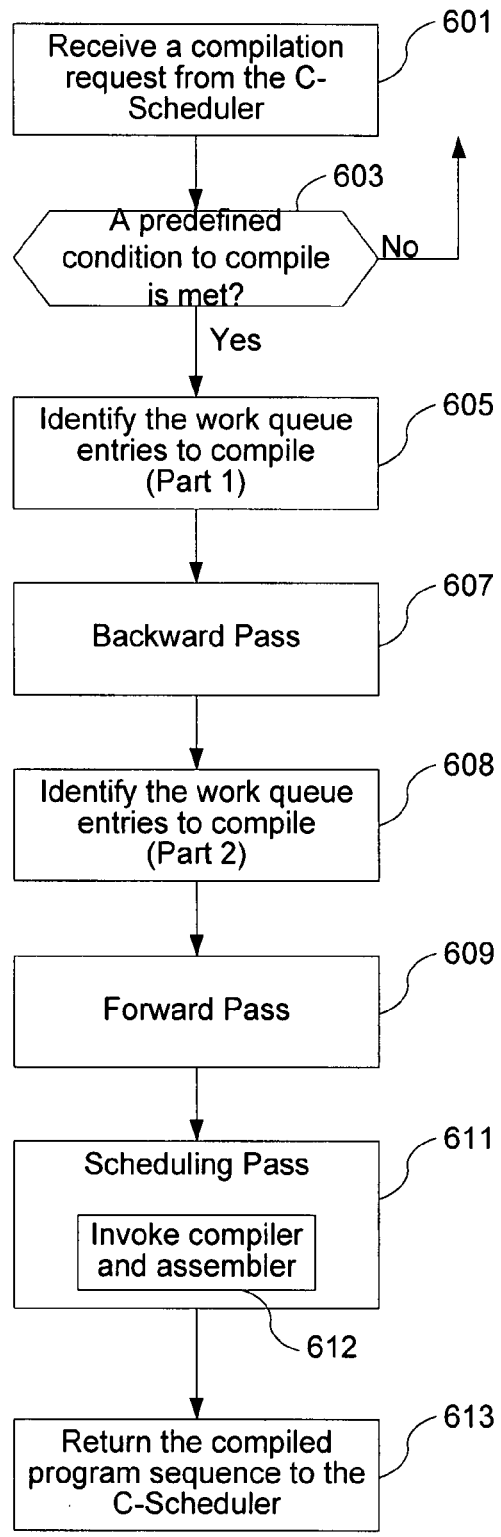

FIG. 6A is an overview flowchart illustrating how the ProgGen 600 generates a compiled program sequence. As noted above in connection with FIGS. 3B and 5B, the C-Scheduler 300 sends a compilation request to the ProgGen 600 if a predefined condition is met. In some embodiments, upon receipt of the compilation request (601), the ProgGen 600 determines whether it should compile the current set of work queue entries based on its own set of criteria (603). For example, the ProgGen 600 may reject the compilation request if the total number of instructions associated with the work queue entries has not reached a predefined threshold level or if the ratio between the numbers of GPU instructions and memory accesses is lower than a predefined value (e.g., 30:1). In some embodiments, the C-Scheduler 300 may compel the ProgGen 600 to process the work queue entries in certain situations, such as when it must produce data to satisfy a read request from the application 20.

For a specific set of work queue entries, the ProgGen 600 is responsible for choosing a processing element to execute the programs corresponding to the work queue entries. If the ProgGen 600 determines that one or more CPUs are a preferred choice for the set of work queue entries, it generates either CPU-based source code (630) or interpreter operations (628). In some embodiments, a set of CPU-based tools 632 such as preprocessor, compiler, assembler and linker are invoked to convert the CPU-based source code into the CPU binary code (634). Depending on the specific source code and the CPU architecture, some of the CPU-based tools such as the preprocessor and linker are optional in the conversion of the source into the binary code.

If the ProgGen 600 chooses one or more GPUs to handle the set of work queue entries, the ProgGen 600 then generates the GPU source code for the work queue entries (629). The GPU compiler 631 and GPU assembler 635 are invoked to generate the GPU assembly code (633) and the GPU binary code (637), respectively. Finally, the ProgGen 600 combines the CPU binary code (634), the interpreter operations (628), and the GPU binary code (637) into a compiled program sequence (638), which is sent to the E-Scheduler 800 for execution (639).

In some embodiments, the primitive and intrinsic operations for which the ProgGen 600 can generate compiled program sequences include, without limitation, map (element-wise operations, such as add, multiply, sine, cosine, etc.), reduction (in one or multiple dimensions), generators (random-number generation, index, identity), spread (replicate an element, row, or column to create a higher-dimensional array), transpose, block copy, periodic copy, gather, matrix multiply, convolution, correlation, LU decomposition, LU solver, LU condition, LU unpack, FFT, and sparse matrix-vector multiplication.

The Program Sequence Generation Decision

The ProgGen 600 first makes a quick decision (603) about whether to generate a program sequence from the current contents of the work queue 304 or not. In some embodiments, this decision may be based simply on the number of entries in the work queue.

In some embodiments, the ProgGen 600 checks whether the leading entry in the work queue is a fusible operation or not (605). If the entry is not fusible, there is little benefit from including the entry in a large program sequence. Accordingly, the ProgGen 600 generates a compiled program sequence including this entry and other associated entries. For this reason, in some embodiments, the entry of a non-fusible operation into an empty work queue may cause the C-Scheduler 300 to invoke the ProgGen 600 to start processing the current work queue entries.

In some embodiments, the program sequence generated by the ProgGen 600 is a list of executable programs (aka kernels) and associated information needed to allocate memory for output and temporary buffers, bind actual buffers and constants to formal program input and output parameters, dispatch the programs to executors, enforce dependences between programs, execute the (SPMD—single program, multiple data) programs in parallel on the desired target architecture(s), and accumulate execution data for the profiler corresponding to the original API calls. In some embodiments, it may be convenient, and more efficient, to store this information in more than one form, and/or in target-specific, ready-to-use forms. For example, executable instructions and read-only data would typically be loaded into memory accessible to the processing element(s).

FIG. 6B is a block diagram illustrating the data structure of a program sequence 615 generated by the ProgGen 600. The program sequence 615 includes one or more programs, Program #1, . . . , Program #N. Each program has its own formal input and output parameters 615-1, 615-2, executable binary code 615-3, executor type 615-4, and launch specification 615-5. The formal input and output parameters of each program refer, indirectly, to input constants and input, output, and temporary buffers of the entire program sequence 615. In some embodiments, these parameters may specify the type of constant or buffer (input, output, temporary) and a number that uniquely identifies the operand within the context of the program sequence (e.g., the $5^{th}$ output buffer).

In some embodiments, each program additionally contains execution data and/or other information for the profiler, or handles to such. For example, a program could contain a list of the return addresses of calls into the API corresponding to the operations that comprise the program, which, with ordinary debugging information, could be used to identify the lines of the application executed to form the program. The program sequence 615 additionally contains descriptions of any temporary buffers (e.g., size or data type and dimensions) that need to be allocated for storage of intermediate results within or between programs of the sequence. (Temporary buffers are used only within the span of a single program sequence.) In some embodiments, the program sequence 615 may contain descriptions of input constants and buffers and/or output buffers as well. These input constants and buffers and output buffers correspond to ports associated with computations in the work queue.

The ProgGen 600 returns enough information to the C-Scheduler 300 so that it may infer this correspondence. In some embodiments, the ProgGen 600 may return explicit mappings from the formal-parameter identifiers to input and output ports. In some embodiments, the ProgGen may return these mappings in terms of work-queue entries (e.g., the $2^{nd}$ input to the operation in the $5^{th}$ work-queue entry). In some embodiments, the mapping of work-queue entries and/or macro inputs and outputs may be stored as part of the program sequence 615. In some embodiments, these mappings may be stored in their respective cache entries.

In some embodiments, the ProgGen 600 also decides the formats and/or layouts of the output and temporary buffers, the specifications of which are attached to the descriptions of the output and temporary buffers. The format and/or layout may include, for example, the amount of column and/or row padding or the data tiling pattern. In some embodiments, these buffer descriptions may be used by the runtime system 10 to determine the amount of memory required for the buffers and to specify how the array's elements must be indexed, by software and/or by hardware. For instance, the column length summed with the amount of padding at the end of each column is necessary in order to compute linear indices of two-dimensional arrays with column-major layout.

As an example, many GPUs provide hardware support for indexing into multi-dimensional arrays with a variety of linear and tiled data layouts. Due to the effects of these data layouts on memory addresses of elements accessed in particular sequences and their interaction with the GPUs' memory controllers and caches, certain layouts yield significantly better performance than other layouts for certain access patterns. It may in some cases be desirable to reinterpret the layouts of buffers, for example writing them using one layout and reading them using another, thereby allowing different programs to access the same data with different indexing schemes. In some embodiments, this can be done by specifying buffer layouts on a per-program basis in the program sequence, for cases where buffers should be interpreted differently from their "natural" layouts. The GPU Executor 900-1 (FIG. 1) can then use this information to modify the GPU's hardware buffer-layout settings, as necessary.

The launch specification includes whatever other information or arguments (in addition to the inputs and outputs) are needed to launch the SPMD, data-parallel program on the processing element(s). For example, it may include the number of processors, cores, and/or threads to use to execute the program. Alternatively, it may specify the number of work items to be executed in parallel rather than the amount of hardware resources to apply. In some embodiments, it may specify other required resources, such as amount of on-chip memory needed. In some embodiments, the launch specification could also include arguments derived from parameters of the operations to be performed, such as sizes and offsets of sub-arrays to be copied.

In some embodiments, the E-Scheduler 800 selects among executors of the same kind for executing the program sequence. The metrics employed by the E-Scheduler 800 in choosing a processing element may include, for example, the ProgGen's estimate of the cost for executing a specific instance of program sequence on the processing element(s), the location of the input data to the instance of the program sequence, the desired location of the output data produced by the instance of the program sequence, and the amount of outstand workload at the processing element. In some embodiments, these cost estimates may be recorded in the program sequence 615. In other embodiments, they may be returned by the ProgGen 600 separately.

In some embodiments, the ProgGen 600 generates multiple compiled programs or even whole program sequences for the same sequence of operations, each targeting a different processor type. The C-Scheduler 300 and/or the E-Scheduler 800 choose to execute one of the multiple compiled program sequences on a particular type of processing element based on several factors, including, but not limited to, processor load, processor failure/faults, processor memory load and contents, and system configuration. The E-Scheduler 800 then submits the chosen instance to the corresponding executor(s) for execution. This configuration can dramatically enhance the runtime system's performance, reliability, and fault recoverability.

Consumer Analysis

If the ProgGen 600 decides to process the work queue entries because a predefined condition is met (603, yes), the ProgGen 600 performs a backward analysis over the work queue entries (607), which identifies consumer entries that accept as input the results from producer entries, propagates information about the consumer entries to the producer entries, determines the locations of release entries in the work queue corresponding to results of earlier compute entries, and identifies the "dead" operations (i.e., operations whose results are released without being consumed by other operations). In some embodiments, the identification of dead operations may be omitted, under the assumption that the user would not request unnecessary operations to be performed. This analysis, which is similar to live-variables analysis and def-use analysis, is essential to the kernel-formation process.

Work Queue Selection Heuristic

In some embodiments, the ProgGen 600 may choose to only process a subset of the current work queue entries based on the certain heuristics. The remaining work queue entries are left for the next compilation request. In some embodiments, if the leading work queue entry is fusible, the ProgGen 600 then selects a specific number of work queue entries to process during this invocation (608). The ProgGen 600 selects the set of work queue entries based on deterministic properties of the entries, e.g., the numbers and types of operations, data array sizes, patterns of call addresses or return addresses of calls into the runtime system 10, and hints from the application's developer. In some embodiments, the ProgGen 600 considers the loop boundaries in the application 20, the predicted memory usage by the program sequence generated from the selected work queue entries, and the estimated number of instructions in the program sequence.

In some embodiments, the ProgGen 600 identifies the loop boundaries in the application 20 through analysis of API call return addresses—repeated addresses may indicate that the operations are contained within a loop. The predicted memory usage by the operations is based on the sizes of arrays read by work queue operations that are not computed within the current work queue, sizes of arrays computed that are not released, and sizes of arrays computed by non-fusible operations, all of which always require buffers to be allocated to store their data. Additional heuristics are necessary to approximate memory consumed by released arrays (identified during the backward pass 607) computed by fusible operations, since once they are fused not all of those results need to be stored to memory. In some embodiments, the sizes of such arrays could be multiplied by estimates of the likelihood that they would be instantiated in memory. The number of instructions is estimated by querying the primitive libraries 660 for the instruction count of each operation performed by the program sequence.

The ProgGen 600 pays careful attention to the loop boundaries inferred from the sequence of API calls from the application 20 because the loop boundaries provide hints about the structure of the computation and where good program boundaries might be; they also provide hints about what operation sequences the application 20 will generate in the future. The former is important to the formation of efficient compute kernels, while the latter is important for choosing where trace cache keys will begin. Loop boundaries are good candidate locations for program boundaries because applications will typically have few ports live at such points. Loop boundaries are good locations for trace cache keys to begin because future iterations will start at the same PC, which is a requirement for reuse via the Trace Cache 400. The ProgGen 600 takes memory usage into consideration in order to ensure that all output and temporary buffers of any program sequence may be allocated memory up-front, prior to execution of any programs in the sequence. The instruction count is merely a proxy for the length of the program sequence. It is undesirable for a program sequence to be excessively long. It would be best for it to contain just one or a small number of programs. Therefore, the ProgGen 600 limits itself to the number of instructions needed to fill a few programs.

In some embodiments, the ProgGen 600 does not restrict itself in advance as to which work queue entries it can process during its scheduling pass (611), in which case it must decide how much of the work queue to consume on-the-fly during the scheduling pass (611).

In some embodiments, the ProgGen 600 distinguishes the number of work queue entries to be compiled and number of work queue entries in the trace cache key accumulator. By doing so, the ProgGen 600 can use information about port releases further ahead in the work queue without generating programs for all of the intervening work queue entries. In some embodiments, the ProgGen 600 may use information about port releases from the entire work queue 304 in the case that the program sequence 615 (FIG. 6B) is to be part of an entry in the macro cache 500, since the ProgGen 600 knows with certainty that, unlike when the trace cache 400 is used, all of the program sequences generated from the current work queue will be replayed in the same sequence as they are generated.

Collect Inputs, Outputs, and Scheduling Roots

In some embodiments, after the work queue selection pass (608), the ProgGen 600 performs a forward pass over the selected work queue entries (609). During this forward pass, the ProgGen 600 identifies inputs to and outputs from the program sequence 615 (FIG. 6B) and collects roots for the subsequent scheduling pass. Inputs to the program sequence 615 correspond to ports referenced by operations among the work queue entries chosen for processing that do not have compute entries within the current work queue 304. Outputs to the program sequence 615 correspond to ports with compute entries among the set of work queue entries to be processed but without release entries among the entries to be included in the trace cache key (or, in some embodiments, anywhere in the work queue in the case of a program sequence to be inserted into the macro cache 500). The inputs must have been computed by previous program sequences and the outputs may be consumed by subsequent program sequences, or may be read by the application. The scheduling roots are operations with no input operands computed within the current set of work queue entries being processed; all of the operations' inputs, if any, are inputs to the program sequence 615.

In some embodiments, the ProgGen 600 determines the number of work queue entries to process and their associated inputs and outputs during the scheduling pass on the fly.

In some embodiments, the ProgGen 600 chooses the type of processing element for the operations to be processed during this forward pass 609. In some embodiments, the decision may be made earlier, such as during the backward pass 607, or later, during the scheduling pass 611, any time before each operation is assigned to a particular compute kernel. The ProgGen 600 is free to make the choice based on whatever heuristics it wishes unless there is a separate restraint on the selection of a particular processor or executor type from the C-Scheduler 300. For example, the C-Scheduler 300 may require use of the CPU Interpreter for the computation of reference results. In some embodiments, the ProgGen 600 may assign operations to the most efficient type of processing element available based on data type. For example, single-precision operations may be assigned to the GPU and double-precision operations may be assigned to the CPU. In some embodiments, the decision may be based on more sophisticated criteria, such as estimates of the efficiency of individual operations on the available targets, or predicted memory residency of an operation's inputs.

In some embodiments, the ProgGen 600 counts the number of unique operations within the selected set of work queue entries producing values consumed by each operation during this pass. For example, if an operation has two inputs but only one is computed by another operation in one of the selected work queue entries, then the first operation has a count of one. In other embodiments, this count may be computed in any other pass of the ProgGen 600, provided that it is computed prior to the scheduling of any of an operation's producers. This count is used by the scheduling pass 611 to keep track of how many producers of an operation have not yet been scheduled.

Scheduling Pass

The scheduling pass 611 packs operations from the work queue 304 into compute kernels, translates the compute kernels into executable binaries, and builds the program sequence 615. Additional details of the scheduling pass 611 are now described with reference to FIG. 6E, which is a flow chart of the scheduling pass. To maximize the number of operations available for fusion, the ProgGen 600 generates programs for all ready non-fusible operations (646) before processing any fusible operations. Next, the ProgGen 600 builds a program for at least some of the remaining fusible operations (648). In some embodiments, the ProgGen 600 schedules as many operations as possible into the program until none is left for fusion or the size of the program reaches a limit set by a processing element. At that point, the ProgGen 600 compiles the program (650) and assembles the program into binary code for a processing element (652). If the ProgGen 600 succeeds in compilation and assembling (654, yes), the compiled program is instantiated and appended to the current program sequence (660). Otherwise (654, no), the ProgGen 600 reduces the number of operations in the program (656) and rolls back its scheduler state (658). The ProgGen 600 attempts to compile and assemble the downsized program until success. The ProgGen 600 repeats the process by alternating scheduling and code generation for fusible and non-fusible operations until all operations are scheduled (662, yes).

In some embodiments, for some target architectures, certain operations require both fusible and non-fusible portions. In this case, the ProgGen 600 may coerce the standard alternation between scheduling fusible and non-fusible operations to schedule the fusible and non-fusible sub-operations in a desired order.

The selection of operations to fuse together into a compute kernel can be implemented by any of many different algorithms. In some embodiments, the algorithm for fusing primitive operations into compute kernels might be very similar to algorithms used to perform loop fusion. In some embodiments, a graph partitioning algorithm could be used to find the minimum-cost way of dividing operations between compute kernels. However, these schemes have several drawbacks. First, they are fairly complex. Second, they are relatively costly, which is disadvantageous for a dynamic compiler. Third, in some embodiments, they could potentially require recompiling and/or assembling several compute kernels in the event of compilation and/or assembly failure for one kernel.

In some embodiments, a simpler algorithm similar to instruction scheduling is used to assign operations to compute kernels, one kernel at a time. In such a scheme, the ProgGen 600 essentially traverses the operation dependence graph in order to find operations eligible for fusion. Operations are eligible to be fused into the compute kernel currently being formed once all of their inputs are guaranteed to have been previously computed by this compute kernel or a previously generated one, either in the program sequence currently being created or in a previous one, and when other fusibility criteria are met, as discussed above.

In some embodiments, the ProgGen 600 starts the scheduling pass 611 (FIG. 6A) with operations having no inputs computed within the current work queue, which are also known as the "scheduling roots", which were identified and collect during the forward pass (609). As operations are scheduled, dependences of the operations consuming their results (called "consumers") are satisfied. A non-root operation is ready to be scheduled once all of the operations computing its inputs (called "producers") have been scheduled. This scheduling process accomplishes a pass over the live ports in the work queue entries in a topological order, which may or may not be the same order in which the ports are inserted into the work queue.

The way this procedure works is as follows. The ProgGen 600 maintains two lists of operations, the non-fusible ready list and the fusible ready list. Each scheduling root is inserted into one of the lists according to its fusibility. Multi-stage operations are enlisted according to the fusibility of their first stages. Then, the ProgGen 600 begins its alternation between non-fusible and fusible operations. It selects non-fusible operations from the non-fusible ready queue one at a time and generates and/or selects the corresponding compute kernels for each one, invoking corresponding hand-written kernel-selection routines as needed. As each operation is processed, the producer count of each consumer of the processed operation is decremented. Once the producer count of any consumer reaches zero, that consumer may be appended to one of the two ready lists according to its fusibility. The ProgGen 600 continues this process until the non-fusible ready list is empty. In some embodiments, the ProgGen 600 may attempt to optimize the order of processing of the non-fusible ready list according to a heuristic cost function. In some embodiments, the order in which non-fusible operations are processed may be irrelevant.

For a non-fusible intrinsic operation, the code generator invoked by the ProgGen 600 identifies which compute kernels should be loaded and determines their launch specifications. It also adds any temporary buffers required to hold intermediate results to the program sequence 615. In some embodiments, the code generator refers to the selected kernels by name or by number. In some embodiments, the intrinsic compute kernels are in an intrinsic libraries 700. In some embodiments, the intrinsic compute kernels are pre-compiled. In some embodiments, the pre-compiled kernel binaries in the intrinsic libraries 700 are compressed and/or encrypted. They need to be decompressed and/or decrypted when loaded from a computer's hard drive to its memory by the runtime system 10.

A similar procedure is then followed for the fusible ready list, except that the ProgGen 600 attempts to form just a single compute kernel. When an operation is inserted into the fusible ready list, or sometime prior to that, the ProgGen 600 must create a description of its fusibility criteria. In some embodiments, this information may include the type, dimensionality, and sizes of the result of the operation. In some embodiments, it may include the launch specification required by the operation's implementation, such as the number of processors, threads, loop iterations, or other units of work required. In some embodiments, it may include an encoding of the structure of the algorithm used by the operation. For example, in some embodiments, element-wise and reduction operations might be fusible with like operations but not with each other, so each would require a different algorithmic key during fusibility tests. In some embodiments, the fusibility criteria would include a specification of whether the operation (or, for multi-stage operations, the sub-operation) is fusible with producers and/or consumers. Such a criterion is simplistic, but takes advantage of the fact that most primitive operations have element-wise access patterns and is sufficient in systems not capable of transforming producer and/or consumer operations in order to align element computations.

The ProgGen 600 searches the fusible ready list for the best candidate for starting a compute kernel. In some embodiments, the heuristic for selecting the best candidate may consider a number of factors. In some embodiments, the number of operations that may be fused with the ready operation may be considered. In some embodiments, whether an operation's consumers may be fused with it may factor into the decision. In some embodiments, the number of dependent operations may be used to drive the choice. In some embodiments, the chosen type of processing element may factor into the decision. In some embodiments, the selection may be based on these and/or other factors. In some embodiments, the fusible ready list may be sorted according to these priorities, or may be implemented as a priority queue where the highest-priority operation is selected. Once the first operation, called the "seed", is selected, subsequent ready operations that are compatible must be tested for fusibility with this operation and selected.

In some embodiments, the ProgGen 600 uses heuristics to determine the next operation to schedule. In some embodiments, these heuristics may be similar to those guiding the choice of the seed operation. In some embodiments, other considerations may be more important. For example, operations that have no inputs, such as index, are actually scheduled as late as possible so that they can be fused with its consumer operations. In some embodiments, operations are fusible with some of their producer operations but not others. In this case, the ProgGen 600 may prefer to first schedule the non-fusible producer operations. In some embodiments, the ProgGen 600 fuses operations different iterations of a loop in the application 20 to avoid producing programs that span multiple partial iterations. This configuration can increase the hit rates of the trace cache 400 and the program cache 680, reduce the number of data arrays written to memory, and help a user to understand the transformations.

This scheduling process continues until the fusible ready list is emptied, none of the operations remaining in the fusible ready list may be fused with those operations comprising the compute kernel under construction, none of the operations in the fusible ready list is deemed beneficial to add to the kernel, or certain kernel limitations are reached. In some embodiments, these kernel limitations may be driven by hardware resource limitations, as described above, such as the number of instructions. Since the kernel has not yet been compiled and/or assembled, in some embodiments, the ProgGen 600 must estimate the resources used by operations comprising the kernel under construction. For example, the ProgGen 600 may use estimates from the primitive libraries 660 of the number of instructions required for each operation to determine whether the hardware instruction limit has been reached or not.

In some embodiments, the ProgGen 600 schedules multiple operations into multiple compute kernels simultaneously. In this case, new compute kernels with are created on-demand in the program sequence 615 when no suitable compute kernel exists. If possible, operations are fused into existing compute kernels.

Code Generation

Once all of the operations to comprise a kernel have been selected, the ProgGen 600 generates code for the compute kernel. In some embodiments, the ProgGen 600 iterates over the scheduled operations in a topological data-flow order, i.e., the order in which the operations are scheduled, such that all producer operations are processed before their corresponding consumer operations, and invokes an operation-specific, target-specific code generator for each operation to generate the source code fragments necessary to implement the operation.

The fragments may include code for the body of the compute kernel, variable declarations, function declarations, and so on. Additionally, the ProgGen 600 inserts loads for reading from arrays that are computed by prior programs or program sequences and stores for writing into arrays that are not released or that are consumed by operations that have not been scheduled. For each result of an operation whose corresponding port has been released that needs to be written to memory, a temporary buffer of the appropriate size is added to the program sequence 615. Any input buffer read is also added to the input list for the kernel, and any output buffer written is added to the output list for the kernel. After generating the source code fragments for all operations, loads, and stores, the ProgGen 600 invokes a routine targeting at a specific processor to combine the fragments and finalize the source code for the compute kernel.

In some embodiments, the ProgGen 600 has different code generators for different processing elements. The code generator for a particular processing element may be implemented using routines that emit necessary syntactic elements, such as parameter and variable declarations. By accumulating source code strings for various program regions independently (e.g., variable declaration blocks and loop bodies), the source code for the processing element may be generated directly.

Primitive Libraries 660

In some embodiments, the source code for fusible primitive operations is in primitive libraries 660 (FIG. 1). The primitive libraries 660 contains the source code for individual routines, instruction estimates for the routines, and a list of subroutines from the primitive libraries 660 that must also be inserted. When a routine is requested for insertion, the primitive libraries 660 checks whether that routine has already been inserted into the current compute kernel and, if not, checks whether any subroutines need to be inserted. If so, the subroutines are inserted, followed by the source code for the requested routine. This process is performed recursively for the inserted subroutines.

In some embodiments, the instruction estimates are determined offline as the primitive operations are parsed for insertion into the primitive libraries 660. For each primitive operation, a dummy program is constructed that calls the primitive operation. The dummy program is compiled for a processing element and instructions in the program are counted. Overhead instructions are subtracted from the program and the estimated number of instructions is recorded along with the source code in the primitive libraries 660.

In some embodiments, the source code for the primitive operations in the primitive library may be encrypted or otherwise obfuscated, such as by XOR-ing a particular bit pattern with the source-code character strings.

Program Cache

Figure 6D:
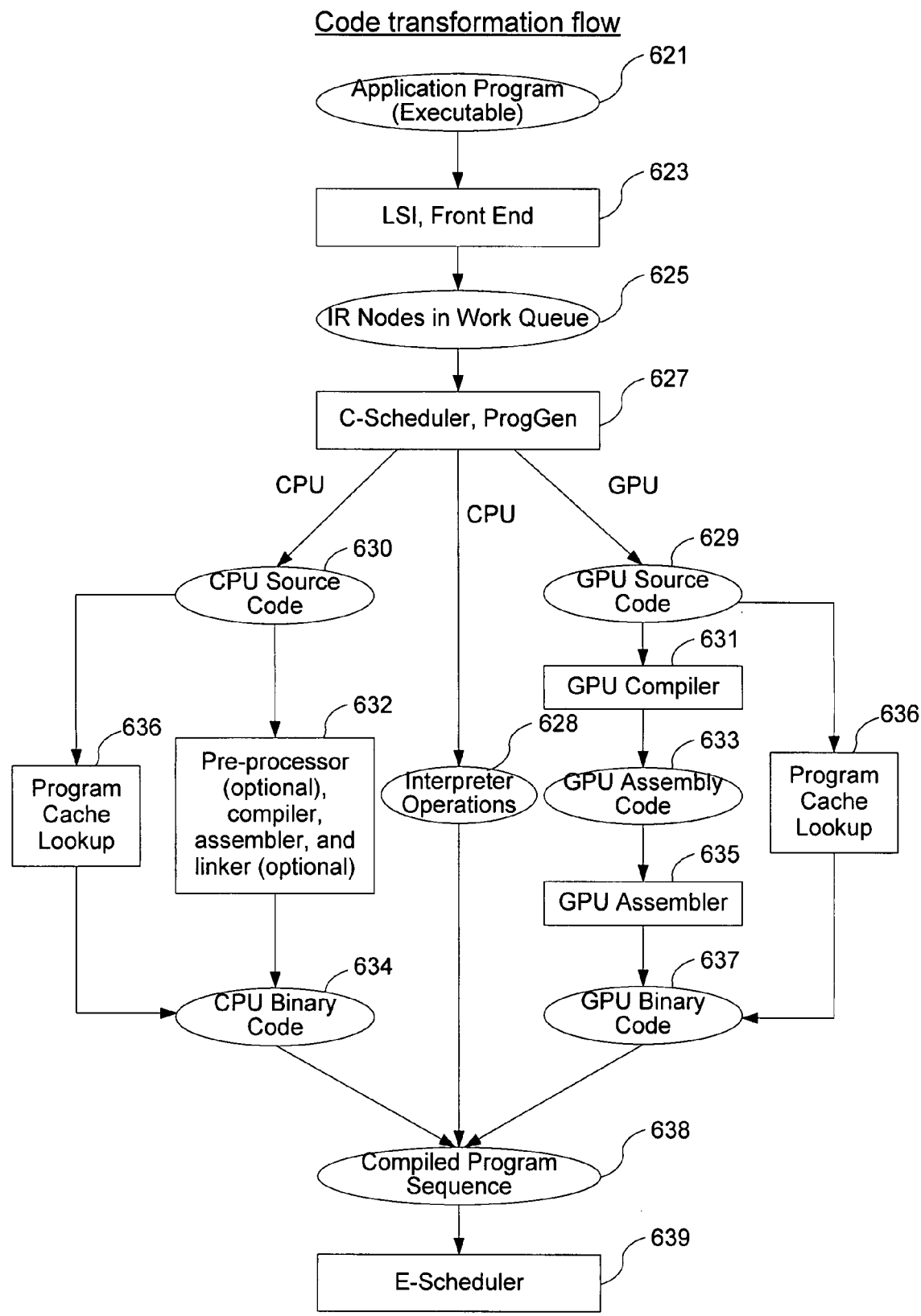
Figure 6E:
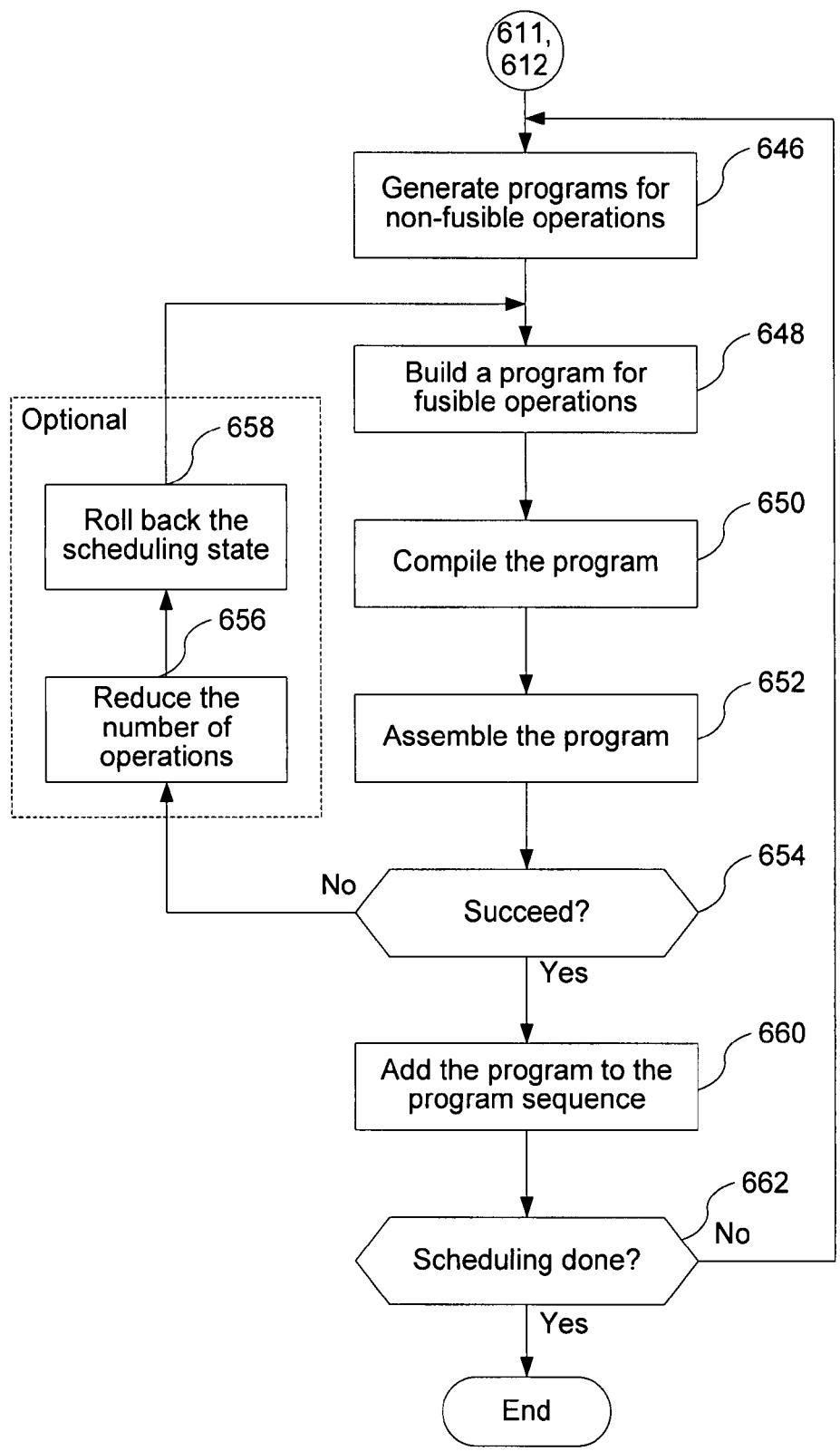

In some embodiments, a program cache 680 (FIG. 1) is associated with the ProgGen 600. The program cache 680 is used for storing the binary compute kernels, or programs, generated by of the GPU and/or CPU assemblers. If the C-Scheduler 300 fails to find a matching program sequence in the trace cache 400 or macro cache 500, it may invoke the ProgGen 600 to search the program cache 680 for programs identical to previously generated programs. The data path 636 shown in FIG. 6D is an exemplary invocation of the program cache 680. One skilled in the art will appreciate that this approach works for different processor architectures including multi-core CPU and GPU.

In some embodiments, the program cache lookup is accelerated using a program's source code as a first-stage lookup key.

Compilation

In some embodiments, the ProgGen 600 invokes the compiler and assembler to perform code generation and compilation for a processing element architecture after the source code is finalized (612), as shown by FIG. 6D.

FIG. 6D is a flowchart illustrating how different components of the runtime system 10 transform an application program into the machine binary codes targeting at specific processor architecture. The application program 621 may be written in one or more programming languages, such as C/C++/Fortran90. The LSI 100 and the FE 200 (623) convert API calls in the application into IR nodes stored in a work queue (625). The C-Scheduler 300 invokes the ProgGen 600 to generate compiled program sequences for the work queue entries corresponding to the application (627).

Recovery from Compilation and/or Assembly Failure

In some embodiments, if an initial attempt by the ProgGen 600 to compile or assemble a program sequence for a processing element fails because of e.g., hardware limitations, the ProgGen 600 may re-generate the program sequence with a set of tighter constraints on code fusion and/or program size. In some embodiments, the constraints become monotonically tighter during successive invocations to increase the chance of a successful compilation. In some embodiments, only the failing program needs to be regenerated and recompiled and/or reassembled and the previously compiled and assembled programs in the program sequence may be retained. In some embodiments, the operations comprising the failed kernel are split into two kernels using a process different from the original scheduling process, such as graph partitioning.

Creation of the Launch Specification

The ProgGen 600 is responsible for determining how a compute kernel within a program sequence should be launched on its processing element(s), such as the number of processors of the parallel-processing system and the number of cores and/or threads per processor used for executing the program. In some embodiments, the ProgGen 600 is also responsible for determining the workload among different processors, threads, loop iterations, etc. In some embodiments, the ProgGen 600 determines the distribution of work and/or data into parcels, but not the mapping of those parcels to specific hardware resources, such as processors or cores, which is left to the E-Scheduler 800 and/or Executors 900.

In some embodiments, the launch specification 615-5 (FIG. 6B) can be created for individual operations and is generated for each operation prior to fusion. In some embodiments, the launch specification is used as part of the criteria to determine whether two operations are fusible. In some embodiments, the launch specification is created after a compute kernel is formed, so that characteristics of the whole compute kernel, such as the total number of instructions, may be considered when computing the launch specification.

Construction of the Program Sequence

Referring to FIG. 6A, the ProgGen 600 accumulates the generated compute kernels as part of a program sequence to be returned to the C-Scheduler 300 (613) as they are completed. In some embodiments, input and output buffers of the program sequence 615 are determined prior to the scheduling pass 611. In some embodiments, they are determined during the scheduling pass 611. Temporary buffers are added to the program sequence 615 during the scheduling pass 611 because that is when compute kernels are selected and/or generated.

In some embodiments, the ProgGen 600 returns a partially constructed program sequence to the C-Scheduler 300 and a callback routine or object. The C-Scheduler 300 then inserts the partially constructed program sequence into either the trace cache 400 or the macro cache 500 as it normally does and forwards the partially constructed program sequence to the E-Scheduler 800, which may, in turn, forward compute kernels from the program sequence or even the entire program sequence to the appropriate Executors 900. Afterward, the C-Scheduler 300 invokes the callback to invoke the ProgGen 600 to complete the program sequence. In some embodiments, as the ProgGen 600 completes the compute kernels in the sequence, it signals their completion directly to the appropriate Executors 900. The ProgGen 600 also returns to the C-Scheduler 300 the control over the completed program sequence. This configuration allows the generation of a program sequence in parallel with its execution, while allowing the ProgGen 600 to operate in the same thread as the C-Scheduler 300. In some other embodiments, the ProgGen 600 operates in a different thread from the C-Scheduler 300.

EXAMPLE

As noted above, FIG. 2E shows an example pseudo-code sequence input to the LSI 100. FIG. 2G shows the graph of the corresponding IR nodes output by the FE 200. FIG. 2H shows the operations inserted into the work queue 304.

Assume that the C-Scheduler 300 invokes the ProgGen 600 after the insertion of "Release F" entry into the work queue 304. Initially, the ProgGen 600 analyzes the work queue 304 to determine whether it should generate a program sequence 615 for the current work queue entries. In this particular case, the first operation in the work queue 304 is fusible. There are only a small number of operations in the work queue and the operations in the work queue have low computational intensity. Therefore, the ProgGen 600 may choose not to generate a program sequence 615 and return its decision to the C-Scheduler 300.

Suppose that the next operation request from the application is a read of G. In this situation, the C-Scheduler 300 invokes the ProgGen 600 again and, in some embodiments, compels the ProgGen 600 to generate a program sequence 615 for the current contents of the work queue 304. Thus, the ProgGen 600 iterates backwards over the work queue 304 beginning with the last entry (607). It records the "Release F" entry at the work-queue position 4 in a hash table indexed by port and then creates an entry in the hash table for the port corresponding to G, which is computed by operations in the current work queue and is therefore alive. The ProgGen 600 then records the "Release C" entry in the hash table. Next, the ProgGen 600 processes the compute entry for F. Note that F is alive because it is computed by the current work queue and consumed by the operation corresponding to G. Finally, the ProgGen 600 processes the compute entry for C, which is alive because it is computed by the current work queue and consumed by the operation that computes F.

Following the backward pass 607, the ProgGen 600 analyzes the number of operations in the work queue 304, the memory consumption of the operations, and the number of instructions required by the operations (608). Because arrays C and F are released, the ProgGen 600 assumes that they do not require memory allocation. Arrays A, B, D, and E are identified as inputs because they are not determined by the current work queue entries. G is identified as an output because it is not released within the work queue 304. The total memory space required by the operations is dependent upon the size of arrays A, B, D, E, and G. If the ProgGen 600 determines that the amount of required memory space by the program sequence 615 is not excessive, it may decide to consume the entire work queue 304.

In some embodiments, the ProgGen 600 iterates forward over the work queue entries (609). While doing so, the ProgGen 600 collects the input ports (A, B, E, and D) to the program sequence 615 in the order in which they are referenced by the operations in the work queue 304. In some embodiments, the ProgGen 600 also collects the output ports G. To facilitate reuse of the program sequence 615 with different buffers of the size, the ProgGen 600 records the inputs and outputs of the program sequence as lists of ports to return to the C-Scheduler 300 and as abstract specifications of buffers in the program sequence 615.

In this case, the operation corresponding to C is identified as the scheduling root because it is the only operation in the work queue 304 that does not depend on the result of another operation in the work queue 304. In some embodiments, the ProgGen 600 also chooses processing elements for the program sequence during this forward pass. For illustrative purpose, it is assumed that all the operations in the program sequence are to be performed on single precision floating-point data and the program sequence is therefore assigned to a GPU.

In some embodiments, the ProgGen 600 is also responsible for determining the number of unscheduled producers for each operation during the forward pass. In this example, C has none, F has one unscheduled producer (C), and G has one unscheduled producer (F).

During the scheduling pass (611), the ProgGen 600 adds the scheduling root C to the fusible-ready list and creates its launch specification for the targeted processor or coprocessor (i.e., the GPU). In some embodiments, the launch specification on the GPU depends on the dimensions of the output array and the GPU computes in terms of four elements at a time. Assuming that the array C has size 100×200, the launch specification therefore specifies a 25×200 pixel rectangle.

In this example, because there are neither non-fusible operations nor other fusible-ready operations, C is removed from the fusible-ready list and used as the seed for a compute kernel. The producer count of F that consumes C is then decremented to zero. Next, F is appended to the fusible-ready list, removed from the fusible-ready list, and scheduled in the current compute kernel. The same process then applies to G and other consumer arrays until no schedulable operations remain.

In some embodiments, the ProgGen 600 then invokes an operation-specific, target processor-specific code generator for each scheduled operation in the scheduled order, i.e., C, then F, and then G. For illustrative purpose, all the operations herein are primitive operations. Therefore, for each operation, the code generator creates a temporary variable, generates a statement including the temporary variable to compute the result, and appends the statement to the kernel body. In some embodiments, the primitive operations are retrieved from the primitive library 660, the definitions for the primitive operations are accumulated and calls to the primitive operations are generated and appended to the kernel body. After generating the code for all of the operations, the ProgGen 600 then adds the main function body and input declarations to the kernel body.

FIG. 6C shows the GPU source code of a compute kernel 617 generated by the ProgGen 600 for the code segment shown in FIG. 2E. Note that the code segment in FIG. 2D is an array-level expression. In some embodiments, the GPU source code is an array element-level expression. The ProgGen 600 invokes the GPU compiler 620 to compile the source code into an assembly code. The GPU assembler 640 then converts the assembly code into a GPU machine binary code. In some embodiments, this GPU machine binary code is part of a compiled program sequence to be stored in the trace cache 400 or macro cache 500 and to be executed on the GPU. In some embodiments, the ProgGen 600 also inserts the GPU machine binary code into the Program Cache 680 and appended the GPU machine binary code to the program sequence 615 along with its input and output specifications and its launch specification. Since no operations remain to be processed in this example, the ProgGen 600 returns the completed program sequence 615 and lists of input and output ports to the C-Scheduler 300 as well as the number of entries to be removed from the work queue 304 and the number of entries for the corresponding trace cache key, which are 5 in this example.

E-Scheduler 800 and Executors 900

As noted above, the FE 200, the C-Scheduler 300 and the ProgGen 600 generate a dependency relationship between different program sequences and different programs within the same program sequence. The E-Scheduler 800 is responsible for dynamically managing the dependency relationship as it arranges for execution of the program sequences through different executors 900.

In some embodiments, the E-Scheduler 800 is responsible for scheduling the execution of program sequences and returning the execution results to the application 20. For a sequence of programs, the E-Scheduler 800 is configured to choose one or more executors 900, dispatch programs to the executors, move data between the GPU memory spaces 940 and the main CPU's system memory 950, and synchronize the executors to ensure that the programs are executed in a predefined order. In some embodiments, the E-Scheduler 800 is also partially responsible for implementing some internal result comparison features, which may be used in the context of reference result generation and/or program debugging. In some embodiments (as shown in FIG. 1), the E-Scheduler 800 operates in its own thread to enable job scheduling even if the other threads of the runtime system 10 are busy.

Figure 7A:
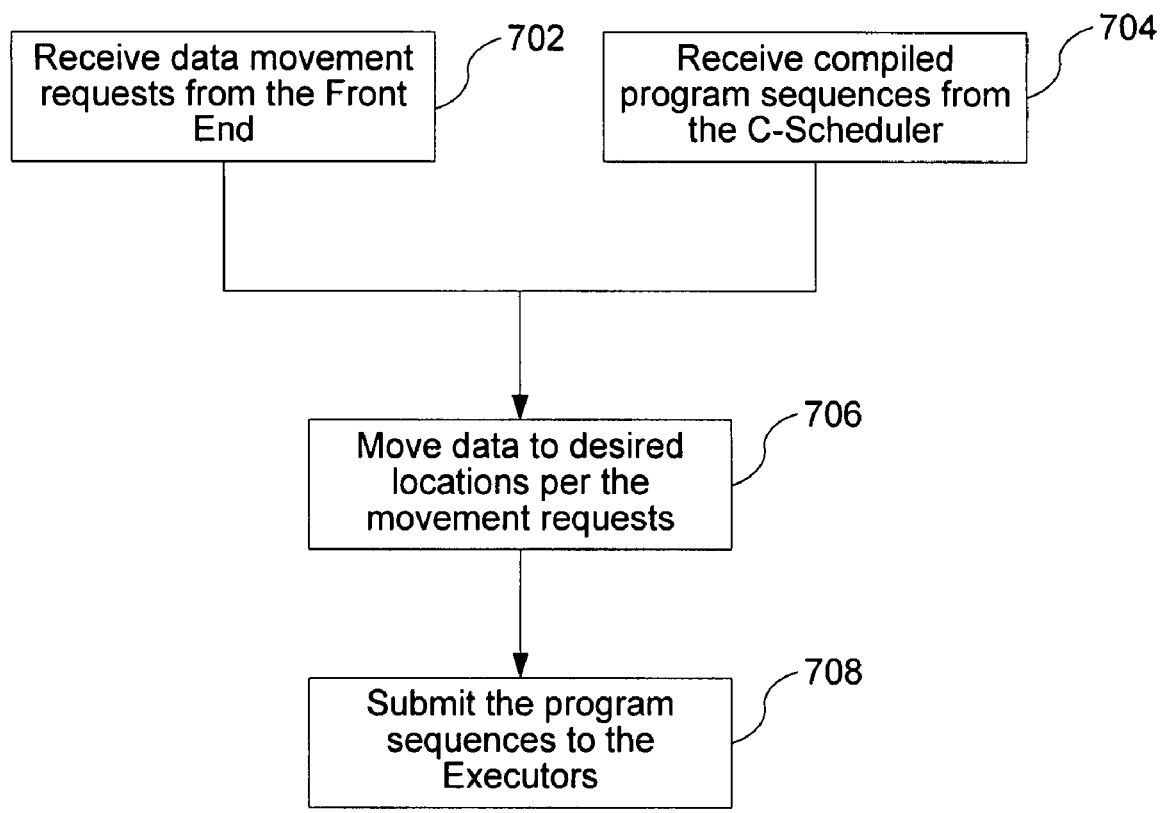

FIG. 7A is an overview flowchart of the E-Scheduler 800. The E-Scheduler 800 is configured to receive either data movement requests directly from the FE 200 (702) or execution requests from the C-Scheduler 300 (704). In some embodiments, these requests are posted in a message queue accessible to the E-Scheduler 800 and processed in the E-Scheduler's main processing loop. The E-Scheduler 800 synchronizes different requests to ensure that input data required by one operation is already available at a predefined location before the operation is started (706).

In some embodiments, upon receipt of a request, the E-Scheduler places the request's outputs in a data structure called the "pending operation table", each output having a corresponding entry in the pending operation table. If the E-Scheduler 800 cannot start an operation immediately (e.g., if its input is not ready), that operation is suspended and associated with an entry in the pending operation table. The entry corresponds to an output of another operation and that output is the missing input to the suspended operation. When the other operation completes, the entry corresponding to its output is then removed from the pending operation table. The suspended operation that has been associated with the output is then retried. A more detailed description of the pending operation table is provided below in connection with FIG. 7C.

In some embodiments, a request is either entirely processed in the E-Scheduler 800, or partially processed by the E-Scheduler 800 and then dispatched to one of the executors 900 (708). An executor receiving a request either completes the request immediately or merely returns a completion signal via an asynchronous callback. In some embodiments, there is no distinction between the two possible outcomes from the E-Scheduler's perspective. In either case, the E-Scheduler 800 can safely assume that the executor is ready to accept new assignments. If a request causes the E-Scheduler 800 to suspend while waiting for a predefined condition (e.g., for a buffer to become available), the E-Scheduler 800 also inserts the request into the pending operation table (e.g., associating the request with the buffer that the E-Scheduler 800 is waiting), and re-processes the request when the predefined condition is satisfied.

In some embodiments, as shown in FIG. 7A, the E-Scheduler 800 includes one or more "process" functions for processing request messages stored in a message queue associated with the E-Scheduler 800. For each request message, the "process" functions prepare its associated input and output buffers and ultimately invoke one or more "launch" functions associated with the E-Scheduler 800. Exemplary "process" and "launch" functions 714-717 are shown in FIG. 7B.

In some embodiments, the "process" functions are responsible for inserting data movement requests into predefined locations in the message queue to ensure that input buffers required by different operations are at the required locations before any operation is launched. The "process" functions are also responsible for allocating input and output data buffer handles for operations as well as initiating data movement operations if necessary.

In some embodiments, each output buffer has an entry in the pending operation table if its handle is not yet marked as "done" and/or may be referenced by subsequent operations. If all inputs and outputs are allocated appropriately (including temporary buffers if necessary), the requests are sent to the "launch" functions of the E-Scheduler 800.

In some embodiments, the "launch" functions are responsible for processing requests that may have been deferred. The "launch" functions can be invoked either through original processing of a request message or by replaying a deferred operation that has been recorded in the pending operation table. In either case, the requests' output operands (if any) should be allocated prior to invocation of the "launch" functions. In some embodiments, this is achieved in a "process" function that first invokes a "launch" function for a particular operation.

In some embodiments, the "launch" functions first check whether their inputs are ready. If the inputs are not ready, the E-Scheduler 800 places a deferred operation entry in the pending operation table. In some embodiments, the entry is indexed by the first input buffer that is ready. Operations are not deferred more than once per input. When all inputs are ready, the actual operation is launched. When launching an operation, the E-Scheduler 800 sends a request to one of the executors 900. If the executor performs an operation asynchronously, the E-Scheduler 800 is configured to receive an operation completion callback from the executor and mark the corresponding output buffer handles as being ready.

In some embodiments, the pending operation table is indexed by the handle of a buffer that needs to be finished before the deferred operation can proceed. When an operation completion callback corresponding to an operation is received, the E-Scheduler 800 marks the output buffer handles produced by the operation as being "completed". Thus, any deferred operations depending on any of those handles are re-tried.

FIG. 7B illustrates how the E-Scheduler 800 arranges for execution of a program sequence 712 it receives from the C-Scheduler 300. For illustrative purpose, the program sequence 712 is depicted as a block diagram to match a corresponding DAG 710. The DAG 710 includes two root input ports, one output port, and several intermediate ports. Some of the intermediate ports receive inputs from the root input or other intermediate ports. The program sequence 712 includes three programs (or compute kernels) A, B, and C. Program A has two inputs I_0, I_1 and one temporary output T_0. Program B has two inputs I_0, I_1 and another temporary output T_1. Program C has the two temporary outputs T_0, T_1 as its inputs and generates one output O_0.

The two pseudo codes in FIG. 7B summarize the E-Scheduler's use of the pending operation table as described above. In particular, the pseudo code 714 illustrates a simplified version of a "process" function for adding new entries to the pending operation table as it processes a program sequence (issues such as allocating data-buffer handles and initiating data movement between executors are ignored here for simplicity). The pseudo code 716 illustrates a simplified version of another "process" function for eliminating entries from the pending operation table as it processes an operation completion callback returned by an executor 900. At the core of two pseudo codes are the "launch" functions 715, 717, which determine whether all the inputs are ready and the operation can be issued to a respective executor, or whether the operation needs to be (re)inserted into the pending operation table.

Figure 7C:
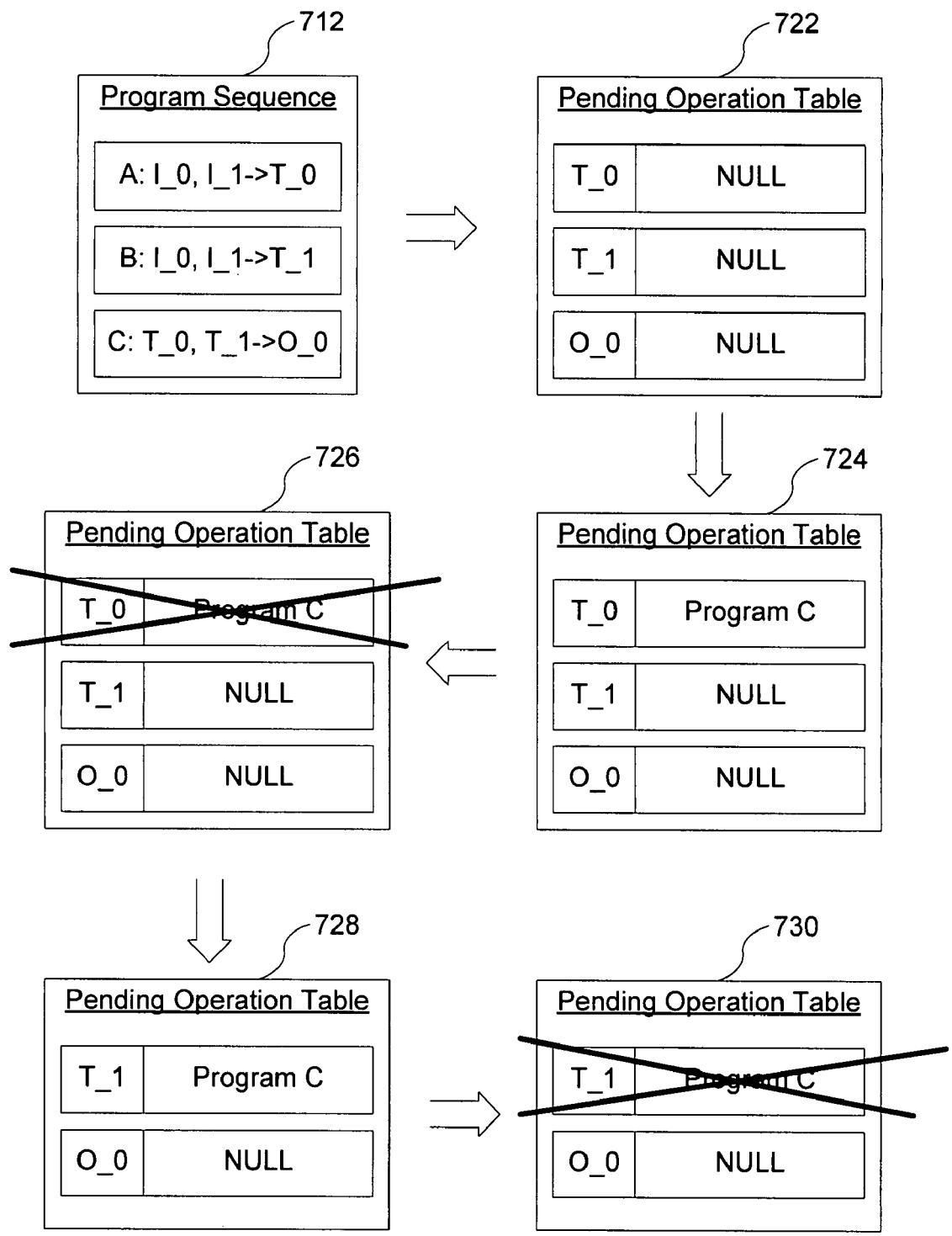

FIG. 7C illustrates how the E-Scheduler 800 processes the program sequence 712 in accordance with the two pseudo codes 714, 716. Initially, the E-Scheduler 800 inserts three new entries into the pending operation table 722 according to the pseudo code 714, one entry for each output of an individual program A, B, or C in the program sequence 712. In this example, because the inputs I_0 and I_1 are ready, the E-Scheduler submits the two programs A and B to one or more executors for execution to compute the two temporary outputs T_0 and T_1. But when the E-Scheduler 800 attempts to process the entry "O_0" in the table 722 that corresponds to the program C, it may have to first associated the program C with one of the two entries "T_0" and "T_1" because neither may have been determined yet.

For illustrative purpose, assume that the E-Scheduler 800 updates the pending operation table 724 by associating the program C with the first entry "T_0" that is associated with the program A. Further assume that an executor 900 responsible for executing the program A subsequently invokes a callback to the E-Scheduler 800, indicating that the program A has been executed and therefore the temporary output T_0 is available. In this case, according to the pseudo code 716, the E-Scheduler 800 removes the first entry "T_0" from the pending operation table 726 (as shown by the "x" drawn through that entry) and replays operation(s) that depends on the temporary output T_0. But the E-Scheduler 800 may find that it cannot submit the program C to any executor because the E-Scheduler 800 has not yet received a callback indicating that the program B has been executed from the same or another executor responsible for executing the program B. The E-Scheduler 800 then updates the pending operation table 728 by associating the program C with the entry "T_1".

After receiving the second callback associated with the program B, the E-Scheduler 800 removes the "T_1" entry from the pending operation table 730. At this time, because the two inputs T_0, T_1 to the program C are both ready, the E-Scheduler 800 can submit the program C to an executor for execution. Note that the aforementioned example is only for illustrative purpose. In some embodiments, there is no fixed order in which independent programs within a program sequence are executed at different executors. It is therefore completely possible for the program B to be executed before the program A under a different situation. But one skilled in the art will understand that the underlying principle remains the same.

An executor 900 is a software module that manages execution of programs, or compute kernels, on one or more similar functional units within a processing element of a parallel-processing computer system. In some embodiments, the functional units managed by a single executor 900 may share the same memory space associated with the host processing element. The executor 900 may be responsible for managing the memory space if it is distinct from the parallel-processing computer system's main system memory (e.g., the CPU memory 950 shown in FIG. 1). In some embodiments, the executor 900 is responsible for initiating data transfers between the parallel-processing computer system's main system memory and the host processing element's memory space. In some embodiments, the executors 900 are chosen and initialized by the supervisor 80.

Figure 7D:
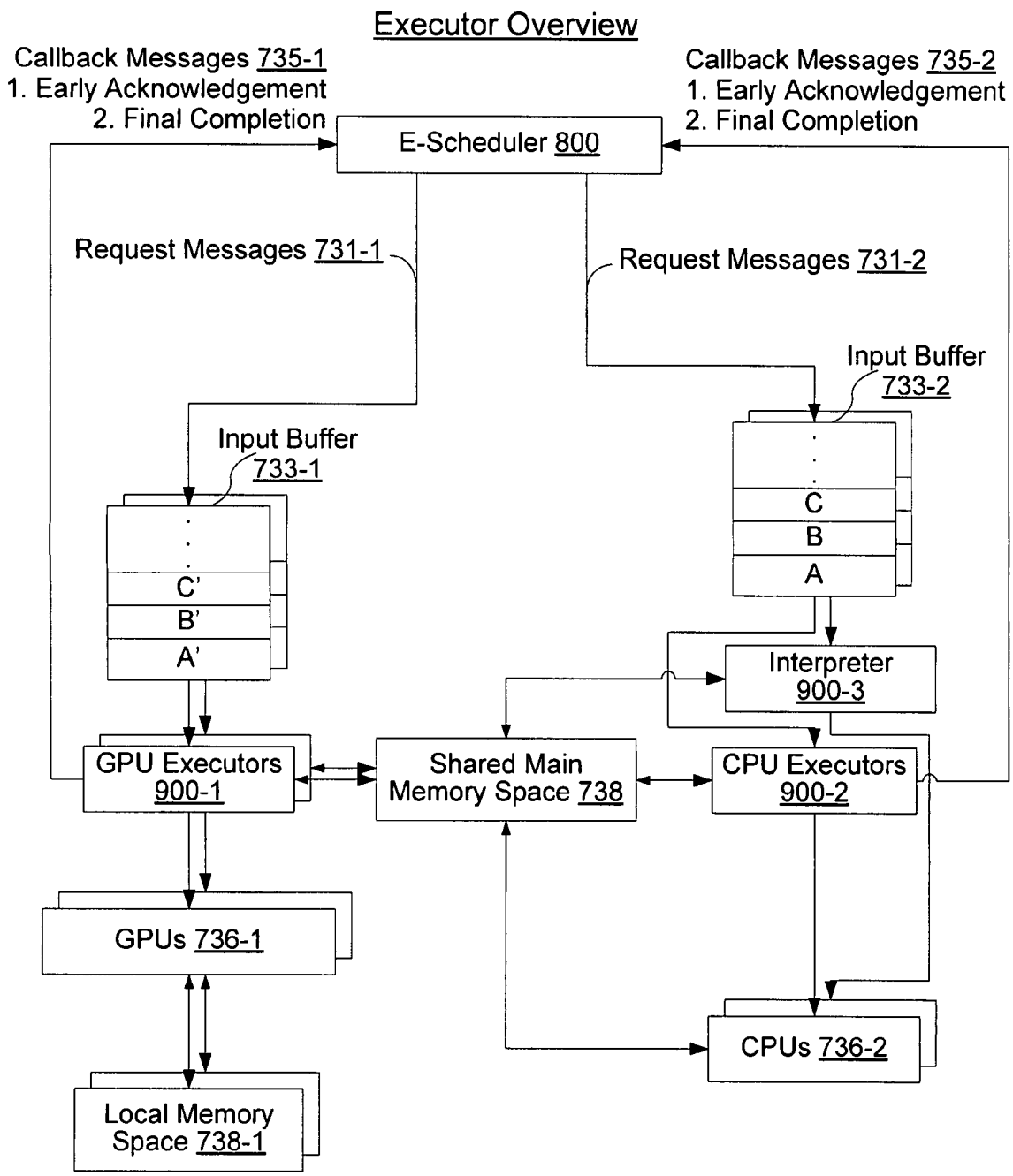

FIG. 7D is a block diagram illustrating the information exchange between the E-Scheduler 800 and the respective executors 900. For simplicity, the E-Scheduler 800 communicates with two types of executors, GPU executors 900-1 and CPU executors 900-2, each executor having an associated input buffer 733-1, 733-2 for storing data array operation messages from the E-Scheduler 800.

In some embodiments, the E-Scheduler 800 submits to the executors 900-1, 900-2 different types of data array operation messages 731-1, 731-2 including, but not limited to, "Move_Data_In", "Compute_Data", "Compute_Sequential", and "Move_Data_Out". An executor 900 notifies the E-Scheduler 800 of its receipt and completion of the data array operation messages via callback messages 735-1, 735-2.

The message "Move_Data_In" requests that an executor move data from a buffer in the main system memory 738 into the memory space of a processor associated with the executor. The message "Compute_Data" requests that the executor execute a single program or intrinsic operation on the processor. The message "Compute_Sequential" requests that the executor perform a set of operations on the processor in a specific order. The message "Move_Data_Out" requests that the executor move data from the processor's local memory space to the main system memory space.

In some embodiments, some executors (e.g., the CPU executors 900-2) may share the main system memory 738 with the application 20. Messages such as "Move_Data_In" and "Move_Data_Out" are therefore optional. The CPU executors 900-2 can perform operations associated with the "Compute_Data" and "Compute_Sequential" messages directly in the main system memory space 738.

By contrast, some other executors (e.g., the GPU executors 900-1) manage GPUs 736-1, each having its own local memory space 738-1. In this case, the E-Scheduler 800 may send to the GPU executors 900-1 messages such as "Move_Data_In" and "Move_Data_Out" to cause data movement between one GPU's local memory space 738-1 and the main system memory space 738 or another GPU's local memory space.

In some embodiments, upon receipt of an operation message from the E-Scheduler 800, the GPU executors 900-1 allocate space in their local memory space 738-1 for objects to be processed. In some embodiments, a GPU executor 900-1 initiates a hardware direct memory access (DMA) to the data identified by the E-Scheduler 800 and launches computational tasks on a GPU. The GPU executor 900-1 is also responsible for tracking the completion of a designated task on the corresponding GPU.

In some embodiments, as shown in FIG. 2D, the callback messages 735-1, 735-2 from the executors 900 to the E-Scheduler 800 fall into one of two categories: (i) early acknowledgement callback messages that allow the E-Scheduler 800 to dispatch operations that are dependent upon the operation being acknowledged by the callback messages, (ii) and final completion messages that allow the E-Scheduler 800 to de-allocate resources held by the operations that have been completed. For example, the "Move_Data_In" and "Compute_Data" messages enable the GPU executors 900-1 to operate in parallel with the E-Scheduler 800 using early acknowledgement callback messages. In some embodiments, early acknowledgement and final completion messages are encapsulated into a single message. For example, the "Move_Data_Out" and "Compute_Sequential" messages are more efficiently handled with a single callback message.

As noted above, the E-Scheduler 800 is responsible for dynamically managing the dependency relationship between different program sequences and programs within the same sequence. Therefore, an executor can execute programs it receives from the E-Scheduler 800 in an arbitrary order. In some embodiments, the executor chooses an execution order that may generate the highest yield for a given computer system.

Figure 7E:
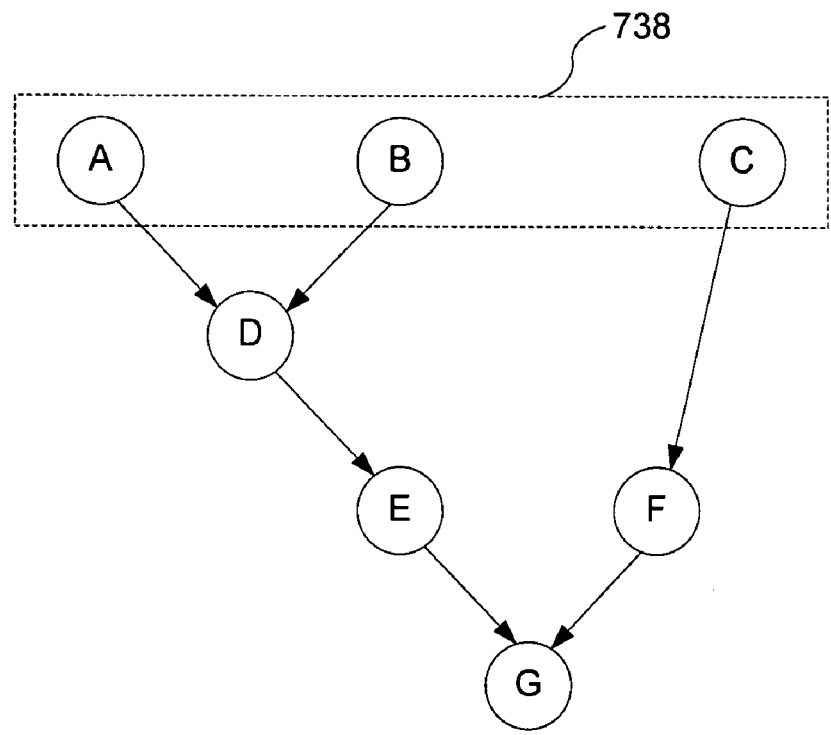

FIG. 7E is a block diagram illustrating the order of executing a set of operations by a GPU executor. The GPU executor is configured to complete seven operations that correspond to ports A through G at different locations of a DAG 738. The root level of the DAG 738 includes three ports A, B, and C. For illustrative purposes, assume that the operation associated with the port A is an operation that requires frequent accesses to the main system memory space 738, the operation associated with the port C is an operation that involves intensive computation at the GPU 736-1, and the operation associated with the port B is a balanced operation that includes both access to the main system memory 738 and computation on the GPU 736-1. Therefore, given the GPU's limited memory access bandwidth and computational capacity, the executor may achieve the best performance by first executing operations associated with A and C.

In some embodiments, the main system memory space 738 is used as a backup for a GPU's local memory space 738-1 or for data transfer between two GPUs' local memory spaces 738-1. In some embodiments, if the memory allocation requests for a particular GPU's local memory space 738-1 exceed its physical limit, the corresponding GPU executor 900-1 can temporarily move some data from the GPU's local memory space 738-1 to the main system memory space 738.

In some embodiments, as shown in FIG. 7D, the runtime system 10 includes a special type of executor called "interpreter" 900-3, which can be one of the CPU executors 900-2 that has access to the main system memory space 738 but does not allocate its own buffers in the main system memory space 738.

In some embodiments, the interpreter 900-3 operates in two basic modes: (i) "sequential mode" in which the interpreter 900-3 processes one operation at a time on one CPU 736-2 and (ii) "parallel mode" in which the ProgGen 600 performs just-in-time (JIT) compilation of multiple operations and the interpreter 900-3 then arranges for execution of the resulting compute kernels across multiple CPUs 736-2. In some embodiments, the sequential mode is used for generating reference results. The parallel mode is used for achieving a high performance by either distributing the workload to multiple pre-allocated and/or dynamically-allocated threads or calling into existing multi-threaded math libraries such as MKL.

In some embodiments, there is an interface between the GPU executor 900-1 and the GPU 736-1 (e.g., the GPU driver libraries 920 in FIG. 1). The interface enables the GPU executor 900-1 to access and/or control the GPU's local memory space 738-1. Exemplary low-level GPU interfaces include GPU driver libraries provided respective GPU vendor, such as ATI's CTM and nVIDIA's CUDA.

In some embodiments, the interface provides a mechanism for the GPU executor 900-1 to enumerate the graphics cards on a computer system, to discover the resources associated with each graphics card, and to connect to one or more of them. In some embodiments, the GPU executor 900-1 connects to one or more GPUs after discovery via the Supervisor 80.

In some embodiments, the GPU executor 900-1 is responsible for allocating and de-allocating objects such as command buffers, program constants, programs, and buffers in several classes of memory. Exemplary classes of memory include Cached System Memory, Uncached System Memory, and GPU local memory 738-1. Cached System Memory, and Uncached System Memory are accessible by both the GPUs 736-1 and CPUs 736-2 but differ in whether the CPUs 736-2 are able to cache elements in them.

In some embodiments, the two types of system memory are parts of the ordinary main memory of a main processing element (e.g., CPU). The GPU memory 738-1 is directly accessible by a GPU 736-1. Elements in this memory are either copied in by the GPU 736-1 via one of the two types of system memory or directly generated by the GPU 736-1. In some embodiments, the GPU memory 738-1 is faster for GPU calculations than the system memory. The relative offsets of objects within the GPU and system memories affect the amount of time required for the GPUs 736-1 or CPUs 736-2 to perform an operation on those objects. In some embodiments, these classes of memories may consist of multiple non-contiguous extents. Other memory types with other properties may also be managed by the executor 900.

In some embodiments, a GPU interface such as ATI's CTM provides the GPU Executor 900-1 with a model of interacting with the GPU 736-1 by building and sending command buffers of operations that execute in sequence. Each operation in the command buffer changes the GPU state and launches a compute kernel in parallel on one or more processing elements managed by the GPU executor 900-1 in accordance with the launch specification associated with the compute kernel. In some embodiments, the operation copies an object from a location within one memory extent to another.

In some embodiments, the GPU executor 900-1 packs operations into the command buffer until it is full and then sends the command buffer via the low-level interface to the GPU 736-1. The GPU executor 900-1 may order the commands to minimize the total number of commands in the command buffer, the time required for state changes in the command buffer, and the amount of time required for transferring data back at the CPU.

In some embodiments, for each command buffer built and submitted to the GPU 736-1, the GPU executor 900-1 maintains a Completion List of the commands in the command buffer and the operations to be performed upon the completion of a command. After the GPU 736-1 completes the operations in the command buffer (as defined within the GPU interface), the GPU executor 900-1 prepares and sends the callback messages 735-1 to the E-Scheduler 800.

In some embodiments, one operation executed by the GPU 736-1 requires additional operations to be sent to the GPU 736-1. For example, a copy of data may be performed in multiple pieces if either the sending or receiving memory extent is smaller than the total amount of data to be copied. In this case, the additional operations are packed into the current command buffer along with the remainder of work to complete this operation.

In some other embodiments, the command buffer in connection with a GPU interface (e.g., nVIDIA's CUDA) may be hidden behind the interface. The GPU executor 900-1 may indirectly process the command buffer.

In some embodiments, the GPU executor 900-1 allocates buffers in different memory banks of the GPU's local memory space 738-1 such that the GPU executor 900-1 can access the multiple buffers simultaneously. In some embodiments, these allocated buffers are spaced apart from each other as far as possible so as to provide maximal independence when not all memory banks are used.

In some embodiments, the GPU executor 900-1 specifies in the launch specification of a compute kernel targeting the GPU 736-1 that all buffers and objects referred to by the kernel be present in a memory space accessible by the GPU 736-1. If a buffer is not present, the GPU executor 900-1 may synthesize a "Move_Data_In" message and submit the message to the GPU 736-1 in advance.

In some embodiments, the E-Scheduler 800 may send a sequence of Compute messages to the executors 900 that is not appropriate for execution with a single layout of buffers in the GPU Memory, Cached System Memory, and Uncached System Memory. Accordingly, the executors 900 may reorder the Compute messages and insert intermediate swap messages into the messages. In some embodiments, the intermediate swap messages cause a "Move_Data_Out" operation of a currently unused buffer to the system memory managed by the C-Scheduler 300, free the memory managed by the executors 900, and perform a "Move_Data_In" operation of the buffer. Note that there are many well known algorithms for ordering the Compute messages and selecting which buffer to perform a "Move_Data_Out" operation.

Profiler

In some embodiments, one or more programming tools can be used for developing an application that takes full advantage of the runtime system 10. The profiler is one of such tools.

A profiler is responsible for measuring an application's performance as it is being executed on the runtime system 10, such as the frequency and duration of functional API calls into the runtime system 10 and their corresponding locations in the source code of the application 20. In some embodiments, the profiler may use a wide variety of techniques to collect data, including hardware interrupts, code instrumentation, operating system hooks, and performance counters.

Figure 8A:
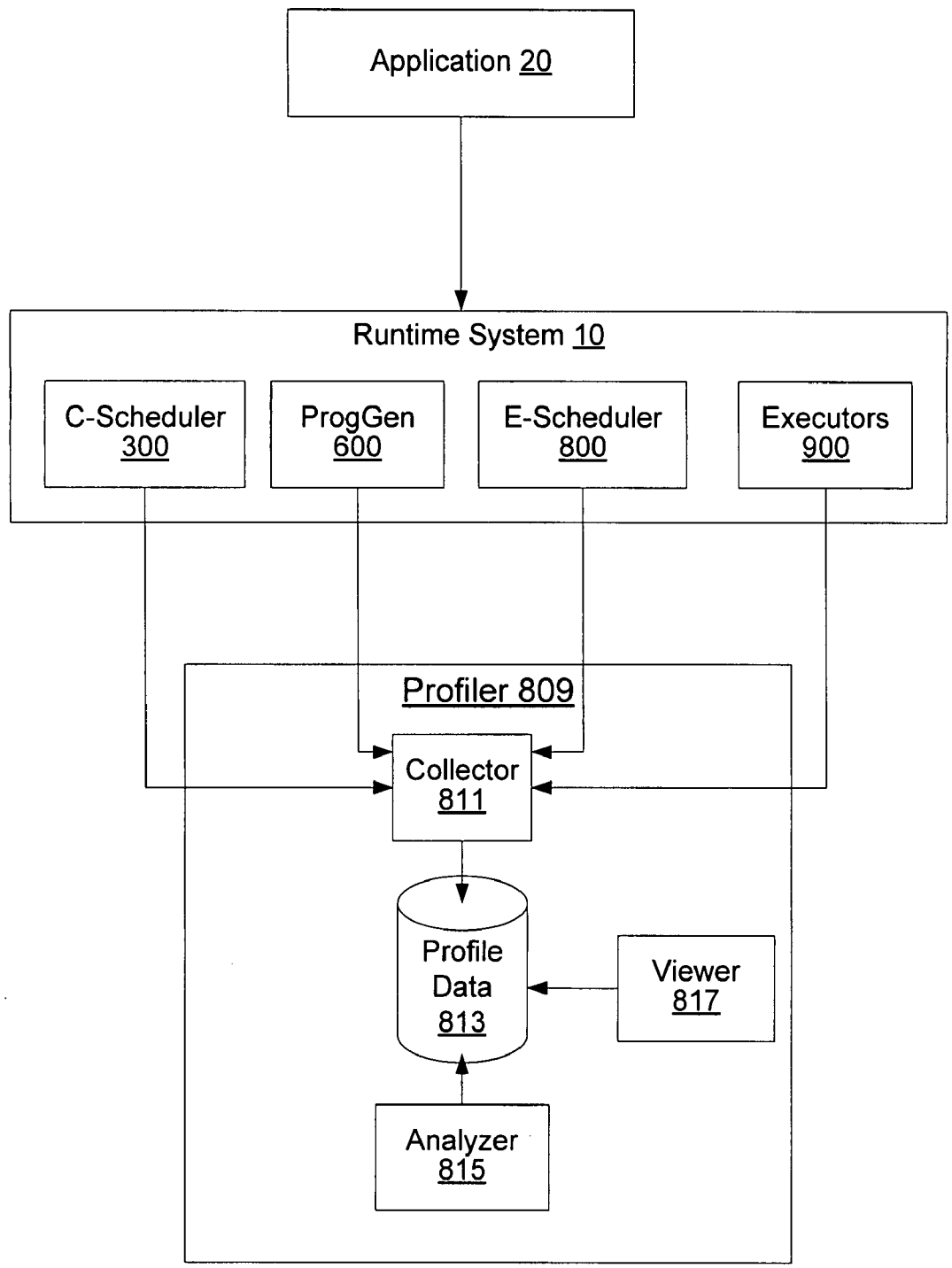
FIGS. 8A through 8C illustrate the operation of the program profiler of the runtime system according to some embodiments of the present invention.

FIG. 8A is an overview block diagram illustrating data flow from different components of the runtime system 10 into a profiler 809. In some embodiments, the profiler 809 includes a collector 811, an analyzer 815, and a viewer 817. The collector 811 is responsible for collecting performance-related information from different components of the runtime system 10 including the C-Scheduler 300, the ProgGen 600, the E-Scheduler 800, and the executors 900 while the runtime system 10 executes the application 20.

In some embodiments, the performance-related information includes raw data relating to various application execution characteristics from running the application 20 in the runtime system 10, including:

Computational performance data, such as the amount of time spent performing operations on a processing element of the parallel-processing computer system.

Data transfer performance data, such as the amount of data transferred between a main master processor (e.g., main CPU) and other slave processors (e.g., GPUs, CPUs, coprocessors, Cell, etc.).

The runtime system's execution information, such as just-in-time compilation overhead.

Workload distribution and partitioning information, such as how a sequence of operation requests is partitioned and how each partition performs individually.

In some embodiments, the profiler 809 separates data collection from data visualization. This configuration allows the performance data to be collected for various application execution runs at one point in time and analyzed at another point in time. This configuration also allows data associated with different application execution runs to be compared to each other and to be examined for performance anomalies between different application execution runs.

In some embodiments, the collector 811 runs in parallel to the runtime system 10. It is configured to add little overhead to the runtime system 10 so as to reveal the system's actual performance. For example, the collector 811 collects data for individual dynamically-generated compute kernels that are executed on an individual processor of the parallel-processing computer system. This configuration allows a deeper understanding of how the original sequential source code is partitioned and distributed on the different processors of the parallel-processing computer system.

The collected performance data is stored in, e.g., a database 813. In some embodiments, the database 813 is implemented as a repository of profiling output files arranged in a hierarchical file structure in a platform-independent format. This configuration allows the data collection to be performed on one platform, and the data analysis and visualization to be performed on another platform. It also allows the comparison of data from different platforms and from different system configurations.

In some embodiments, analyzing the performance data at the processor level is not the most convenient approach for tuning the source code of an application 20, because the runtime system 10 dynamically partitions and parallelizes the application 20 into multiple parallel compute kernels of binary codes that are executed on potentially different processors. Therefore, the analyzer 815 may map the performance data gathered for these individual compute kernels back to the original source code of the application 20. This configuration allows the tuning of the application 20 without the necessity to understand how its source code is partitioned and distributed in the runtime system 10.

In some embodiments, the analyzer 815 is responsible for transforming the performance information amassed by the collector 809 into one or more performance reports. In some embodiments, the performance reports include:

A summary report containing a set of high-level measurements, such as the number of API calls or number of compute kernel executions. This report includes the time spent performing computations, I/O (including data transfer and paging), and other runtime system operations (such as compilation and compute kernel look up in the trace cache 400 and macro cache 500).

A compute report containing measurements of computational performance, such as time spent computing, rate of computation, and the numbers of arrays read from or written into a processing element's memory space. The compute report also reveals the number of times an API call and resulting compute kernel are specialized for specific parameter or operand values.

An I/O Report containing several measurements of I/O operations, such as the size of data transfers and time spent performing them. The I/O Report also reports on paging (e.g., system-initiated data transfer to or from a processor of the parallel-processing computer system) and the number of arrays read from and written to the processor's memory space.

A runtime system report that focuses on compute kernel compilation and usage, such as compilation time and reuse of compute kernels that have been previously compiled and cached (Cache Look-ups, Look-up Time, and Cache Misses).

A user can look at the performance reports using the viewer 817 to identify performance issues associated with the application 20. In some embodiments, the viewer 817 is a simple text editor if the performance reports are written in plain text. In some other embodiments, the viewer 817 presents a graphical representation of the application's performance using the performance reports.

Figure 8B:
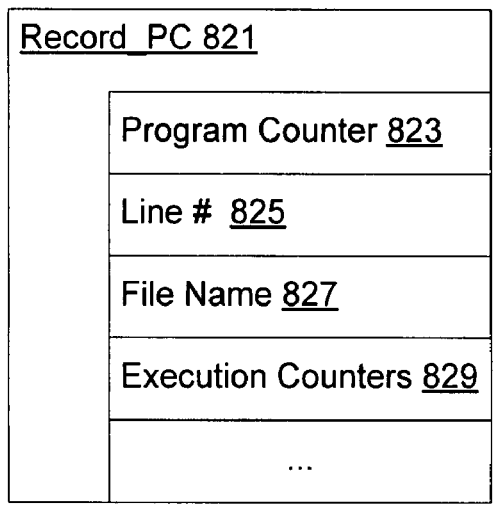

FIG. 8B is a block diagram illustrating the data structure of a PC record generated by the collector 811. For each API call processed by the runtime system 10, the collector 811 generates a PC record 821. The PC record 821 includes a program counter 823 corresponding to the API call, the line number 825 of the source code corresponding to the API call, the file name 827 including the source code, and one or more execution counters 829. The execution counters 829 are used for estimating the resources and time spent by the runtime system 10 that can be directly attributed back to the program counter 823 associated with the API call. Exemplary execution counters are associated with those API calls that are not sent through the ProgGen 600, such as write and read.

In some embodiments, as noted above, the ProgGen 600 dynamically generates a compiled program (or compute kernel) that may correspond to one or multiple API calls. The C-Scheduler 300 submits the compute kernel to the E-Scheduler 800. The E-Scheduler 800 then chooses specific executors for executing the compute kernel. Based on the execution results, the collector 811 generates a compute kernel (CK) record for the compute kernel.

Figure 8C:
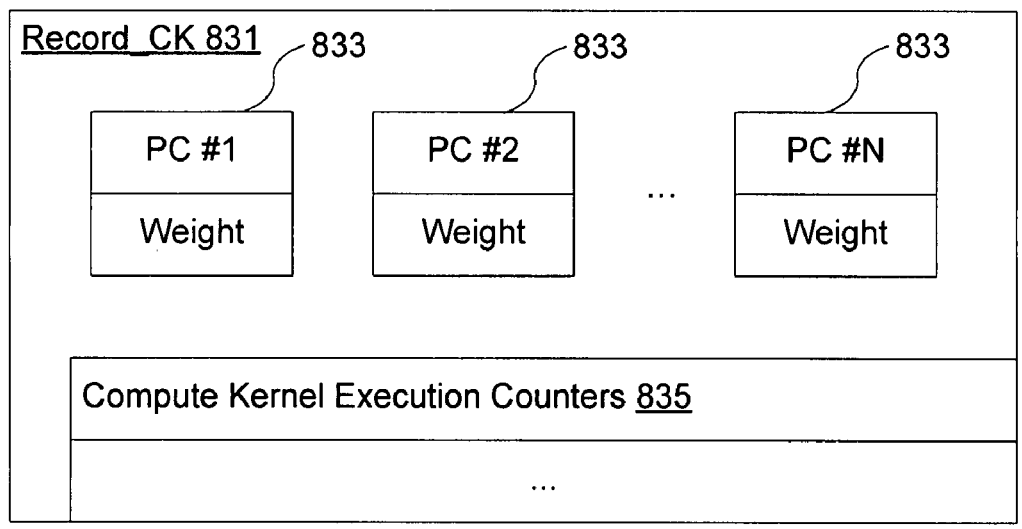

FIG. 8C is a block diagram illustrating the data structure of a CK record 831. The CK record 831 includes one or more execution counters 835 associated with the compute kernel. The execution counters 835 are used for estimating the resources spent by the runtime system 10 in connection with the execution of the compute kernel, which cannot be attributed back to a single program counter. For example, if the ProgGen 600 fuses two multiplies together (each of which has its own PC) into a single compute kernel, which is then executed on a GPU, it is difficult to directly attribute the GPU time spent for each multiply on the GPU back to the two program counters.

On the other hand, a compute kernel corresponds to at least one program counter associated with an API call in the source code. Therefore, it is possible to attribute the CK execution counters 835 back to the execution counters 829 in each PC record 821. To do so, the CK record 831 includes an array of data structures 833, each data structure including at least one pointer to a corresponding PC record 821 and a weight for estimating the relative cost of performing the API call corresponding to the PC. In some embodiments, the sum of the total weights associated with different data structures 833 in the CK record 831 is 1.0. In some embodiments, the ProgGen 600 is responsible for estimating a weight based on the particular operation and the array size associated with a compute kernel. In some other embodiments, the weight of a compute kernel is dynamically determined based upon the kernel's actual performance values.

In some embodiments, one execution of the application 20 with the profiler 809 enabled generates one set of CK records and PC records in the database 813. After a repeatedly execution of the application 20, the database 813 accumulates a predefined amount of information, which is sufficient for the analyzer 815 to characterize the application's performance.

In some embodiments, the analyzer 815 is executed offline, which attributes the program sequences execution counters back to the API calls in the source code of the application 20 using the data structures shown in FIGS. 8B and 8C. For example, the Total_GPU_Time of a CK record is divided among the member PCs based on their respective numbers of instructions. In some embodiments, one PC may be associated with multiple compute kernels or even multiple program sequences. The ultimate GPU_Time of a particular PC at the application level is the sum of the GPU time of the same PC among all the CK records that include this particular PC.

In some embodiments, the analyzer 815 generates a performance report that includes one or more PC-level execution counters, some of which are actual values and some of which are estimates derived from the corresponding CK records. Because the performance report includes the file name and line number of the source code for each PC, an application developer can use the performance report to fine-tune the application to achieve a better performance.

Debugger

Program debugger is another tool used for monitoring the execution of the application 20 using the runtime system 10.

In some embodiments, the debugger is used for generating a reference result on a reference processor (e.g., CPU). It is assumed that the reference processor can generate an accurate result for a given operation. The reference result is compared with an optimized result generated on a second processing element (e.g., GPU) for the same operation. Discrepancies between the two results can be used to identify errors in the runtime system 10 and improve its accuracy on the processing element.

Figure 9A:
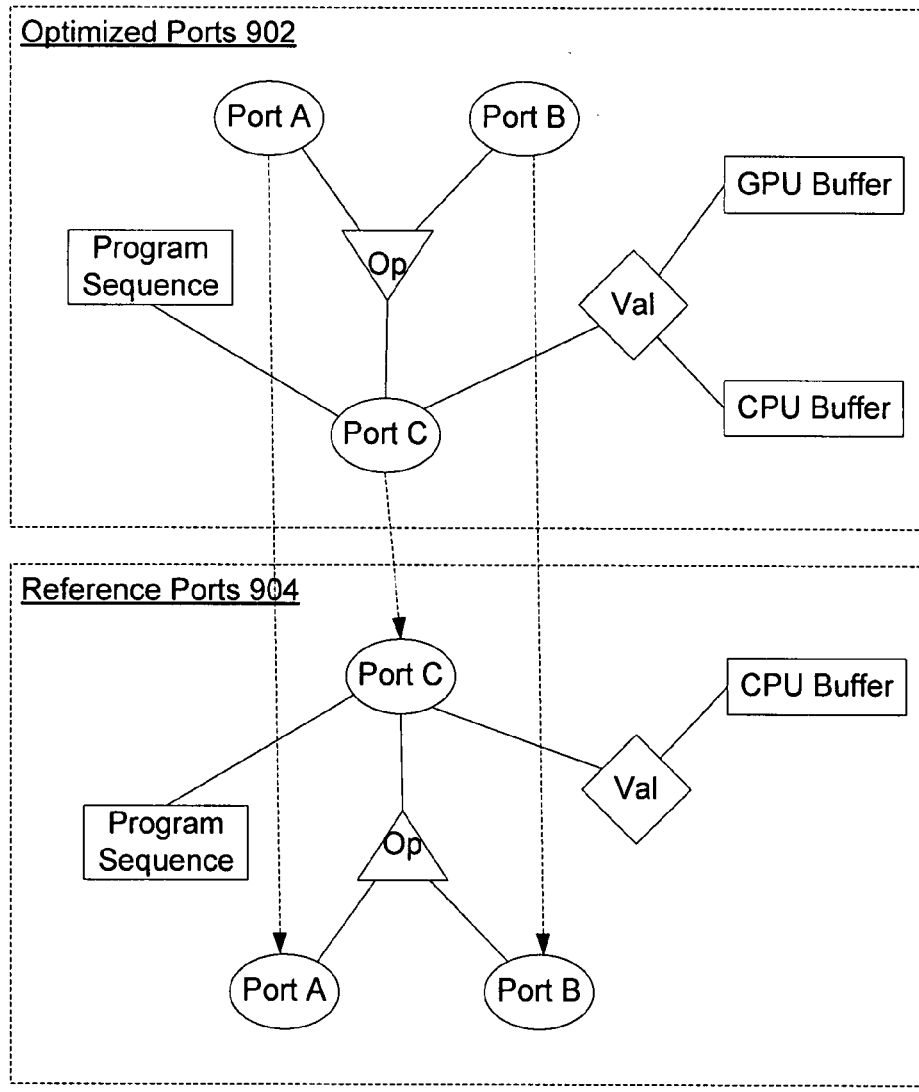

FIG. 9A is block diagram illustrating the relationship between ports associated with a reference result and ports associated an optimized result. If the application 20 is executed with the "reference result generation" debug option, the runtime system 10 (in particular, the FE 200) generates two sets of ports, one set of reference ports 904 used for generating the reference result and one set of optimized ports 902 used for generating the optimized result. In some embodiments, the two sets of ports are nearly identical except that the reference ports are designed exclusively for execution on the reference processor. The actual inputs for a reference operation are from the input ports' reference results to capture the propagation of errors across operations.

In some embodiments, the runtime system 10 processes the reference ports 904 without using the trace cache 400 or macro cache 500. This configuration not only separates the processing element's impact from the trace/macro cache's impact but also ensures that the reference result can be used to debug the trace cache 400 and the macro cache 500.

In some embodiments, the ProgGen 600 dynamically generates program sequences for the reference ports and applies no optimization to the generated program sequences. In some embodiments, the runtime system 10 allows a user to invoke the "reference result generation" debug option either at the beginning of executing an application or in the middle of executing the application.

Figure 9B:
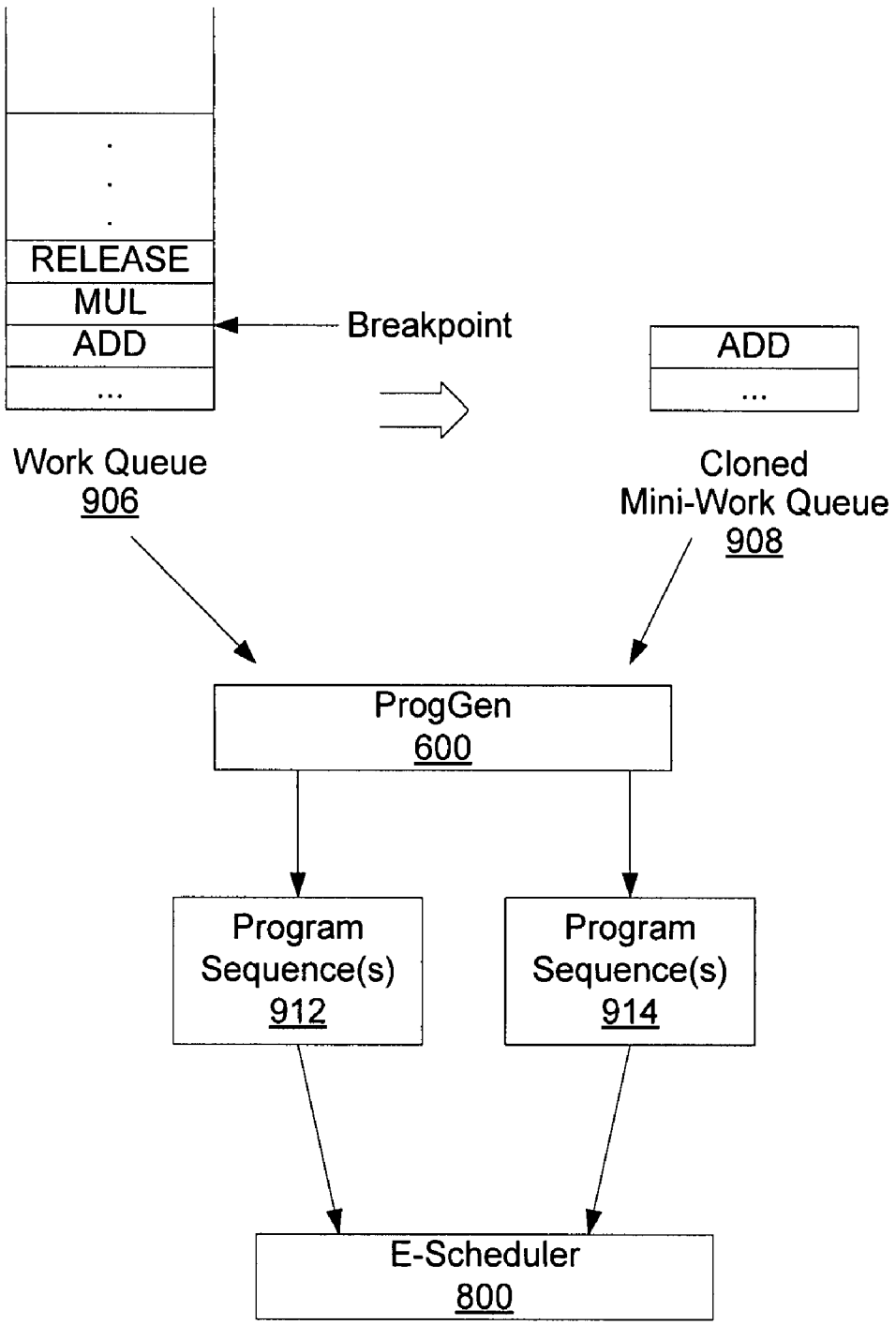

As noted above, the ProgGen 600 is responsible for fusing multiple operations together for performance reason. FIG. 9B is a block diagram illustrating such an example in which the ProgGen 600 merges two separate but consecutive work queue entries "ADD" and "MUL" into one operation. It is assumed that the debugger has been turned on and a breakpoint is set between the "ADD" entry and the "MUL" entry. In some embodiments, the ProgGen 600 may divide the two entries into two separate program sequences. The two program sequences are executed separately by the E-Scheduler 800 and the respective executors 900. But because of the split of the two entries into separate program sequences, the temporary result a user can access at the breakpoint is not necessarily the same one if the debugger is not turned on and the two entries are fused into one. This debugging mode is referred to as "intrusive mode".

In some embodiments, instead of splitting the two work queue entries into separate program sequences, the runtime system 10 generates a cloned work queue 908 including the "ADD" entry, but not the "MUL" entry. The ProgGen 600 generates compiled program sequences corresponding to the cloned work queue 908, which are then submitted to the E-Scheduler 800 for execution. In some embodiments, the program sequences corresponding to the cloned work queue 908 are not saved in either the trace cache 400 or the macro cache 500. The result associated with the cloned work queue 908 is then presented to the end user through the debugger. Meanwhile, the original work queue 906 is processed in a normal manner by the runtime system 10.

In other words, the ProgGen 600 generates two sets of program sequences 912, 914. These two sets of program sequences are both sent to the E-Scheduler 800 for execution. Because the ProgGen 600 is not forced to break the entries in the work queue 906, the result corresponding to the work queue 906 is the actual one produced by the application 20. The debugging result, which corresponds to the cloned work queue 908, is a reliable and accurate estimate of the actual result that can be obtained without affecting the actual result. Therefore, the cloned work queue is like a snapshot of the application 20 right before the breakpoint without causing any impact on the regular execution of the application 20. This debugging mode is referred to as "non-intrusive mode".

The choice between the intrusive mode and the non-intrusive mode of debugging is a compromise between efficiency and accuracy. The intrusive debugging mode is more efficient because it does not require the generation and processing of the cloned work queue. One the other hand, the non-intrusive debugging mode guarantees that the final result of the application 20 is not affected by the debugging session and is therefore more accurate.

In some embodiments, the debugger is used for result comparison. The result comparison has two modes: result-checking after computation and result-checking on copy-out. In some embodiments, result comparison is enabled at the system initiation time through configuration file settings and disabled by default to avoid overhead. In some other embodiments, result comparison is enabled and disabled dynamically at run time.

During the result-checking after computation mode, the results generated by the application 20 are checked asynchronously against separately generated reference results to identify erroneous operations in the application 20. A subsequent computation or copy-out operation may continue after a result is generated whether or not it has been checked. This configuration allows the runtime system 10 to perform more operations without affecting the results generated by the runtime system 10. In some embodiments, it is possible to identify a particular operation that causes a specific erroneous result by examining the results from every operation during this mode.

During the copy-out mode, the application's results are checked synchronously before they are copied out of the runtime system 10. This configuration can prevent the application from accessing invalid data. Because the checking does not happen after every intermediate step, it is less expensive but offers little information as to the cause of an error associated with a particular operation.

FIG. 9C is a pseudo code illustrating how the result comparison is performed element by element on the reference and optimized output arrays. In some embodiments, both the reference result and the optimized result are NaNs if either one is a NaN, and both the reference result and the optimized result have the same value if either one is an infinity (positive or negative).

In some embodiments, the allowed error for an individual optimized result, allowed_error, is determined using the formula: allowed_error=ABS(reference*Scale). The optimized result is deemed correct if ABS(optimized−reference)<=allowed_error. Otherwise, the debugger returns a result mismatch signal. In some embodiments, the result mismatch signals are delivered to the application 20 via the normal error handling mechanisms employed by the runtime system 10. In some embodiments, this result mismatch signal aborts the application 20 so that the application developer can investigate the execution result for causes. In some other embodiments, the debugger saves all the mismatch signals in a log file for subsequent review by the application developer while allowing the application 20 to continue.

In some embodiments, an application developer may choose specific values for the allowed_error and Scale variables. For example, the fact that both variables are set to zero indicates that the optimized result is acceptable if it matches the reference result exactly.

System Hardware

Figure 10:
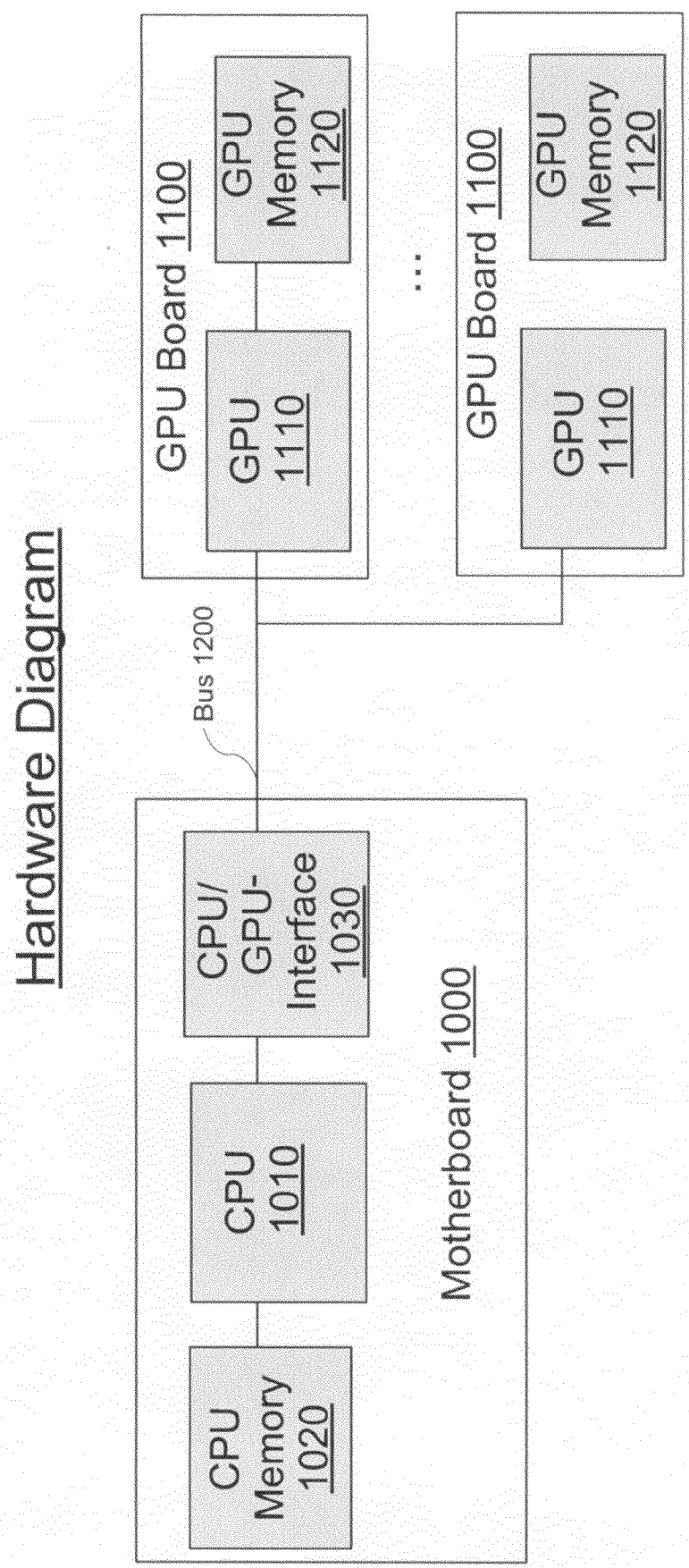
FIG. 10 is a block diagram illustrating the hardware used for implementing the runtime system according to some embodiments of the invention.

FIG. 10 is a block diagram illustrating the computer hardware used for implementing the runtime system 10. On the computer motherboard 1000 are one or more CPU processors 1010 (e.g., AMD Opteron or Intel Xeon), CPU memory 1020, and CPU/GPU interfaces 1030 (e.g., NVIDIA nForce 4). Multiple sets of GPU boards 1100 are connected to the motherboard 1000 through the bus 1200. Each GPU board 1100 includes at least one GPU processor 1110 (e.g., ATI Radeon 1900XT) and GPU memory 1120. In some embodiments, the CPUs are integrated into a single package with the GPUs, the interfaces, and the memory. In some embodiments, the runtime system 10 operates on a computer system having a single or multiple-core CPU.

ALTERNATIVE EMBODIMENTS

Figure 11A:
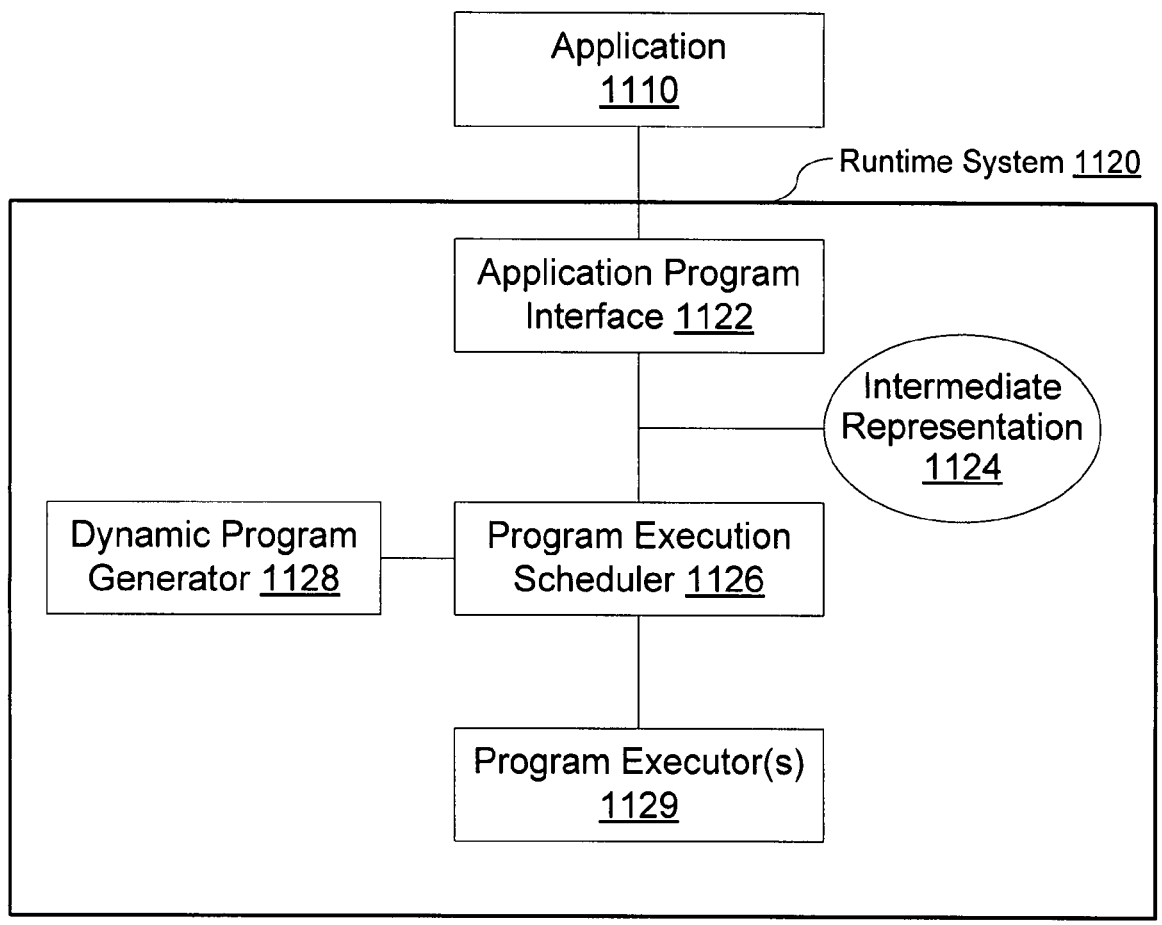
FIGS. 11A through 11C are block diagrams illustrating various types of software development and execution platforms according to some embodiments of the invention.

It will be apparent to one skilled in the art that the runtime system 10 shown in FIG. 1 is one of many implementations of a general runtime system running on a parallel-processing computer system. FIG. 11A is a block diagram of such a general runtime system 1120. The runtime system 1120 includes an application program interface 1122, which, in some embodiments, at least partially corresponds to the LSI 100 and the FE 200 shown in FIG. 1.

At run-time, the application program interface 1122 receives one or more operation requests such as API calls from the application 1110. The application program interface 1122 is responsible for preparing an intermediate representation 1124 for the operation requests. In some embodiments, the intermediate representation 1124 is language-independent and cross-platform. The directed acyclic graph shown in FIG. 2G is an exemplary one.

The dynamic program generator 1128 dynamically prepares one or more compute kernels for the intermediate representation 1124 and returns the compute kernels to the program execution scheduler 1126. In some embodiments, the dynamic program generator 1128 behaves like a just-in-time compiler and the compute kernels are configured to be executed on one or more specific types of processing elements. In some embodiments, the compute kernels are derived from both pre-compiled intrinsic operations and dynamically compiled primitive operations. The program execution scheduler 1126 dynamically dispatches the compute kernels to one or more program executors 1129 for execution on one or more processing elements of a parallel-processing computer system.

Figure 11B:
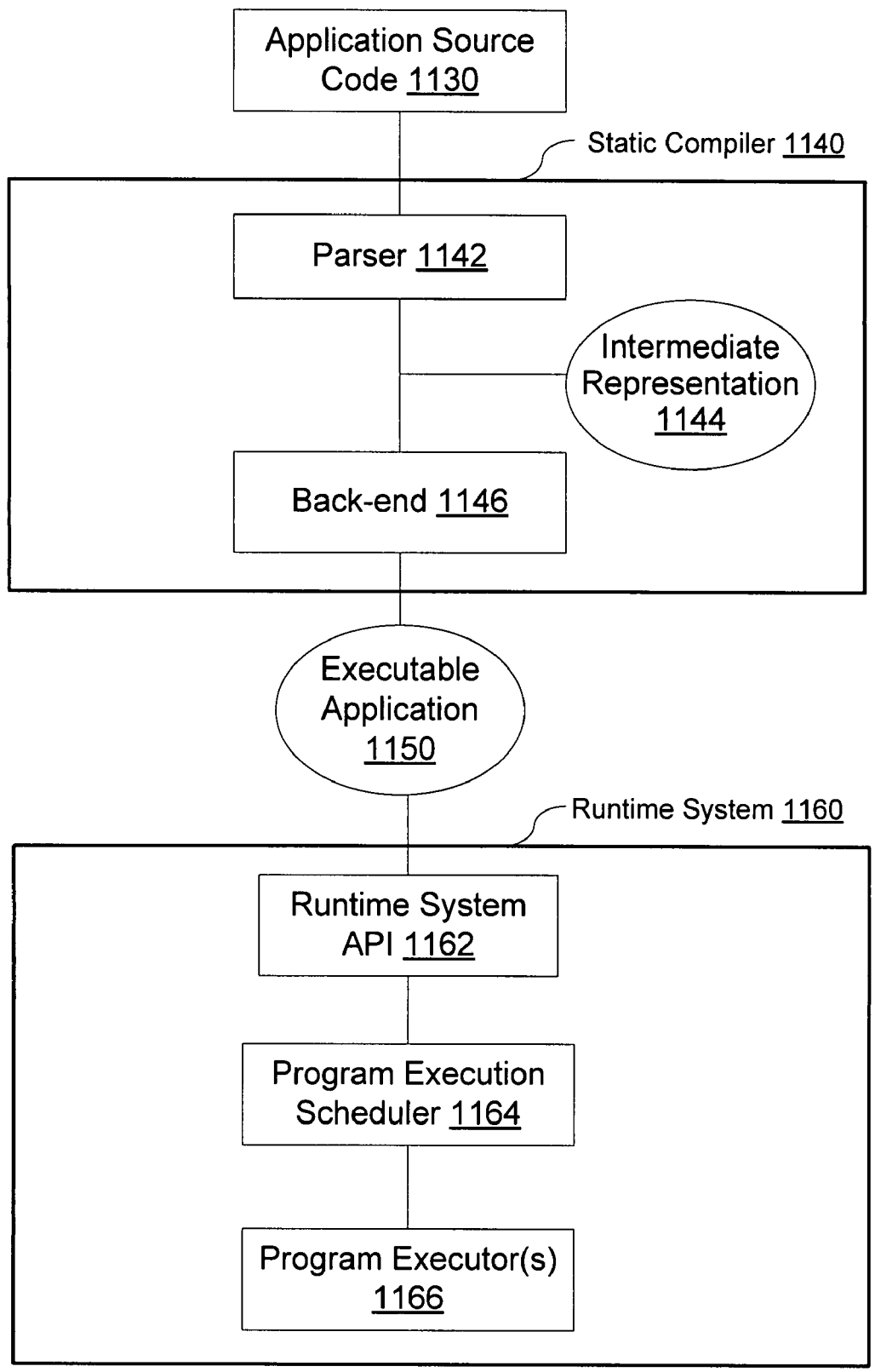

FIG. 11B is a block diagram illustrating an alternative embodiment of the present invention. Specifically, the general runtime system 1120 is split into two separate parts, a static compiler 1140 and a runtime system 1160. The static compiler 1140 includes a parser 1142 and a back-end 1146. The runtime system 1160 includes a runtime system API 1162, a program execution scheduler 1164, and one or more program executors 1166 for different types of processing elements associated with a parallel-processing computer system.

At compilation-time, the parser 1142 of the static compiler 1140 identifies one or more operation requests in the application source code 1130 and prepares an intermediate representation 1144 for the operation requests. The back-end 1146 of the static compiler 1140 performs loop transformations over the intermediate representation 1144 and prepares an executable application 1150 that includes one or more compute kernels. In some embodiments, the compute kernels are configured to execute on one or more specific types of processing elements of a parallel-processing computer system.

At run-time, the runtime system 1160 receives the pre-compiled compute kernels from the executable application 1150 through its API 1162. The program execution scheduler 1164 dynamically dispatches the compute kernels to one or more program executors 1166 for execution. Because the compute kernels are prepared at compile-time for the specific types of processing elements, they can only be executed on the same types of processing elements.

Figure 11C:
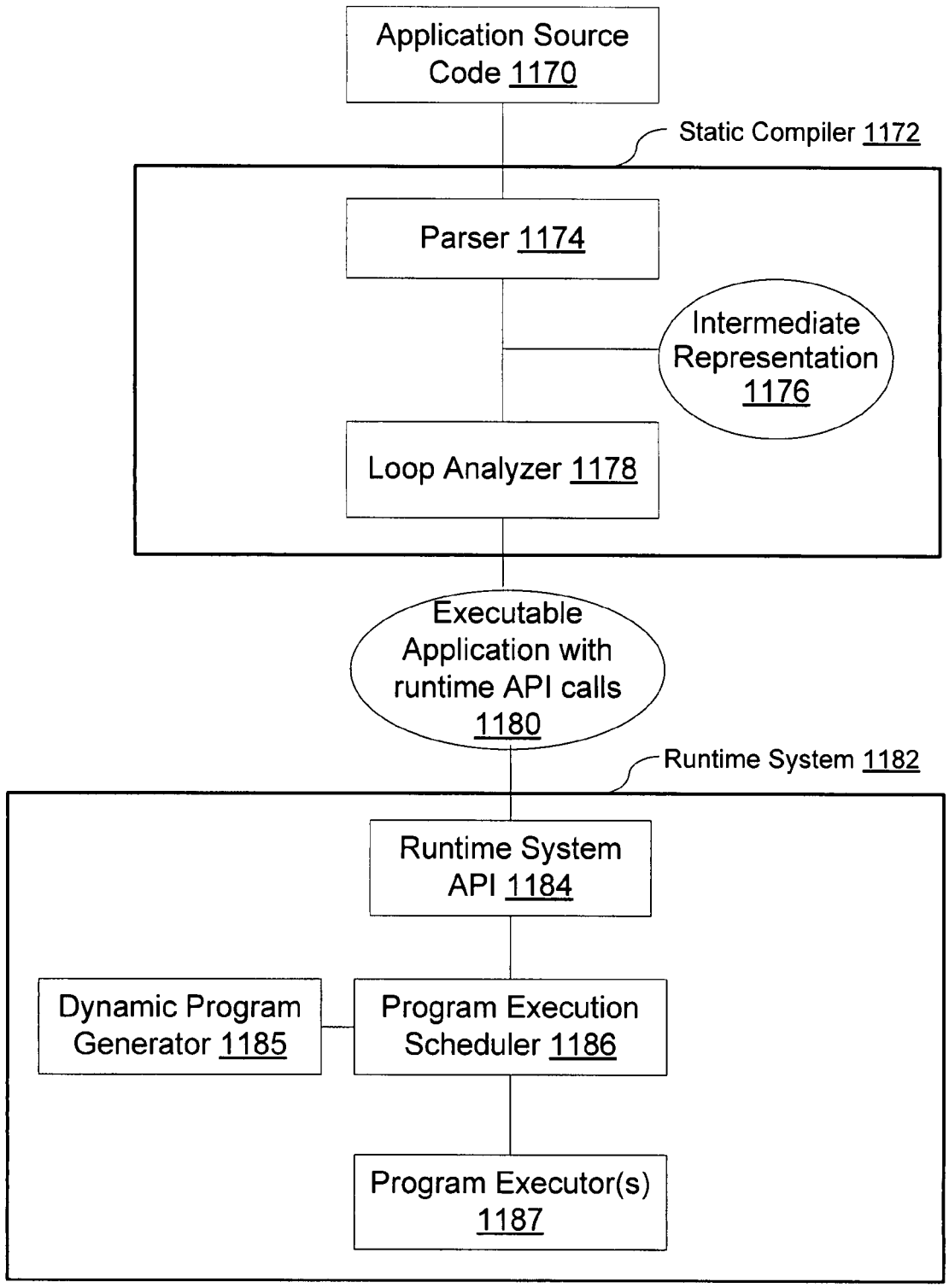

FIG. 11C is a block diagram illustrating a hybrid embodiment of the present invention. Like the embodiment shown in FIG. 11B, the embodiment shown in FIG. 11C includes a static compiler 1172 and a runtime system 1182. But the executable application 1180 does not have processor-specific compute kernels.

At compile-time, the parser 1174 identifies one or more operation requests in an application source code 1170 and prepares an intermediate representation 1176 for the operation requests. In some embodiments, the static compiler 1172 includes a loop analyzer 1178 that performs loop analysis over the intermediate representation 1176 at compile-time. But no processor-specific compute kernels are generated at compile-time.

At run-time, the runtime system 1182 receives the intermediate representation in the executable application 1180 with runtime API calls through the runtime system API 1184 and performs loop transformations for the intermediate representation. The dynamic program generator 1185 dynamically prepares one or more compute kernels for one or more specific types of processing elements. Finally, the program execution scheduler 1186 and the program executors 1187 work in concert to execute the compute kernels on selected types of processing elements of a parallel-processing computer system.

In some embodiments, it is possible to extend the existing static compiler loop vectorization technology to generate more direct calls to the runtime system's API when parallel loops are discovered. In some embodiments, the static compiler collapses many primitive operations into some pre-compiled intrinsic operations through code optimization techniques. In some embodiments, static compilation is performed and all primitive operations that are not coalesced by the static compilation become pre-compiled intrinsic operations.

Although the aforementioned embodiments illustrate one application invoking the runtime system, it will be apparent to one skilled in the art that the runtime system can be implemented on one computer and the runtime system communicates with one or more multiple applications, threads, and processors simultaneously over shared memory, pipes, and/or other communication mechanisms known in the art. In some embodiments, the runtime system is implemented in a client-server network environment as a service provider. An application runs on one or more client computers. The application submits operation requests to the runtime system running on one or more server computers. The runtime system, in response, provides services back to the application at the client computers. Therefore, different applications may submit their respective operation requests to the runtime system at the same time and receive results generated by the runtime system through the network connecting the client computers to the server computers.

Conclusions

1. Overview

A runtime system implemented in accordance with some embodiments of the present invention provides an application development platform for a parallel-processing computer system including multiple processing elements. The runtime system enables application developers to accelerate and optimize numeric and array-intensive operations in their application programs by leveraging the computational power of various types of processing elements as defined in this application including stream processors and multi-core processors. This enhancement greatly increases the performance of applications running on the parallel-processing computer system. In some embodiments, the numeric and array-intensive operations on the parallel-processing computer system can be as much as 120 times faster than today's fastest CPU implementations. Note that although some of the description herein refers to one or more specific types of processing elements such as stream processor and multi-core CPU, one skilled in the art will appreciate that the present invention can be implemented on other types of processing elements not explicitly enumerated.

2. Product Functions

The runtime system can be used for developing, debugging, profiling and executing application programs that invoke the runtime system as well as off-the-shelf packages incorporating the runtime system through the system's API (e.g., the LSI 100 in FIG. 1). In some embodiments, the runtime system is deployed in a computing cluster of 20-100 multi-CPU x86 servers running Unix, Linux or Windows operating systems and/or having a multi-user environment. For example, the runtime system can fit seamlessly into the management and monitoring systems that cluster administrators use today. At least some of the x86 servers may be configured with GPUs or other types of processing elements. The runtime system provides optimization and acceleration of compute-intensive operations on CPUs and/or GPUs that are required by applications running on the cluster. In some other embodiments, the runtime system is deployed in single-user, single-system, or in multiple-user, single-system configurations.

3. User Objectives

Users of the runtime system can use their existing tools for development, such as existing editors, debuggers, profilers and integrated development environments (IDEs), to create application programs for the runtime system. An advantage of the runtime system is that users do not need to learn new techniques that are foreign to their development language. For example, with the runtime system, a FORTRAN 90 programmer does not need to learn memory management on a particular types of processing elements including stream processors and coprocessors. In other words, users of the runtime system are able to write application programs in manner to which they are accustomed, and their programs and code changes can endure for years, across multiple generations of hardware.

4. Functional Summary of the Runtime System.

4.1) Libraries

In some embodiments, the runtime system includes libraries of routines (such as the primitive library 660 and the intrinsic library 700 in FIG. 1). These library routines can be source code or binary code associated with a specific processing element. These library routines are designed to be accurate and efficient when executed on a specific processor such that the applications invoking the library routines can produce more accurate results than what would typically be obtained using software packages offered by an operating system. The library routines are available for different classes of functions, some of which are described below.

4.2) Math Reduction, Trigonometric, and Boolean Functions

In some embodiments, the library routines are configured to handle a wide range of array-based mathematical, reduction, trigonometric and Boolean functionalities. In some embodiments, the mathematical functionality includes, but is not limited to, operations such as:

$+, -, *, /$;
$e^x, 2^x, y^x$;
$\sqrt{x}, \sqrt[x]{y}, 1/\sqrt{x}$;
$\log_e x, \log_{10} x, \log_2 x, \log_y x$; and
ABS, MOD.

In some embodiments, the reduction functionality includes, but is not limited to, operations such as:

sum, max, min;
max_element, min_element; and
any, and all.

In some embodiments, the trigonometric functionality includes, but is not limited to, operations such as:

sin, cos, tan, sec, csc, cot;
a sin, a cos, a tan, a sec, a csc, a tan 2; and
sin h, cos h, tan h, sec h, csc h, cot h.

In some embodiments, other functionality includes, but is not limited to, operations such as:

Sign, Is_NAN;
AND, NAND, OR, NOR, and NOT;
$>, <, <=, ==, >=, <>$;

Floor, Ceiling, Trunc, Round;
Cond;
mean, variance, stddev, dot_product;
p1_norm, p2_norm, pinf_norm, cdf_norm; and
Block copy, periodic copy, index, gather, spread.

4.3) BLAS Level 1-3 Functionality

In some embodiments, the primitive library routines support execution of matrix operations, such as matrix multiplication, transpose, and identity, in parallel on various types of processing elements. For example, through the LSI, the runtime system can provide functions at different levels of BLAS ("Basic Linear Algebra Subroutines") including level 1 (vector×vector), level 2 (vector×matrix), and level 3 (matrix×matrix) operations for vectors and 2D matrices on real numbers. These functions are implemented as the primitive operations in the primitive library and therefore can execute in parallel on multiple processing elements. In some embodiments, the primitive library routines support execution of inverse hyperbolic functions in parallel on various types of processing elements.

4.4) Matrix-Base Operation, Fast Fourier Transform, and Convolution

In some embodiments, the intrinsic library routines are individually hand-tuned, pre-compiled, and highly-optimized binary code to perform predefined, sophisticated operations on a specific type of processing elements as defined above (e.g., stream processors or multi-core CPUs) in parallel. Exemplary sophisticated operations include LU decomposition, LU solve, LU condition, and LU unpack, 1D/2D real and complex Fast Fourier Transform, and convolution. An application can access these operations through the runtime system's API (e.g., the LSI 100 in FIG. 1). In some embodiments, the matrix operations described above are implemented as intrinsic library routines that can solve multiple independent matrixes of data in parallel on one or more processing elements.

4.5) Random Number Generators

In some embodiments, the runtime system provides multiple random number generators (RNG), including a fast, short-period RNG and a slower, long-period RNG. These RNGs can be used separately or in combination. These random-number generators execute in parallel on one or more processing elements.

4.6) Inverse Hyperbolic Functions

In one embodiment, the runtime system API provides inverse hyperbolic functions. As with the basic math and trigonometric functions described above, in some embodiments these are provided as highly accurate primitives that are optimized for specific target stream and multi-core processors.

4.7) Debugger Functionality—Breakpoints

The runtime system provides a debugger with reproducible execution with compatibility for break/watchpoints, stepped execution and data inspection. The runtime system allows users to run their programs in reproducible execution mode, which will make their programs run in a synchronous mode. In this mode, the user will be able to set break/watch-points within code sections, and inspect data within data types.

A unique feature of the runtime system debugger is that it enables a user to set breakpoints and to review the state of program data in such a way that the actual result of the operation (if it were performed in the context of normal program execution) is not affected by data examination. This could be a significant factor in the runtime system as certain mathematical vector operations are performed asynchronously, in an optimized fashion in certain types of processing elements such as stream processors (for reasons of efficiency) and may provide different results if they were instead performed individually, which would be the case if a user set a breakpoint intermediate between two sequentially executed instructions. An example of two such instructions is a vector multiply-add sequence, known as "MUL-ADD." Thus, the runtime system debugger in one embodiment enables a user to set a breakpoint anywhere in the application program in code sections, including (such as after the MUL in a MUL-ADD sequence) to inspect data types without modifying the actual result of that operation in normal system operation—even when that data would be an intermediate result in a sequential stream-processor operation.

It is also a unique feature of the runtime system debugger that helps debugging problems within compute kernels (e.g., by finding gross differences when results are generated in different ways) and set breakpoints in relation to line numbers of the application program. This provides previously unavailable visibility into the status of code running in a processing element, which enables users to debug runtime system code segments that are specified in high-level application source code. Without this feature, such code segments would be very difficult to debug given the opacity to a conventional application of operations being executed in a processing element (such as traditional 3D graphics operations).

4.8) Debugger Functionality: Reference Results and Result Comparison—Reference Results vs. Results from the Stream or Multi-Core Processor The runtime system accelerates software operations by generating and/or executing optimized, parallel programs on stream and multi-core processors. This has the potential of generating different results as compared to performing the operations on a single CPU core. This is because different stream and multi-core processors support different arithmetic precision and because parallel algorithms perform operations in different orders than would be performed by sequential CPU programs.

One of the concerns of users of the runtime system is likely to be whether a given implementation of the runtime system based one or more types of processing elements provides accurate results compared to a traditional CPU implementation. The runtime system provides a mechanism to compare variables (including results) between programs run using a reference implementation on the CPU vs. an optimized implementation on a stream or multi-core processor. This involves the runtime system generating equivalent program code sequences for the reference implementation and the stream or multi-core processor, executing the equivalent programs sequences, and then generating side-by-side results. In a Result Comparison mode the runtime system determines when the side-by-side results are within a defined tolerances and, if not, performs an action that can be selected from aborting the program, throwing an error and continuing program execution, or initiating a dialog with the user. In another mode, referred to as Reference Results mode, the runtime system can display for the user the reference result and the side-by-side optimized result (from execution on the stream or multi-core processor) to enable users to analyze the accuracy and precision of program results generated by the stream or multi-core processor. Other embodiments of the runtime system can include identifying which specific calculations are causing loss of precision or accuracy.

4.9) Profiler Functionality

The runtime system provides performance profiling, including bottleneck identification. The runtime system profiler provides sufficient information to users to enable them to understand the drivers of performance. The information may include, for example, measured performance data, such as the time to perform an operation or the number of operations performed, estimated performance data, such as time estimates derived from data sizes, and information about the code compiled for the specific stream or multi-core processor, such as where more efficient, special-purpose mechanisms could be used to accelerate the operations performed.

The runtime system profiler enables a user to view performance data associated with one or more processing elements for executing operations corresponding to particular lines of code in the application source program. This is important because, in some embodiments, execution on the stream or multi-core processor may be asynchronous with respect to the application's calls to the runtime's API, which would frustrate attempts to use standard timing and profiling tools to measure performance. Furthermore, the program code executed in a stream or multi-core processor under control of the runtime system may bear little similarity to the particular API call at a particular place (file and line) in an application that resulted in the generation and execution of that stream or multi-core processor program code.

On the other hand, understanding how the runtime system fused sequences of primitive operations into programs for the stream or multi-core processor can be important for tuning performance of the application. Therefore, the runtime system profiler enables a user to view performance data corresponding to programs and program sequences, and also to view performance data corresponding to individual calls into the runtime system's API which comprise the programs executed on the stream or multi-core processor.

In one embodiment, the runtime system profiler writes collected performance data to a file, which it can analyze offline after program execution is complete. In another embodiment, users can review performance data with a graphical user interface that provides a number of different views into execution of programs and program sequences handed off to the runtime processor. These different views include: summary, compute, I/O and runtime.

4.10) Double-Precision Functions in a Stream-Processor API or Cross-Platform API for Stream and Multi-Core Processors.

In some embodiments, the runtime system API, which enables cross-platform execution on different types of processing elements, supports double-precision implementations of all its supported operations, even though some processing elements do not natively support fast double precision. In one embodiment, the double-precision operations can be performed on the stream or multi-core processor using its native support for double-precision. In one embodiment, the double-precision operations can be performed on the CPU.

In another embodiment, the runtime system can support a mode in which computations on 'double' variables (e.g., floating-point numbers with greater than 24 bits of precision) can be performed on the some processing elements by combining multiple single-precision floating-point data elements to achieve the level of double precision during arithmetic implementations.

This technique could be applied to computations done on values of any precision or word/bit length. For example, these techniques would be applicable in the situation where CPUs provide 'quadruple' precision whereas a particular stream or multi-core processor provided only single and/or double precision.

4.11) Cross-Platform Binary Compatibility

In some embodiments, assuming that an old version of the runtime system is available for a particular target platform (i.e., a combination of processing elements and operating system), application programs executable on the old version of the runtime system can be run on another platform that is loaded with a new version of the runtime system. This cross-platform binary compatibility is due to the fact that the runtime system contains implementations of the operations for multiple stream and multi-core processors and uses handles to separate the application from the runtime system. Given an application, the runtime system automatically maps its old handles to ports supported by the new version of the runtime system and selects and executes the appropriate implementations transparently.

5. Software Interfaces

In some embodiments, the runtime system provides applications with interfaces to operations implemented in multiple languages, such as C, C++, and FORTRAN. Additional languages can be supported as necessary. For ease of use, API's provided by the embodiments can conform to the style and usage of the individual languages, but this is optional. There is also no requirement for API's to be consistent across different languages. In some embodiments, the interfaces associated with different languages can interoperate with each other.

The runtime system can interface with the available GPUs through a graphics API, such as OpenGL or Direct3D, or through a low-level proprietary driver provided by GPU manufacturers. It can also interface with multi-core processors through low-level drivers, such as OpenMP and MPI. Other embodiments can make use of different APIs and drivers appropriate to the system resources.

6. Cluster Management Functionality: Integration with Standard Cluster Management Tools An embodiment of the runtime system can be configured to interoperate with standard cluster management tools along the following lines:

Runtime deployment: the runtime system as well as GPU drivers can be installed on clusters using a cluster management application, such as Rocks.

Runtime upgrade: patches to the runtime system can also be distributed via cluster management applications.

7. Concept Summary

There are several unique concepts that are included in different embodiments of the runtime system. These concepts include system level concepts that relate to functions and methods provided by interoperation between several blocks; and features, methods and data structures associated with individual system blocks. The purpose of this summary is to outline some of the concepts/functions of both types.

7.1) System Overview.

The runtime system enables compute-intensive operations (typically matrix/array operations) in an application program to be executed on one or more processing elements (such as stream and/or multi-core processors and/or GPUs) instead of on a single CPU core. The runtime system offers several unique features that enable application programmers to take advantage of these capabilities with relative ease. For example, to execute a particular operation on the stream and/or multi-core processors, the runtime system requires a user to do no more than: 1) to ensure that an appropriate version of the runtime system is available on the target computer system (i.e., with appropriate execution modules for the available processors), and 2) to specify in the application which operations are to be executed under the control of the runtime system using the runtime system's API.

7.2) Hardware and Software Discovery at Initialization.

When booted on a computer system, the runtime system conducts a system inventory to determine what hardware (e.g., CPU and GPU) and software (graphics drivers and GPU interfaces or APIs, such as OpenGL, Direct 3D, or low level, proprietary GPU interfaces provided by GPU vendors) are installed on the target computer system. Using this information, the runtime system is able to select appropriate execution modules (executors), which manage execution of the application programs on the hardware including the GPU and multi-core CPU. This information also enables the runtime system to compile the specified application programs for the target hardware (GPU or multi-core CPU or both) and to select the appropriate versions of pre-compiled programs and library routines to execute on the target hardware.

7.3) Utilization of Proprietary GPU Interfaces.

The runtime system is designed to take advantage of proprietary, low-level GPU interfaces, which enable the runtime system to utilize the GPU memory and to exploit target-specific hardware and software features not exposed through traditional graphics APIs, such as OpenGL and Direct3D to improve the runtime system's performance. For example, such low-level, target-specific interfaces are less or even not subject to the limits on the numbers of instructions and registers used by GPU programs. In some embodiments, some application programs can be written in a GPU's native assembly or machine binary code rather than or in addition to programs written in high-level languages and platform-independent pseudo-assembly, such as Direct3D Shader Assembly. In some embodiments, special, more efficient data layouts and data-transfer mechanisms may be exploited. In some embodiments, non-graphics-oriented capabilities can be used, such as writing to arbitrary memory offsets from GPU pixel shaders rather than to just the current pixel and accessing hardware performance counters. In some embodiments, a GPU program may be compiled or assembled into a binary image that may be executed without further translation, which can reduce run-time overhead, simplify testing, and enable greater control over execution on the GPU than if the driver further processed the assembled program.

In some embodiments, the runtime system can also take advantage of traditional graphics APIs.

7.4) Progressive Evaluation

Progressive Evaluation is the technique at the heart of the runtime system. An application generates a dynamic sequence of calls to API functions and operators that the runtime system cannot predict in advance. Under Progressive Evaluation, the runtime system treats calls to API functions and operators merely as requests to perform computation and defers processing them. The requests are batched to improve application performance on the processing element.

7.5) Dynamic Program Generation and Compilation for Stream and Multi-Core Processors.

After sufficient deferred requests have been received, the runtime system, e.g., its ProgGen module, may apply generate and compile one or more compute kernels, which are executable programs or subroutines that run on the processing element(s), which may be one or more stream and/or multi-core processors, to perform the computations requested by a sequence of API calls. Formation of efficient compute kernels for the processing element is critical to performance. During this process, the runtime system determines which operations can execute in parallel, optimizes the sequence of operations, generates source code for the processing element, compiles, and assembles the kernels.

In some embodiments, some of these code translation steps may be skipped by directly generating lower-level program representations. For example, assembly code or even executable binary instructions could be generated directly rather than compiling and/or assembling higher-level program representations.

In some embodiments, some intrinsic operations may use pre-formed, hand-written kernels rather than dynamically generated kernels.

In some embodiments, when processing requests for operations to be performed by the CPU, the runtime system may generate code for one or more CPUs, each with one or more cores. This is accomplished using basic multiprocessing features provided by the host system or cluster. In some embodiments, the runtime system may treat some or all such requests as intrinsic operations, and use pre-formed kernels. In some embodiments, the pre-formed kernels may be used only in certain contexts, such as to process small arrays or to use as reference results.

Note that throughout the present application, the terms "program" or "kernel" for a stream or multi-core processor refer to a computational unit that may be invoked by the runtime system. Depending on the specific type of the stream or multi-core processor, the computational unit may be a standalone program or a subroutine.

7.6) API Features.

The runtime system's API enables programmers to issue requests to the runtime system. In some embodiments, the API commands include specific calls to invoke basic input and output functions, to perform a variety of operations on data arrays. The API commands allow users to define Macros (groups of executions that are executed repeatedly, also known as Code Reuse Sections). The operations include at least a subset of the following operations:

7.6.1) Primitive Operations.

The runtime system's API includes calls that enable programmers to execute primitive operations for mathematical, trigonometric, and other functions optimized for specific types of stream and/or multi-core processors. In some embodiments, these primitive operations are more accurate and provide higher performance than those provided by standard libraries from the hardware vendor or development environment. In some embodiments, these primitive operations are stored internally as source code to facilitate dynamic formation of compute kernels, which are then dynamically compiled for the specific type of particular stream or multi-core processors.

7.6.2) Intrinsic Operations.

The runtime system's API enables an application program to execute pre-written, optimized routines called intrinsic operations. An intrinsic operation implements a predefined set of matrix/array operations for execution on one or more specific stream and/or multi-core processors. In some embodiments, the intrinsic operations include one or more programs for the stream or multi-core processors. They may include control code executed on the CPU, which may select one or more kernels to invoke, arrange for any temporary buffers required to pass intermediate results between kernels, determine how the kernels should execute in parallel (e.g., by choosing the number of threads to launch), and determine kernel arguments. Because they are written by hand rather than being generated from sequences of calls to primitive operations automatically, intrinsic operations may take advantage of features not supported by the kernel-formation machinery in the ProgGen module. In some embodiments, intrinsic operations are written using high-performance, low-level interfaces to a specific type of processing elements. In some other embodiments, intrinsic operations are written in either a high-level language or in assembly language. In some embodiments, intrinsic programs may be pre-compiled to reduce the runtime system's overhead and increase the system's robustness. In some embodiments, pre-compiled intrinsic operations for the CPU may be linked into the runtime system and called as ordinary procedures by the CPU executor.

7.6.3) Compound Operations.

The runtime system's API also provides functions implemented using its own primitive operations and intrinsic operations.

7.7) Dynamic Program Generation and Compilation for Multiple Different Stream and Multi-Core Processors.

As mentioned above, the runtime system, e.g., its ProgGen module, generates and compiles compute kernels for specific types of processing elements including stream processors and/or multi-core CPUs to perform sequences of primitive operations invoked by an application through the runtime system's API. In some embodiments, the runtime system, e.g., its ProgGen module, generates kernels for multiple different types of processing elements where multiple different types of processors are present in the same system.

As an initial step of processing code segments in an application program, the runtime system generates a uniform intermediate representation (IR) for each function (such as the math, reduction, trigonometric, Boolean, and intrinsic functions described above) directed to the runtime system for execution. The intermediate representation includes information about each function's inputs and outputs, one or more operations performed by the function, and the operations' execution order. In some embodiments, the intermediate representation is represented as a directed acyclic graph (DAG). In some embodiments, the same IR can be used to generate object codes for CPU, GPU, or any other processor supporting the runtime system. This enables the runtime system to support features such as executing the same set of instructions on a CPU and a GPU separately for code comparison or reference results determination and dynamic selection of processor type on which to execute the instructions.

7.8) Efficient, Transparent Reuse of Programs Generated from Sequences of Calls into an API.

The runtime system's API enables software applications to run compute-intensive operations transparently on stream and/or multi-core processors. During normal operation the runtime system automatically and transparently compiles a set of API calls into a program sequence for the stream and/or multi-core processors that it then executes on available processors. The user is not required to have any prior knowledge about the specific stream or multi-core processors in order to take advantage of the hardware's high-performance capacity. In some embodiments, the runtime system manages two caches to store compiled programs for reuse. This configuration enables the runtime system to search these caches for possibly reusable programs or program sequences before compiling new ones.

Compiled program sequences and signatures of the sequences of calls used to generate them are stored in the Trace Cache (TC). Program sequences generated for previously executed sequences of calls to the runtime system's API are reused if the C Scheduler determines that they are identical to new sequences of API calls in an application program submitted to the runtime system for execution. This takes advantage of programs optimized for the stream and/or multi-core processors, while avoiding the time required to repeatedly generate and compile the programs, which takes a good deal of time.

The ProgGen module additionally stores individually compiled programs and their source code in the Program Cache. In the case that there is a previously generated and compiled program in the Program Cache that is identical to a newly generated program to be compiled, the previously compiled program may be re-used. In some embodiments, this saving could be substantial depending on the particular compiler used for a particular target multi-core processor.

7.9) Code Reuse Sections/Code Macros.

In addition to the transparent execution mode, the runtime system enables a user to define a sequence of API calls that may be executed repeatedly via a macro feature, which is also known as a Code Reuse Section. In this mode of operation, the user indicates one or more groups of operations and/or macros that are to be recorded for subsequent use. After performing these operations and generating the program sequences necessary to implement them on the multi-core processors, the compiled program sequences are stored in the Macro Cache (MC) along with an invocation signature that must be matched in order to reuse the program sequence. The MC-based code reuse is more efficient than the TC-based code reuse, because while the Macro Cache may reuse program sequences based on just a signature of the inputs to the macro, the TC-based code reuse requires more work from the C Scheduler to determine whether there is a match for a new sequence of operations, as well as the full sequence of API calls themselves. In contrast, the API calls to perform the operations do not need to be repeated when a macro is being replayed. In some embodiments, the Program Cache may be used in conjunction with the Macro Cache. In some embodiments, the Trace Cache may be used in conjunction with the Macro Cache. This configuration may be useful if a single macro includes a long sequence of repeated operations.

Although some of various drawings illustrate a number of logical stages in a particular order, stages which are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. But the illustrative discussions above are not intended to be exhaustive or to limit the invention to the precise forms disclosed. Many modifications and variations are possible in view of the above teachings. For example, although some of the embodiments described above are based on a language-specific application program interface, one skilled in the art will appreciate that many features associated with the language-specific application program interface can be realized using a programming language designed to support the runtime system. For more details of the present invention, please refer to the set of documents included in the Appendix of the present application.

What is claimed is:

1. A computer-implemented method configured to be performed by a runtime system at a parallel-processing computer system that includes multiple types of processing elements, comprising:

at runtime:
receiving one or more operation requests issued by an application, wherein the one or more operation requests correspond to a code reuse section of the application;
generating one or more intermediate representation entries for the one or more operation requests;
dynamically choosing a respective type of processing element for the one or more intermediate representation entries;

identifying, among a plurality of compute kernels previously compiled by the runtime system for the application, one or more previously compiled compute kernels for the one or more intermediate representation entries, wherein the identified previously compiled compute kernels are configured to execute on the dynamically chosen type of processing element; and scheduling execution of the identified one or more previously compiled compute kernels at the respective type of processing element, wherein the multiple types of processing elements include two or more of:

single-core central processing units, multi-core central processing units, graphics processing units, single-core co-processors and multi-core coprocessors.

2. The computer-implemented method of claim 1, wherein the code reuse section of the application is between by a pair of keywords defined by the runtime system.

3. The computer-implemented method of claim 1, wherein the one or more intermediate representation entries are programming language-independent and processor-independent.

4. The computer-implemented method of claim 1, wherein the respective type of processing element is dynamically chosen based, at least in part, on one of a predefined computer resource requirement metric of the one or more intermediate representation entries and a predefined workload requirement metric of the parallel-processing computer running the running time.

5. The computer-implemented method of claim 1, wherein the plurality of previously compiled compute kernels include a set of compute kernels that the runtime system previously compiled when executing another code reuse section of the application.

6. The computer-implemented method of claim 1, wherein identifying one or more previously compiled compute kernels among the plurality of previously compiled compute kernels further includes:

generating an identifier using the one or more intermediate representation entries; and performing a table lookup of the plurality of previously compiled compute kernels for a subset of compute kernels that matches the identifier.

7. The computer-implemented method of claim 1, further comprising:

adding the one or more newly compiled compute kernels to the plurality of previously compiled compute kernels; and generating an identifier using the one or more intermediate representation entries, wherein the identifier uniquely identifies the one or more newly compiled compute kernels among the plurality of compute kernels previously compiled.

8. A parallel-processing computer system, comprising:
memory;
multiple types of processing elements; and
at least one program stored in the memory and executed by the multiple types of processing elements, the at least one program including a runtime system comprising instructions for:

at runtime:

receiving one or more operation requests issued by an application, wherein the one or more operation requests correspond to a code reuse section of the application;

generating one or more intermediate representation entries for the one or more operation requests;

dynamically choosing a respective type of processing element for the one or more intermediate representation entries;

identifying, among a plurality of compute kernels previously compiled by the runtime system for the application, one or more previously compiled compute kernels for the one or more intermediate representation entries, wherein the identified previously compiled compute kernels are configured to execute on the dynamically chosen type of processing element; and scheduling execution of the identified one or more previously compiled compute kernels at the respective type of processing element, wherein the multiple types of processing elements include two or more of: single-core central processing units, multi-core central processing units, graphics processing units, single-core co-processors and multi-core coprocessors.

9. The parallel-processing computer system of claim 8, wherein the code reuse section of the application is between by a pair of keywords defined by the runtime system.

10. The parallel-processing computer system of claim 8, wherein the one or more intermediate representation entries are programming language-independent and processor-independent.

11. The parallel-processing computer system of claim 8, wherein the respective type of processing element is dynamically chosen based, at least in part, on one of a predefined computer resource requirement metric of the one or more intermediate representation entries and a predefined workload requirement metric of the parallel-processing computer running the running time.

12. The parallel-processing computer system of claim 8, wherein the plurality of previously compiled compute kernels include a set of compute kernels that the runtime system previously compiled when executing another code reuse section of the application.

13. The parallel-processing computer system of claim 8, wherein the instructions for identifying one or more previously compiled compute kernels among the plurality of previously compiled compute kernels further include instructions for:

generating an identifier using the one or more intermediate representation entries; and performing a table lookup of the plurality of previously compiled compute kernels for a subset of compute kernels that matches the identifier.

14. The parallel-processing computer system of claim 8, further comprising instructions for:

adding the one or more newly compiled compute kernels to the plurality of previously compiled compute kernels; and generating an identifier using the one or more intermediate representation entries, wherein the identifier uniquely identifies the one or more newly compiled compute kernels among the plurality of compute kernels previously compiled.

15. A computer program product for use in conjunction with a parallel-processing computer system that includes multiple types of processing elements, the computer program product comprising a computer readable storage medium and a computer program mechanism embedded therein, the computer program mechanism comprising a runtime system including instructions for:

at runtime:

receiving one or more operation requests issued by an application, wherein the one or more operation requests correspond to a code reuse section of the application;

generating one or more intermediate representation entries for the one or more operation requests;

dynamically choosing a respective type of processing element for the one or more intermediate representation entries;

identifying, among a plurality of compute kernels previously compiled by the runtime system for the application, one or more previously compiled compute kernels for the one or more intermediate representation entries, wherein the identified previously compiled compute kernels are configured to execute on the dynamically chosen type of processing element; and scheduling execution of the identified one or more previously compiled compute kernels at the respective type of processing element, wherein the multiple types of processing elements include two or more of: single-core central processing units, multi-core central processing units, graphics processing units, single-core co-processors and multi-core coprocessors.

16. The computer program product of claim 15, wherein the code reuse section of the application is between by a pair of keywords defined by the runtime system.

17. The computer program product of claim 15, wherein the one or more intermediate representation entries are programming language-independent and processor-independent.

18. The computer program product of claim 15, wherein the respective type of processing element is dynamically chosen based, at least in part, on one of a predefined computer resource requirement metric of the one or more intermediate representation entries and a predefined workload requirement metric of the parallel-processing computer running the running time.

19. The computer program product of claim 15, wherein the plurality of previously compiled compute kernels include a set of compute kernels that the runtime system previously compiled when executing another code reuse section of the application.

20. The computer program product of claim 15, wherein the instructions for identifying one or more previously compiled compute kernels among the plurality of previously compiled compute kernels further include instructions for:

generating an identifier using the one or more intermediate representation entries; and performing a table lookup of the plurality of previously compiled compute kernels for a subset of compute kernels that matches the identifier.

21. The computer program product of claim 15, further comprising instructions for:

adding the one or more newly compiled compute kernels to the plurality of previously compiled compute kernels; and generating an identifier using the one or more intermediate representation entries, wherein the identifier uniquely identifies the one or more newly compiled compute kernels among the plurality of compute kernels previously compiled.

* * * * *